(12) United States Patent  (10) Patent No.: US 6,473,580 B1
Inomata  (45) Date of Patent: Oct. 29, 2002

(54) DRIVING FORCE RECEIVING MEMBER, SHAFT COUPLING, TONER IMAGE BEARING MEMBER, PROCESS CARTRIDGE AND ELECTROPHOTOGRAPHIC IMAGE FORMING APPARATUS

(75) Inventor: Mitsugu Inomata, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/049,901

(22) Filed: Mar. 30, 1998

(30) Foreign Application Priority Data

| Mar. 28, 1997 | (JP) | .................................. 9-095366 |
| Mar. 28, 1997 | (JP) | .................................. 9-095367 |
| Mar. 25, 1998 | (JP) | ................................. 10-096758 |

(51) Int. Cl.⁷ .............................................. G03G 15/00
(52) U.S. Cl. ....................................... 399/167; 399/111
(58) Field of Search ................................. 399/111, 116, 399/117, 159, 167

(56) References Cited

U.S. PATENT DOCUMENTS

| 3,815,380 A | * | 6/1974 | Esmay ........................ 464/173 |
| 4,530,588 A | * | 7/1985 | Kimura et al. ............... 399/117 |
| 4,621,919 A | * | 11/1986 | Nitanda et al. .............. 399/117 |
| 4,839,690 A | * | 6/1989 | Onoda et al. ................. 399/117 |
| 4,922,297 A | * | 5/1990 | Kondo ......................... 399/117 |
| 5,023,660 A | * | 6/1991 | Ebata et al. .................. 399/111 |
| 5,128,715 A | * | 7/1992 | Furuyama et al. ........... 399/116 |
| 5,132,728 A | * | 7/1992 | Suzaki et al. ................ 399/167 |
| 5,284,455 A | * | 2/1994 | Kuribayashi |
| 5,436,699 A | * | 7/1995 | Komaki ....................... 399/159 |
| 5,461,464 A | * | 10/1995 | Swain ......................... 399/159 |

FOREIGN PATENT DOCUMENTS

| EP | 735432 | * 10/1996 |
| GB | 2214609 | * 9/1989 |
| JP | 63-42 52 | 1/1987 |
| JP | 62-65049 | 3/1987 |
| JP | 63-149669 | 6/1988 |

* cited by examiner

Primary Examiner—Robert Beatty
(74) Attorney, Agent, or Firm—Fitzpatrick, Cella, Harper & Scinto

(57) ABSTRACT

An electrophotographic image forming apparatus to which a process cartridge is detachably mounted and which is adapted to form an image on a recording medium includes an electrophotographic photosensitive drum, a mounting device capable of detachably mounting a process cartridge including a process device acting on the electrophotographic photosensitive drum and a shaft coupling member secured to a drum support shaft for supporting the electrophotographic photosensitive drum. A shaft coupling member of an apparatus body is adapted to be engaged by and disengaged from the shaft coupling member of the process cartridge. The shaft coupling member of the apparatus body includes either of one shaft coupling member including a cylindrical projection coaxial with a rotation center, and transmitting force transmitting or receiving projections disposed around the cylindrical projection and protruding in the same direction as the cylindrical projection and having inclined surfaces with a tip end lead directing toward a rotational direction, or another shaft coupling member including a cylindrical hole to be fitted onto the cylindrical projection to effect centering, and holes to be fitted onto the transmitting force transmitting or receiving projections and disposed around the cylindrical hole and having inclined surfaces to be contacted with the inclined surfaces of the transmitting force transmitting or receiving projections.

27 Claims, 41 Drawing Sheets

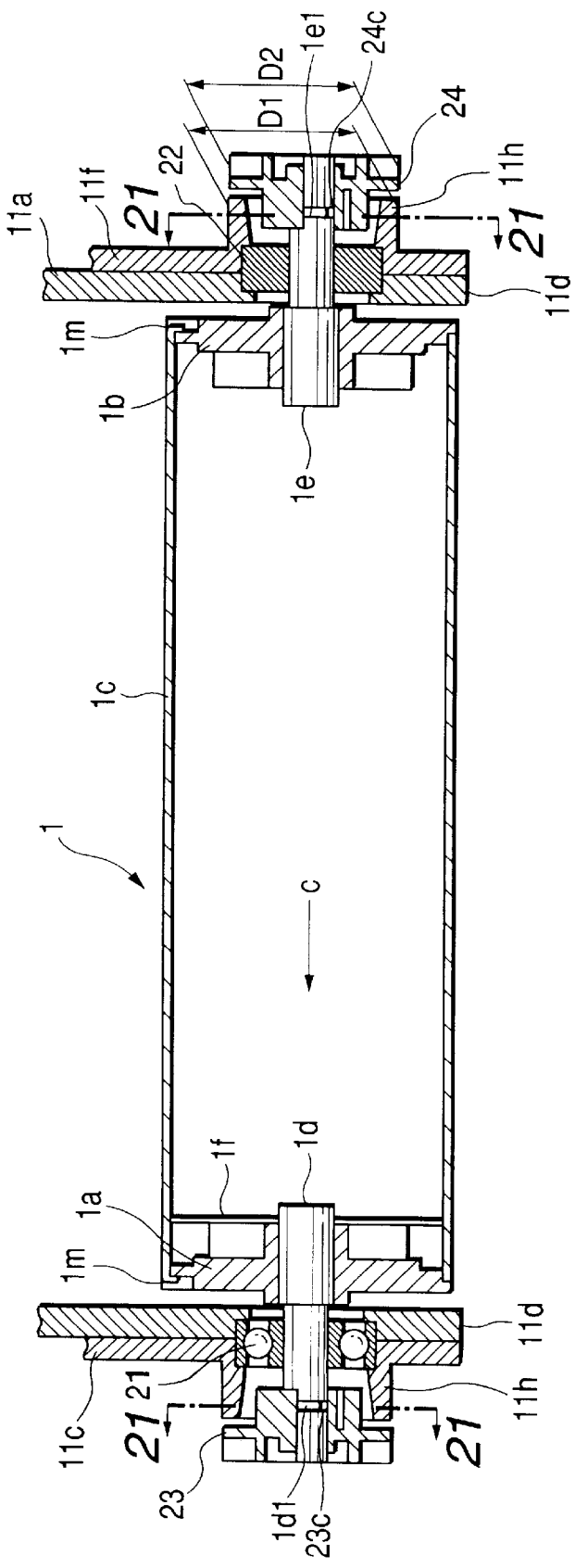

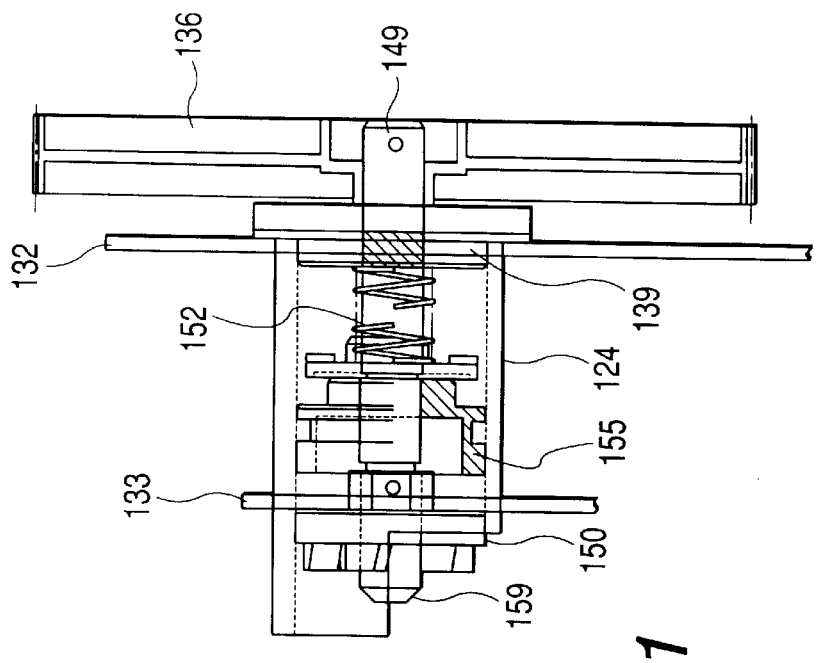
FIG. 34A
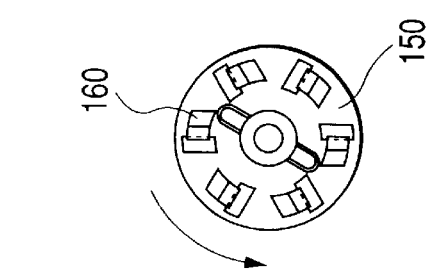
FIG. 34B   FIG. 34B-1
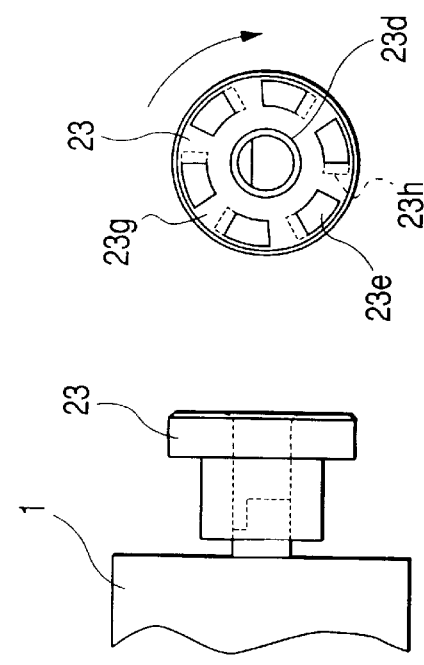
FIG. 34D   FIG. 34D-1
FIG. 34C FIG. 46C
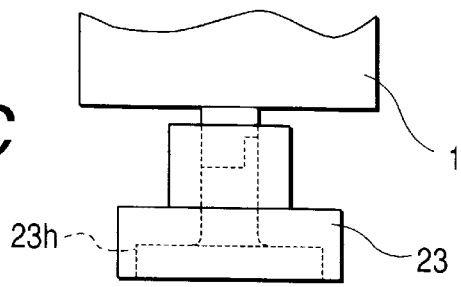
FIG. 46D-1    FIG. 46D
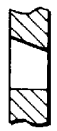    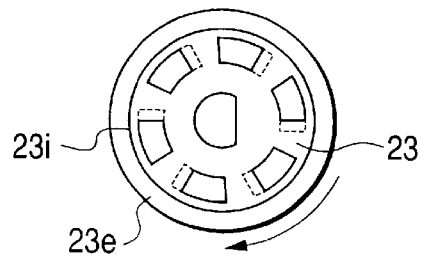
FIG. 46B-1    FIG. 46B
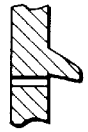    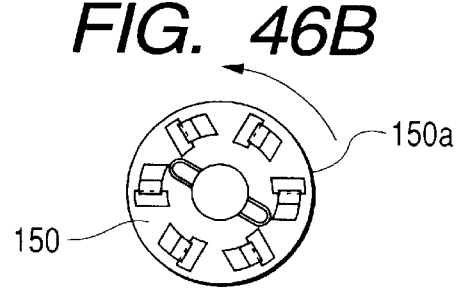
FIG. 46A
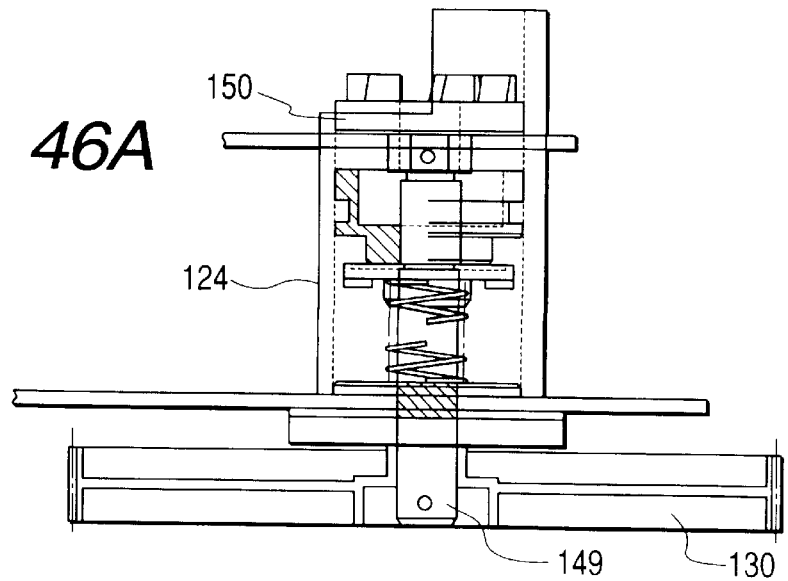

FIG. 47C
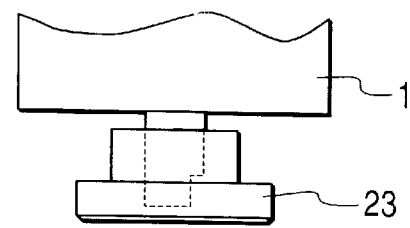
FIG. 47D-1    FIG. 47D
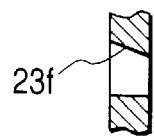 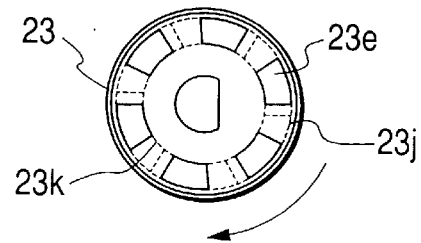
FIG. 47B-1    FIG. 47B
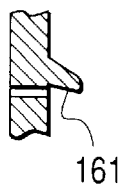 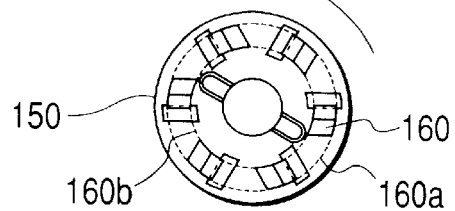
FIG. 47A
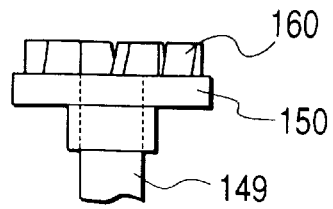

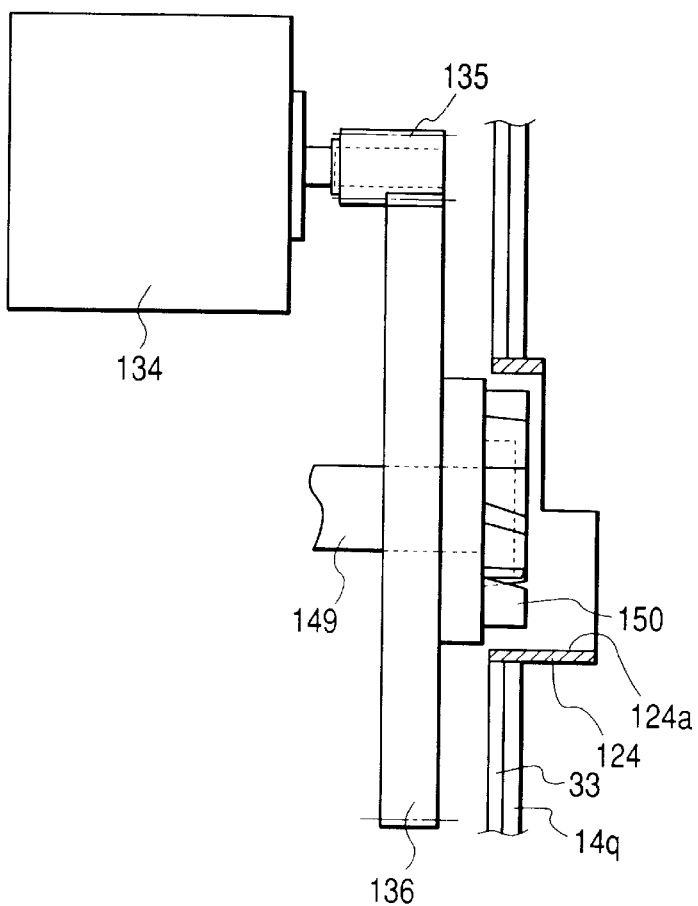
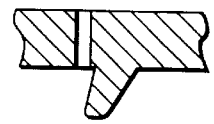
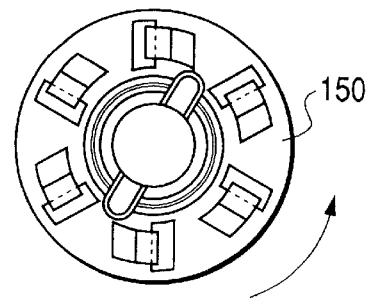
FIG. 48A
FIG. 48C
FIG. 48B

DRIVING FORCE RECEIVING MEMBER, SHAFT COUPLING, TONER IMAGE BEARING MEMBER, PROCESS CARTRIDGE AND ELECTROPHOTOGRAPHIC IMAGE FORMING APPARATUS

BACKGROUND OF THE INVENTION

1. Field of the Invention

The present invention relates to a driving force receiving member, a shaft coupling, a toner image bearing member, a process cartridge and an electrophotographic image forming apparatus.

The "electrophotographic image forming apparatus" refers to an apparatus for forming an image on a recording medium by using an electrophotographic image forming system. For example, the electrophotographic image forming apparatus may be an electrophotographic copying machine, an electrophotographic printer (for example, a laser beam printer or an LED printer), an electrophotographic facsimile or an electrophotographic word processor.

The "process cartridge" incorporates therein an electrophotographic photosensitive member, a charge means and a cleaning means, as a cartridge unit which can be detachably mounted to a main body of an electrophotographic image forming apparatus or incorporates therein an electrophotographic photosensitive member and a cleaning means, as a cartridge unit which can be detachably mounted to a body of an electrophotographic image forming apparatus. Since such a process cartridge can be mounted to or dismounted from the image forming apparatus by an operator himself, the maintenance of the image forming apparatus can easily be performed.

2. Related Background Art

In electrophotographic image forming apparatus using an electrophotographic image forming system, an electrophotographic photosensitive member uniformly charged by a charge means is selectively exposed in accordance with image information to form a latent image. The latent image is developed by a developing means with toner to form a toner image. Thereafter, the toner image formed on the electrophotographic photosensitive member is transferred, by a transfer means, onto a recording medium. In this way, image formation is performed.

In such image forming apparatuses using an electrophotographic image forming process, a process cartridge incorporating therein the electrophotographic photosensitive member and process means acting on the electrophotographic photosensitive member as a cartridge unit, which can detachably mounted to a body of the image forming apparatus, has been used. By using such a process cartridge, since the maintenance of the image forming apparatus can be performed by the operator himself without any expert, the operability can be improved considerably. Thus, such a process cartridge has widely been used in the image forming apparatus.

Regarding such a process cartridge, the body of the image forming apparatus is provided with a drive source, and a driving force is transmitted from the drive source to the process cartridge through a driving force transmitting means.

For example, an example of a method for rotatingly driving an electrophotographic photosensitive drum is disclosed in Japanese Patent Laid-Open Application No. 62-65049 (1987). According to this method, a pin secured to a side surface of a gear provided within the main body of the image forming apparatus is fitted into a recessed portion formed in a gear provided on the photosensitive drum, thereby rotating the photosensitive drum.

According to another method disclosed in Japanese Patent Laid-Open Application No. 63-4252 (1988), a helical gear provided within the body of the image forming apparatus is engaged by a helical gear provided on the photosensitive drum, thereby rotating the photosensitive drum.

These techniques are effective to transmit a rotational force to the photosensitive drum. The present invention relates to an improvement of such techniques.

SUMMARY OF THE INVENTION

An object of the present invention is to provide a driving force receiving member, a shaft coupling, a toner image bearing member, a process cartridge and an electrophotographic image forming apparatus, in which rotation accuracy is improved.

Another object of the present invention is to provide a driving force receiving member, a shaft coupling, a toner image bearing member, a process cartridge and an electrophotographic image forming apparatus, in which a driving force can be transmitted positively.

A further object of the present invention is to provide a driving force receiving member, a shaft coupling, a toner image bearing member, a process cartridge and an electrophotographic image forming apparatus, in which drive input accuracy and rotation accuracy are improved to obtain stable high quality.

The other object of the present invention is to provide a driving force receiving member, a shaft coupling, a toner image bearing member, a process cartridge and an electrophotographic image forming apparatus, in which a driving force is transmitted by using protruded portions having acute inclined surfaces with respect to a rotational direction, and surfaces contacted by such inclined surfaces.

BRIEF DESCRIPTION OF THE DRAWINGS

FIG. 20 is an elevational sectional view of a photosensitive drum;

FIG. 21 is a sectional view taken along the line 21—21 in FIG. 20;

FIGS. 34A, 34B, 34B-1, 34C, 34D and 34D-1 are views showing a mechanism for driving the photosensitive drum, where a section FIG. 34A is a plan view of a drive side, a section FIG. 34B is a front view of a shaft coupling portion of the drive side, a section FIG. 34B-1 is a partial sectional view of the shaft coupling of the section FIG. 34B, a section FIG. 34C is a plan view of a photosensitive drum side, a section FIG. 34D is a front view of a shaft coupling portion of the photosensitive drum side, and a section FIG. 34D-1 is a partial sectional view of the shaft coupling of the section FIG. 34D;

FIG. 42A is a side view and a section FIG. 42B is a front view;

FIGS. 43A, 43B, 43B-1, 43C, 43D and 43D-1 are views showing a mechanism for driving a transfer belt, where a section FIG. 43A is a plan view of a drive side, a section FIG. 43B is a front view of a shaft coupling portion of the drive side, a section FIG. 43B-1 is a partial sectional view of the shaft coupling of the section FIG. 43B, a section FIG. 43C is a plan view of a photosensitive drum side, a section FIG. 43D is a front view of a shaft coupling portion of the photosensitive drum side, and a section FIG. 43D-1 is a partial sectional view of the shaft coupling of the section FIG. 43D;

FIGS. 46A, 46B, 46B-1, 46C, 46D and 46D-1 are views showing a mechanism for driving the photosensitive drum, where a section FIG. 46A is a plan view of a drive side, a section FIG. 46B is a front view of a shaft coupling portion of the drive side of the section FIG. 46A, a section FIG. 46B-1 is a partial is sectional view of the shaft coupling of the section FIG. 46B, a section FIG. 46C is a plan view of a photosensitive drum side, a section FIG. 46D is a front view of a shaft coupling portion of the photosensitive drum side, and a section FIG. 46D-1 is a partial sectional view of the shaft coupling of the section FIG. 46D;

FIGS. 47A, 47B, 47B-1, 47C, 47D and 47D-1 are views showing a mechanism for driving the photosensitive drum, where a section FIG. 47A is a plan view of a drive side, a section FIG. 47B is a front view of a shaft coupling portion of the drive side of the section FIG. 47A, a section FIG. 47B-1 is a partial sectional view of the shaft coupling of the section FIG. 47B, a section FIG. 47C is a plan view of a photosensitive drum side, a section FIG. 47D is a front view of a shaft coupling portion of the photosensitive drum side, and a section FIG. 47D-1 is a partial sectional view of the shaft coupling of the section FIG. 47D;

FIGS. 48A, 48B and 48C are views showing a mechanism for driving the photosensitive drum, where a section FIG. 48A is a plan view of a drive side, a section FIG. 48B is a front view of a shaft coupling portion of the drive side of the section FIG. 48A, and a section FIG. 48C is a partial sectional view of the shaft coupling of the section FIG. 48B;

DETAILED DESCRIPTION OF THE PREFERRED EMBODIMENTS

The present invention will now be explained in connection with embodiments thereof with reference to the accompanying drawings. In the following explanation, the widthwise direction of a process cartridge B is a mounting and dismounting direction of the process cartridge B with respect to a body 14 of an image forming apparatus and coincides with a recording medium conveying direction. A longitudinal direction of the process cartridge B is a direction transverse to (substantially perpendicular to) the mounting and dismounting direction of the process cartridge B with respect to the apparatus body 14 and parallel with a surface of a recording medium and transverse to (substantially perpendicular to) the recording medium conveying direction. Further, the term "left and right" regarding the process cartridge is right and left directions along the recording medium conveying direction, when the recording medium is looked at from the above. The above-mentioned directions are similarly applied to the apparatus body 14.

First Embodiment

Now, a first embodiment of the present invention will be described with reference to the accompanying drawings.

<Entire Construction>

Figure 1:
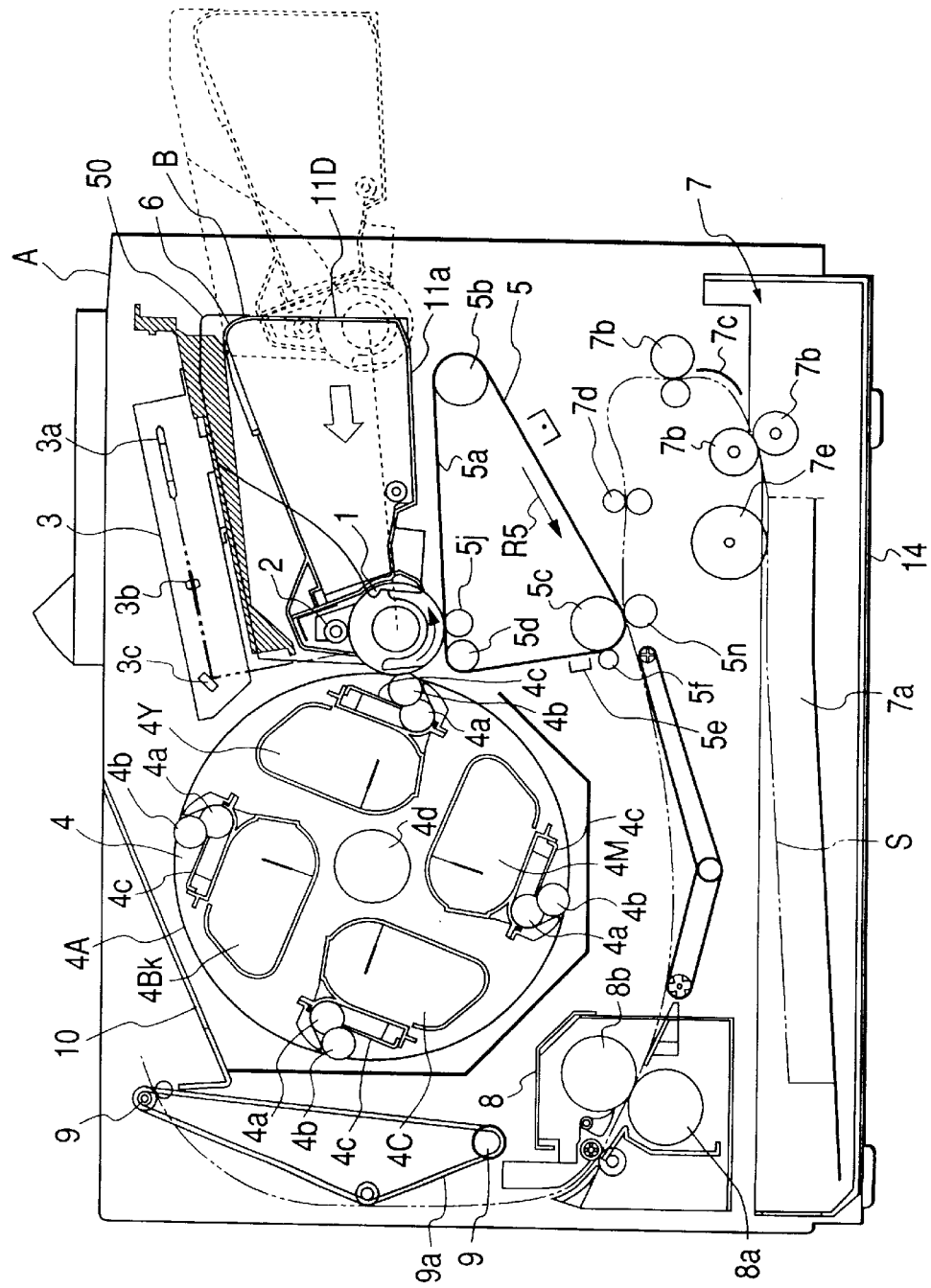
FIG. 1 is an elevational sectional view of an electrophotographic image forming apparatus.

FIG. 1 is an elevational sectional view schematically showing the entire construction of an electrophotographic image forming apparatus (referred to merely as "image forming apparatus" hereinafter) A according to the present invention.

First of all, the entire image forming apparatus A will be briefly explained with reference to FIG. 1. Incidentally, the image forming apparatus A shown in FIG. 1 is embodied as a (four color) full-color laser beam printer.

The image forming apparatus A shown in FIG. 1 has a drum-shaped electrophotographic photosensitive body (referred to as "photosensitive drum" hereinafter) 1 as an image bearing member. The photosensitive drum 1 is rotatingly driven in a counter-clockwise direction in FIG. 1 by a drive means (not shown). Around the photosensitive drum 1, in order along a rotational direction thereof, there are disposed a charge device 2 for uniformly charging a surface of the photosensitive drum 1, an exposure means 3 for forming an electrostatic latent image on the photosensitive drum 1 by illuminating a laser beam in response to image information, a developing means 4 for developing the electrostatic latent image as a toner image by adhering toner to the latent image, an intermediate transfer unit (second image bearing member) 5 onto which the toner image on the photosensitive drum 1 is firstly-transferred, and a cleaning device 6 for removing residual toner remaining on the photosensitive drum 1 after the first transferring.

The photosensitive drum 1, the charge device 2 and the cleaning device 6 for removing the toner are integrally incorporated as a cartridge unit constituting a process cartridge B which can detachably be mounted to the body 14 of the image forming apparatus A.

In addition to the above elements, there are provided a sheet supply and convey means 7 for supplying a recording medium (third image bearing member) S toward the intermediate transfer unit 5, and a fixing device 8 for fixing the toner image to the recording medium S after secondary transferring.

Now, the photosensitive drum 1 will be described.

As shown in FIG. 20, the photosensitive drum 1 is constituted by an aluminium cylinder 1c having a diameter of about 47 mm, and an organic photoconductive layer (OPC photosensitive body) coated on the aluminium cylinder. The photosensitive drum 1 is rotatably supported, at its both ends, by support members and is rotated in a direction shown by the arrow in FIG. 1 by transmitting a driving force from a drive motor (not shown; described later) to one end of the photosensitive drum.

As the charge device 2, for example, a charge device of contact charging type disclosed in Japanese Patent Laid-Open Application No. 63-149669 (1988) may be used. The charge device comprises a conductive roller urged against the surface of the photosensitive drum 1. By applying a charge bias voltage from a power source (not shown) to the charge roller, the surface of the photosensitive drum 1 is uniformly charged.

The exposure means 3 includes a polygon mirror 3a, and image light corresponding to an image signal illuminates the polygon mirror 3a from a laser diode (not shown). The polygon mirror 3a is rotated at a high speed by a scanner motor (not shown), and the image light reflected by the polygon mirror is selectively exposed onto the surface of the photosensitive drum 1 through a focusing lens 3b and a reflection mirror 3c, thereby forming the electrostatic latent image on the photosensitive drum.

The developing means 4 includes a rotary member 4A rotated around a shaft 4d in an index manner, and four developing devices mounted on the rotary member (i.e., developing device 4Y containing yellow toner, developing device 4C containing cyan toner, developing device 4M containing magenta toner, and developing device 4Bk containing black toner). When the electrostatic latent image on the photosensitive drum 1 is developed, the developing device containing the toner to be adhered to the electrostatic latent image is positioned at a developing station. That is to say, the selected developing device is positioned at the developing station where the developing device is opposed to the photosensitive drum by index movement of the rotary member 4A. After a developing sleeve 4d of the developing device is positioned to be opposed to the photosensitive drum with a small gap (about 300 μm) therebetween, the electrostatic latent image on the photosensitive drum 1 is developed.

The development is effected as follows. The toner in a toner container of the developing device corresponding to the color to be developed is sent to a coating roller 4a by a feed mechanism, and a thin toner layer is formed on an outer peripheral surface of the developing sleeve 4b by the rotating coating roller 4a and a toner regulating blade 4c, and charges (frictional charges) are applied to the toner. By applying a developing bias between the developing sleeve 4b and the photosensitive drum 1 on which the electrostatic latent image was formed, the toner is adhered to the electrostatic latent image to develop the latent image as a toner image. Further, the developing sleeve 4b of the developing device 4Y, 4C, 4M or 4Bk is connected to a corresponding high voltage power source of the body 14 of the image forming apparatus when the selected developing device is positioned at the developing station, thereby selectively applying voltage. The developing devices 4Y, 4C, 4M, 4Bk are detachably mounted on the rotary member 4A independently, and the rotary member 4A is detachably mounted to the apparatus body 14.

The intermediate transfer unit 5 as the second image bearing member serves to transfer a plurality of toner images successively transferred to the unit in a superimposed fashion onto the recording medium S collectively and has an intermediate transfer belt 5a rotatingly driven in a direction shown by the arrow R5. The intermediate transfer belt 5a according to the illustrated embodiment has a peripheral length of about 440 mm and mounted on and wound around a drive roller 5b, a secondary transfer counter roller 5c and a driven roller 5d. A hold-down roller 5j is disposed in the vicinity of the driven roller 5d and can be shifted between a position where the intermediate transfer belt 5a is urged against the photosensitive drum 1 by the hold-down roller and a retard position where the intermediate transfer belt 5a is separated from the photosensitive drum 1. The intermediate transfer belt 5a is rotatingly driven in the direction shown by the arrow R5 by rotation of the drive roller 5b.

A cleaning unit 5e which can be engaged by and disengaged from the intermediate transfer belt 5a is disposed at a predetermined position outside of the intermediate transfer belt 5a and serves to remove residual toner remaining on the intermediate transfer belt 5a, after the toner images were secondary-transferred onto the recording medium S collectively (described later). In the cleaning unit 5e, after a charge roller 5f is urged against the intermediate transfer belt 5a, toner is charged with a polarity opposite to the polarity given when the toner is transferred. The negatively charged toner is electrostatically adhered to the photosensitive drum 1 and thereafter is removed by the cleaning device 6 (described later) for cleaning the photosensitive drum 1. The cleaning method for cleaning the intermediate transfer belt 5a is not limited to the above-mentioned electrostatic cleaning, but, a mechanical cleaning method using a blade or a fur brush may be used or a combination of the electrostatic cleaning and the mechanical cleaning may be used.

The cleaning device 6 serves to remove residual toner remaining on the photosensitive drum 1 which was not transferred to the intermediate transfer belt 5a after the toner images developed on the photosensitive drum 1 by the developing means 4 were transferred to the intermediate transfer belt. In the cleaning device 6, the removed residual toner is collected in a cleaning container 11a. In FIG. 1, the detailed construction of the interior of the cleaning container 11a is omitted from illustration and will be described later fully.

The supply and convey means 7 serves to supply the recording medium S to the image forming portion and includes a sheet supply cassette 7A containing a plurality of recording media S and is detachably mounted to a lower portion of the apparatus body 14. In the image formation process, a pick-up member 7e and a convey roller 7b are rotatingly driven in response to the image forming operation to supply the recording media S, one by one, from the sheet supply cassette 7a, and the supplied recording medium S is guided by a guide plate 7c and is sent to the intermediate transfer belt 5a through a pair of regist rollers 7d.

The fixing device 8 serves to fix the secondary-transferred plural toner images onto the recording medium S and includes a drive roller 8a, and a fixing roller 8b urged against the drive roller to apply heat and pressure to the recording medium S. That is to say, while the recording medium S passes through a secondary transfer roller 5n for transferring the toner images on the intermediate transfer belt 5a collectively is being passed through the fixing device 8, the recording medium S is conveyed by the drive roller 8a and the heat and pressure is applied from the fixing roller 8b to the recording medium. As a result, the plural color toner images are fixed to the recording medium S.

Next, the image forming operation of the image forming apparatus having the above-mentioned construction will be explained.

The photosensitive drum 1 is rotated in the direction shown by the arrow in FIG. 1 (anti-clockwise direction) in synchronism with the rotation of the intermediate transfer belt 5a. The surface of the photosensitive drum 1 is uniformly charged by the charge device 2 and light corresponding to the yellow image illuminates on the photosensitive drum, thereby forming the electrostatic latent image corresponding to the yellow image. At the same time when the electrostatic latent image is formed, the developing means 4 is driven to bring the yellow developing device 4Y to the developing station, and a voltage, having the same polarity as the charging polarity of the photosensitive drum and same potential as that of the photosensitive drum, is applied to the yellow toner to adhere the yellow toner to the electrostatic latent image on the photosensitive drum 1, thereby is developing the latent image. Then, the yellow toner image on the photosensitive drum 1 is transferred onto the intermediate transfer belt 5a by applying a voltage having a polarity opposite to that of the toner to the first transfer roller (driven roller) 5d.

After the yellow toner image is first-transferred in this way, the next developing device is rotatingly driven to be brought to the developing station to be opposed to the photosensitive drum 1. In this way, similar to the yellow toner image, regarding magenta, cyan and black toner images, formation of electrostatic latent image, development and first transferring are repeated successively, thereby superimposing four color toner images on the intermediate transfer belt 5a. The toner images are collectively secondary-transferred onto the recording medium S supplied from the supply and convey means 7.

Then, the recording medium S is sent to the fixing device 8, where the toner images are fixed to the recording medium. Thereafter, the recording medium S is discharged onto the discharge tray 10 out of the apparatus body 14 by a belt 9a shifted in a direction shown by the arrow and a discharge rollers 9 on which the belt 9a is mounted. In this way, the image forming operation is finished.

Next, the mounting of the process cartridge B to the apparatus body 14 will be briefly described.

Figure 2:
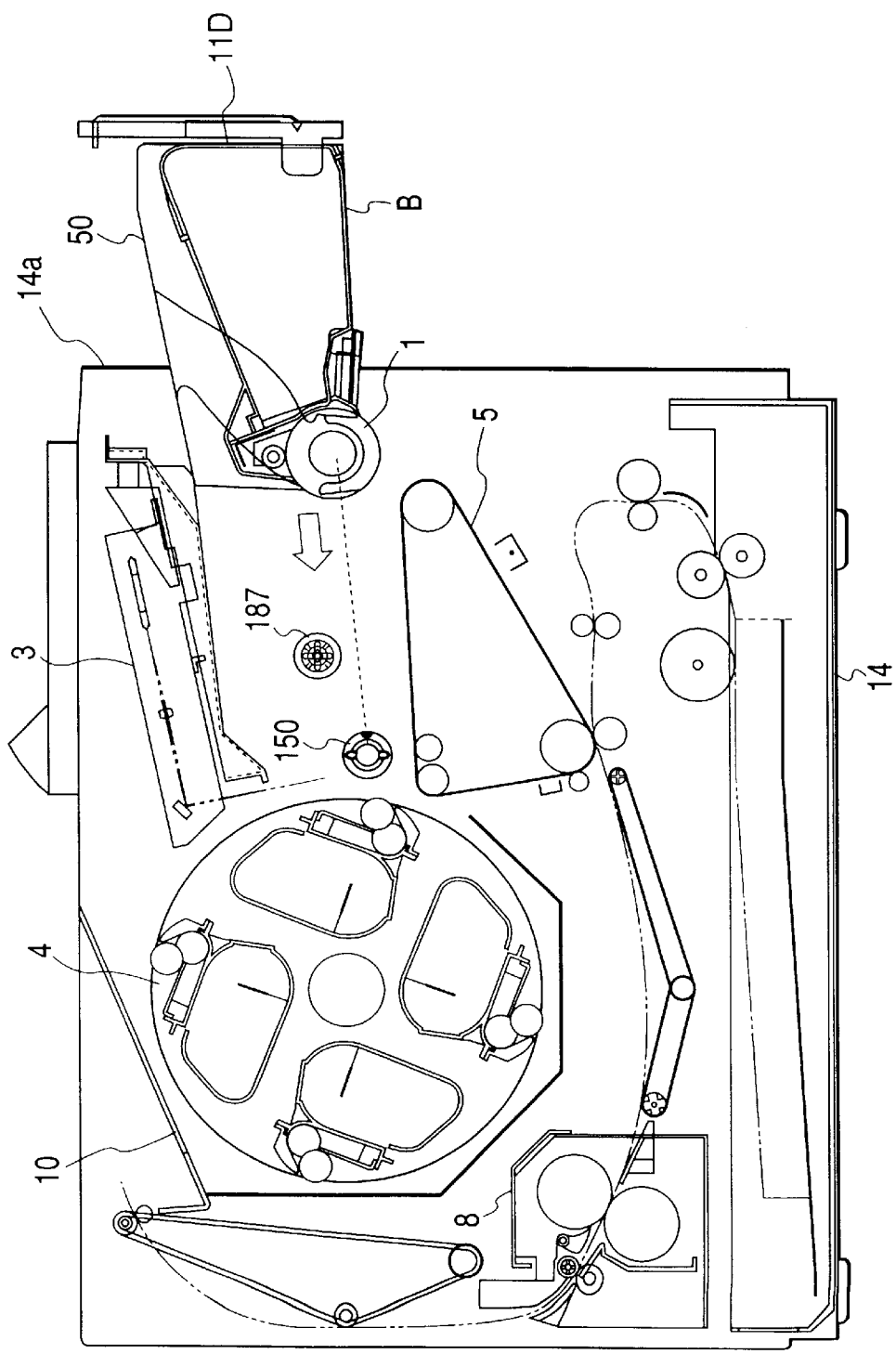
FIG. 2 is an elevational sectional view of mounting and dismounting of a process cartridge with respect to the apparatus of FIG. 1.
Figure 17:
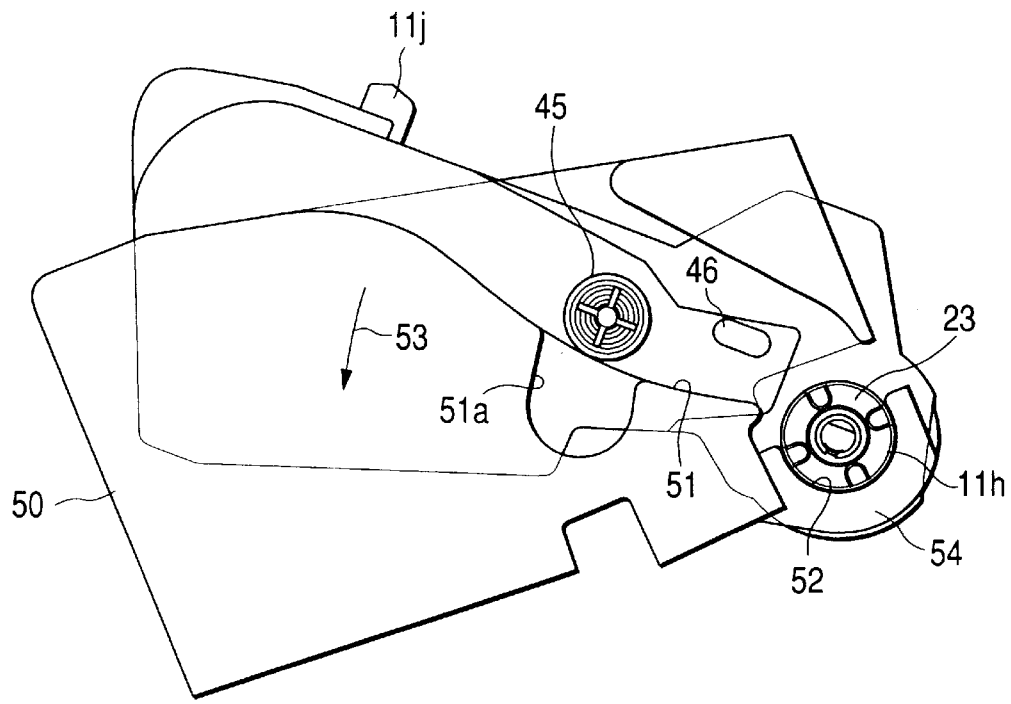
Figure 18:
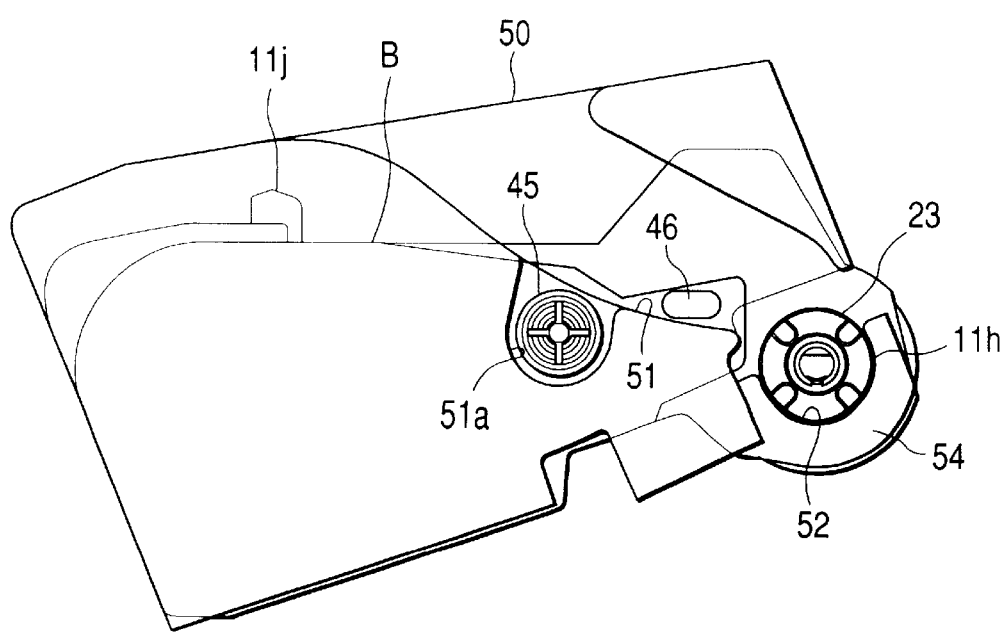
FIG. 18 is a side view showing a condition in which the process cartridge was mounted to the cartridge guide.

Regarding the mounting of the process cartridge B to the apparatus body 14, as shown in FIG. 2, an upper drawer 50 for directing the process cartridge B into the apparatus body 14 can be shifted within the apparatus body 14. When the upper drawer 50 is drawn, as shown in FIGS. 14 to 18, shaft coupling members 23 of the process cartridge B are guided along guide surfaces 51 provided on both side walls of the upper drawer 50. And, as shown in FIG. 17, cylindrical positioning hold portions 11h (concentric with the center of the photosensitive drum 1 and align with the shaft coupling member 23 in an axial direction) of the process cartridge B are housed in U-shaped recesses 52 of the upper drawer 50. By rocking the cartridge around the U-shaped recesses 52 in a direction shown by the arrow 53, the cartridge is mounted to the upper drawer 50 as shown in FIG. 18.

Then, when the upper drawer 50 is inserted into the image forming apparatus A, the image formation permitting condition as shown in FIG. 1 can be obtained.

The mounting and dismounting of the intermediate transfer unit 5 with respect to the apparatus body 14 is effected through the drawer.

The mounting and dismounting of the process cartridge B and the intermediate transfer unit 5 with respect to the apparatus body 14 will be further described later.

<Frames of Process Cartridge>

Figure 3:
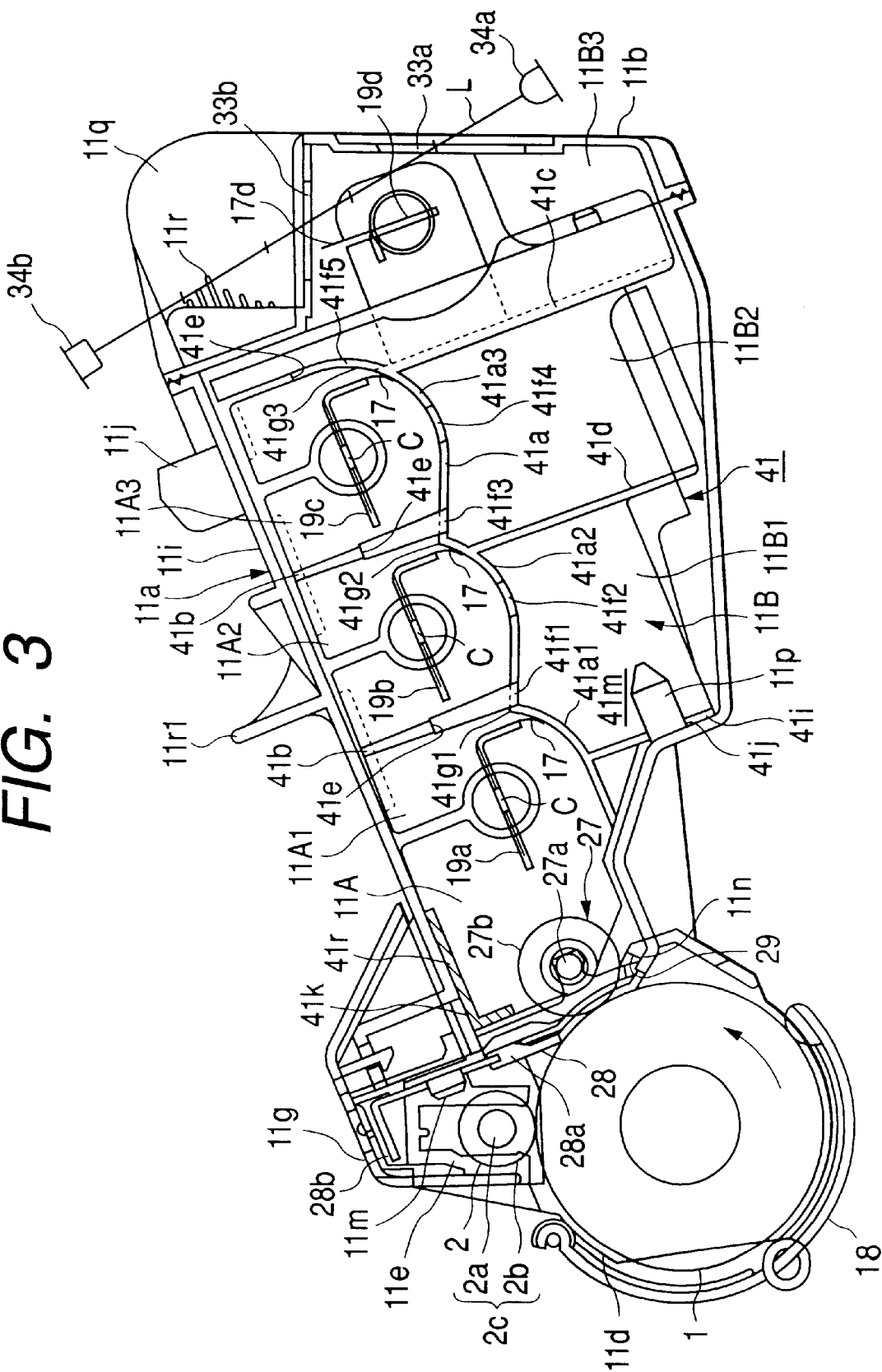
FIG. 3 is an elevational sectional view of the process cartridge.
Figure 6:
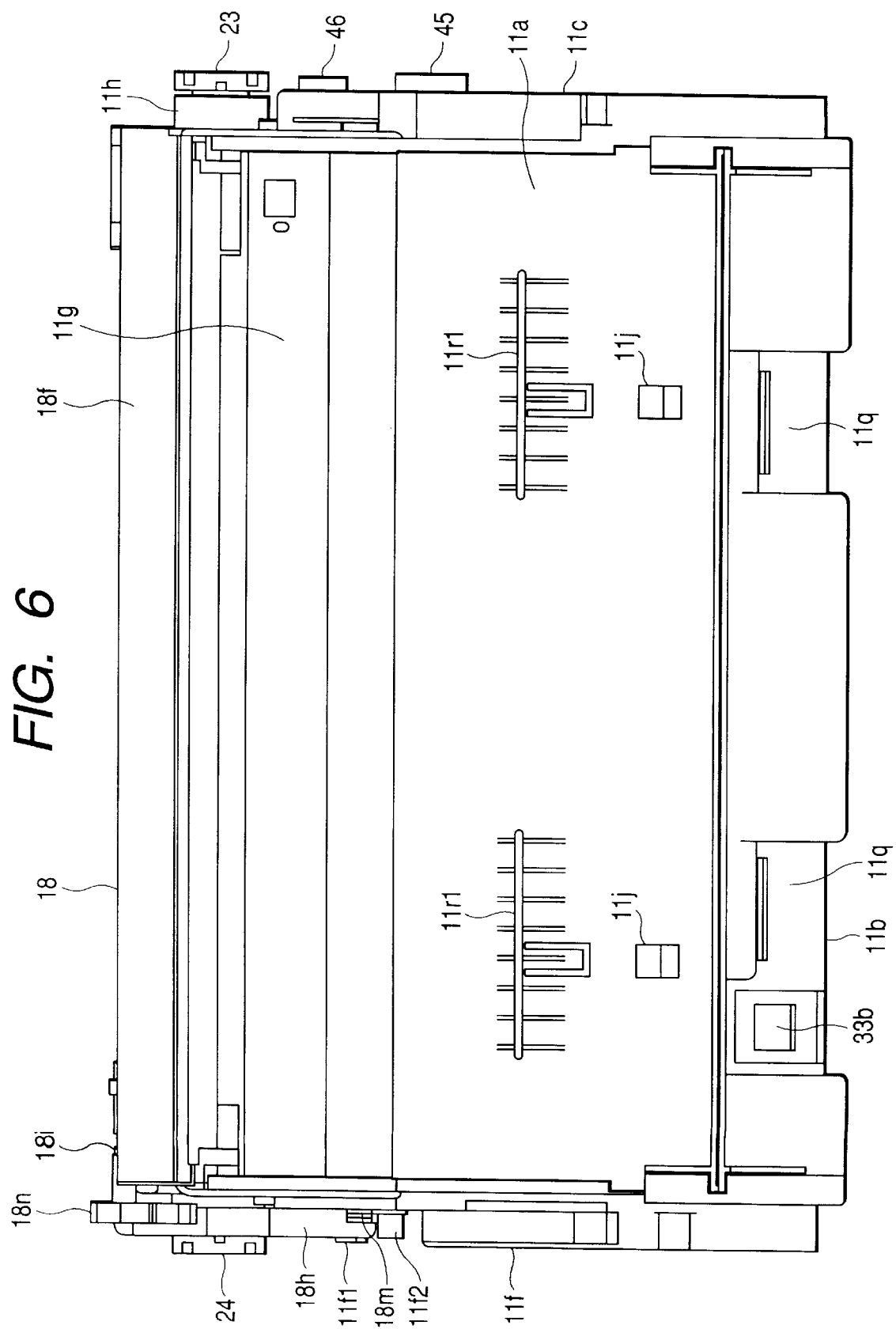
FIG. 6 is a plan view of the process cartridge of FIG. 3.
Figure 7:
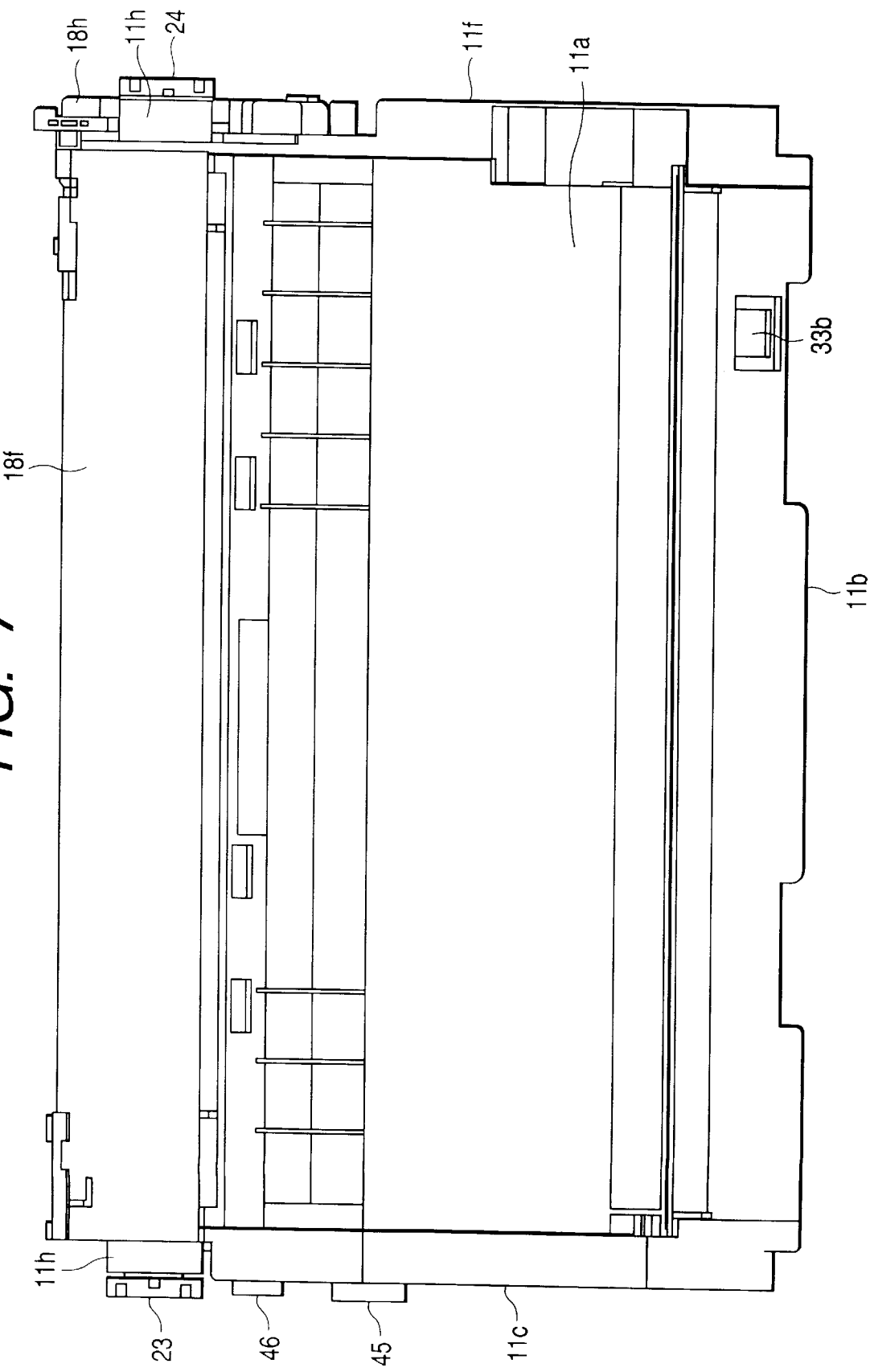
FIG. 7 is a bottom view of the process cartridge of FIG. 3.
Figure 8:
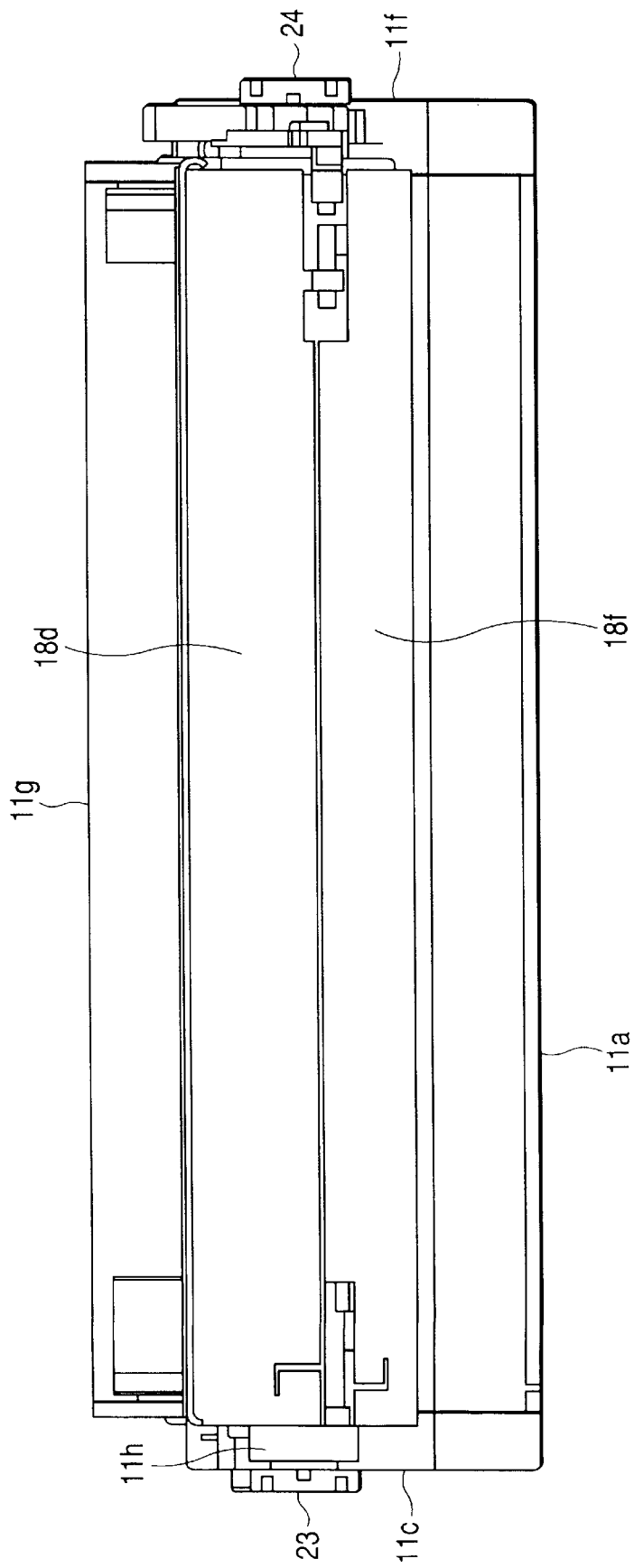
FIG. 8 is a front view of the process cartridge of FIG. 3.
Figure 9:
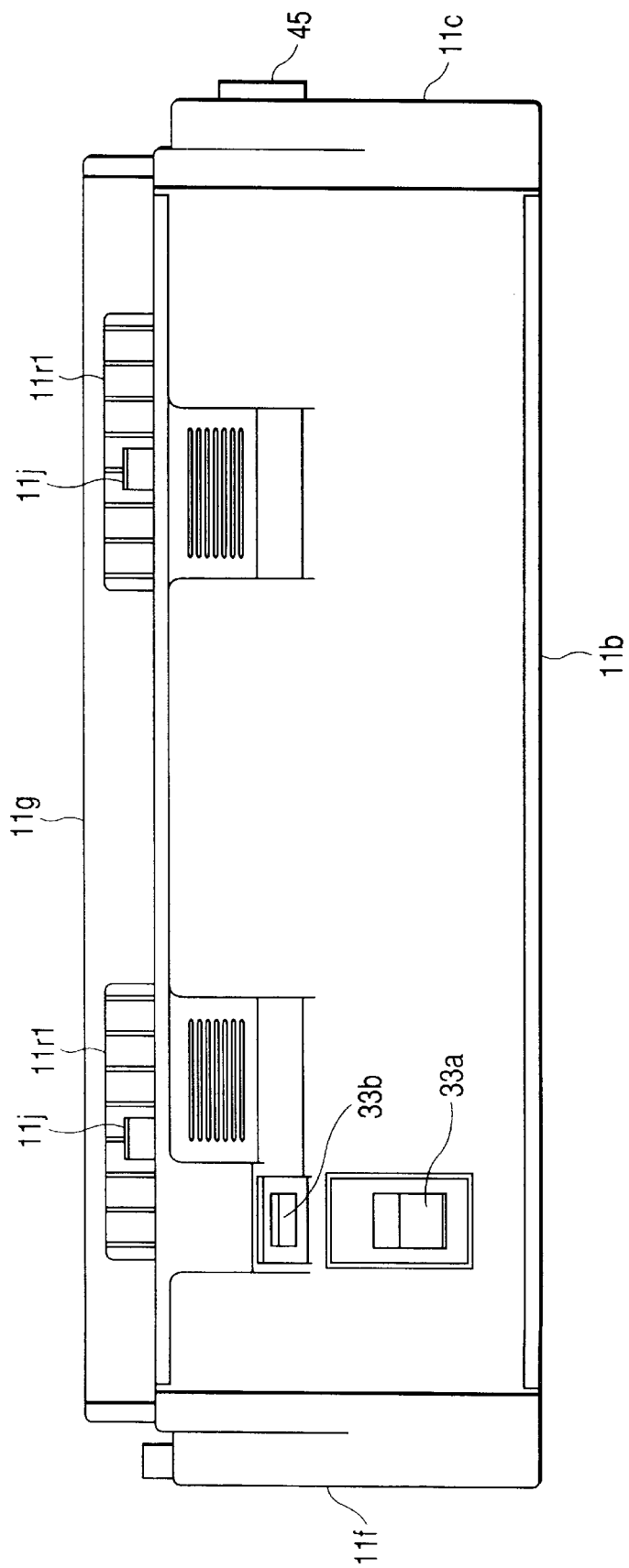
FIG. 9 is a back view of the process cartridge of FIG. 3.

As shown in FIG. 3, a cartridge frame 11 of the process cartridge B includes a cleaning container 11a having drum support portions 11d extending toward both longitudinal ends of the photosensitive drum 1 and the charge device 2, a cleaning member attaching portion 11m and a charge device supporting portion 11e, and a rear container 11b jointed to a rear end portion of the cleaning container 11a by supersonic welding. As shown in FIG. 6, regarding the cleaning container 11a and the rear container 11b, a gear cover (one side cover) 11c is secured at a longitudinal drive side, and a side cover 11f is secured at a longitudinal driven side. Further, a charge device cover 11g for covering the longitudinal direction and both ends of the charge device 2 is attached to the cleaning container 11a.

The cleaning container 11a is provided with a drum shutter 18 for protecting the photosensitive drum 1 from external light and operator's contact when the photosensitive drum 1 is dismounted from the apparatus body 14.

<Process Cartridge>

As shown in FIG. 3, the process cartridge B includes the cartridge frame 11 integrally holding the charge device 2 and the cleaning device around the photosensitive drum 1, which cartridge frame can be detachably mounted to the upper drawer 50.

As shown in FIGS. 20 and 21, the photosensitive drum 1 is rotatably supported on the cleaning container 11a for the cleaning device. The photosensitive drum 1 is secured by fitting drum flanges 1a, 1b into both ends of an aluminium cylinder 1c and by caulking (1m) the flanges to the ends of the aluminium cylinder 1c. Maximum diameter portions of drum support shafts 1d, 1e are press-fitted into central holes of the drum flanges 1a, 1b. The drum support shafts 1d, 1e are rotatably supported by a ball bearing 21 and a synthetic resin bushing 22 secured by the gear cover 11c and the side cover 11f not to be shifted in the axial direction.

In order to mount the process cartridge B to the apparatus body 14, the cleaning container 11a is provided with the cylindrical positioning hold portions 11h integral with the gear cover 11c and the side cover 11f. A rotation preventing member 11i is integrally formed with an upper surface 11i of the cleaning container 11a (refer to FIGS. 3, 6, 9 to 11, 13 and 15 to 19).

The positioning hold portions 11h are disposed in the vicinity (in the axial direction) of shaft coupling members 23, 24 attached to the drum support shafts 1d, 1e press-fitted into the drum flanges 1a, 1b. The diameters of the positioning hold portions 11h are slightly greater than the diameters of the shaft couplings 23, 24. The positions of longitudinal outer end surfaces of the cylindrical positioning hold portions 11h are the same as or inside of the longitudinal positions of outer plate portions of the gear cover 11c and the side cover 11f. On the other hand, longitudinal positions of the shaft couplings 23, 24 are outside of the longitudinal positions of the outer plate portions. The relation between the outer diameter D1 of the cylindrical positioning hold portions 11h and the outer diameters D2 of the shaft couplings 23, 24 satisfies the relation of D1>D2.

Figure 4:
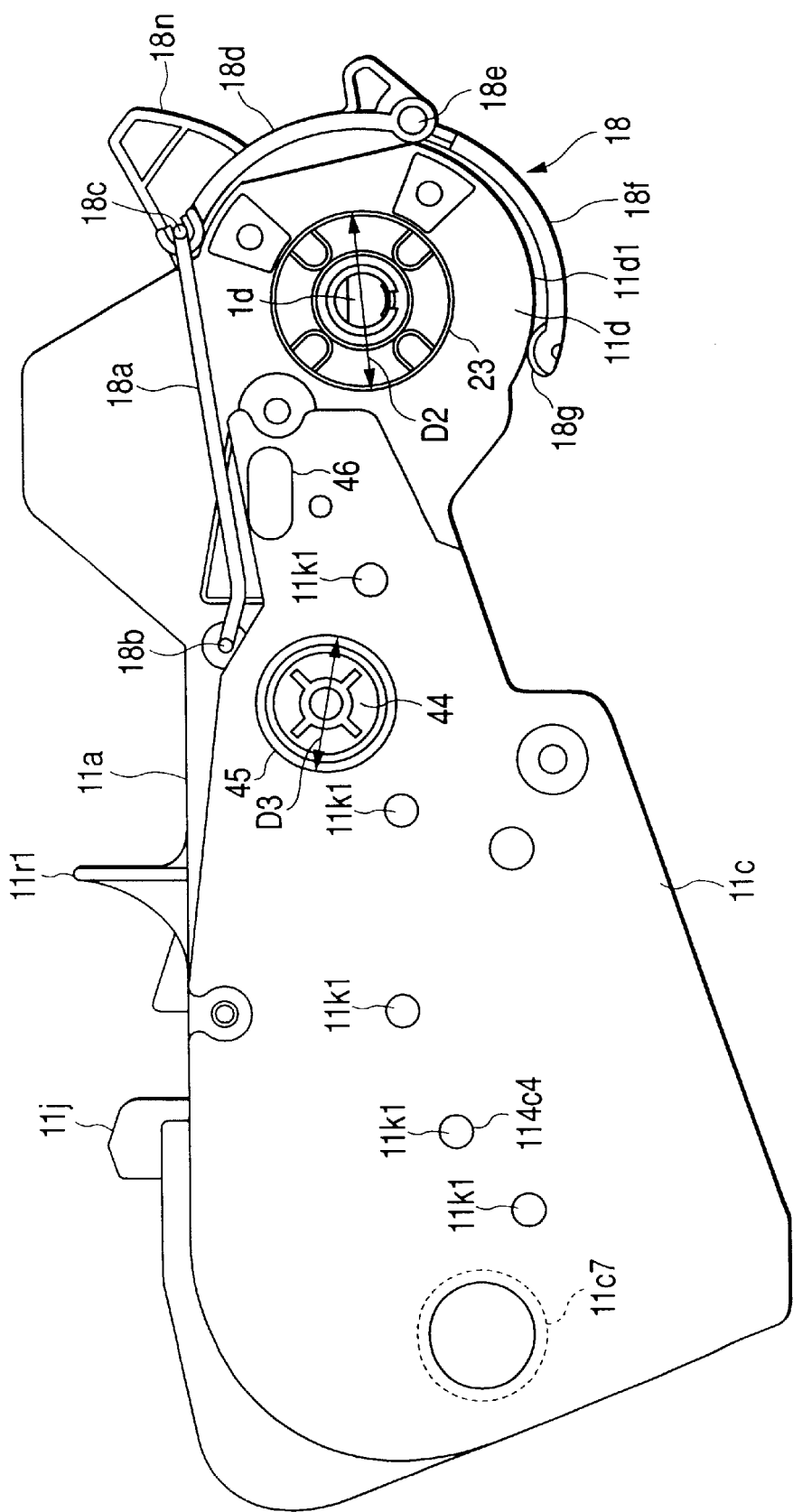
FIG. 4 is a right side view of the process cartridge of FIG. 3.
Figure 10:
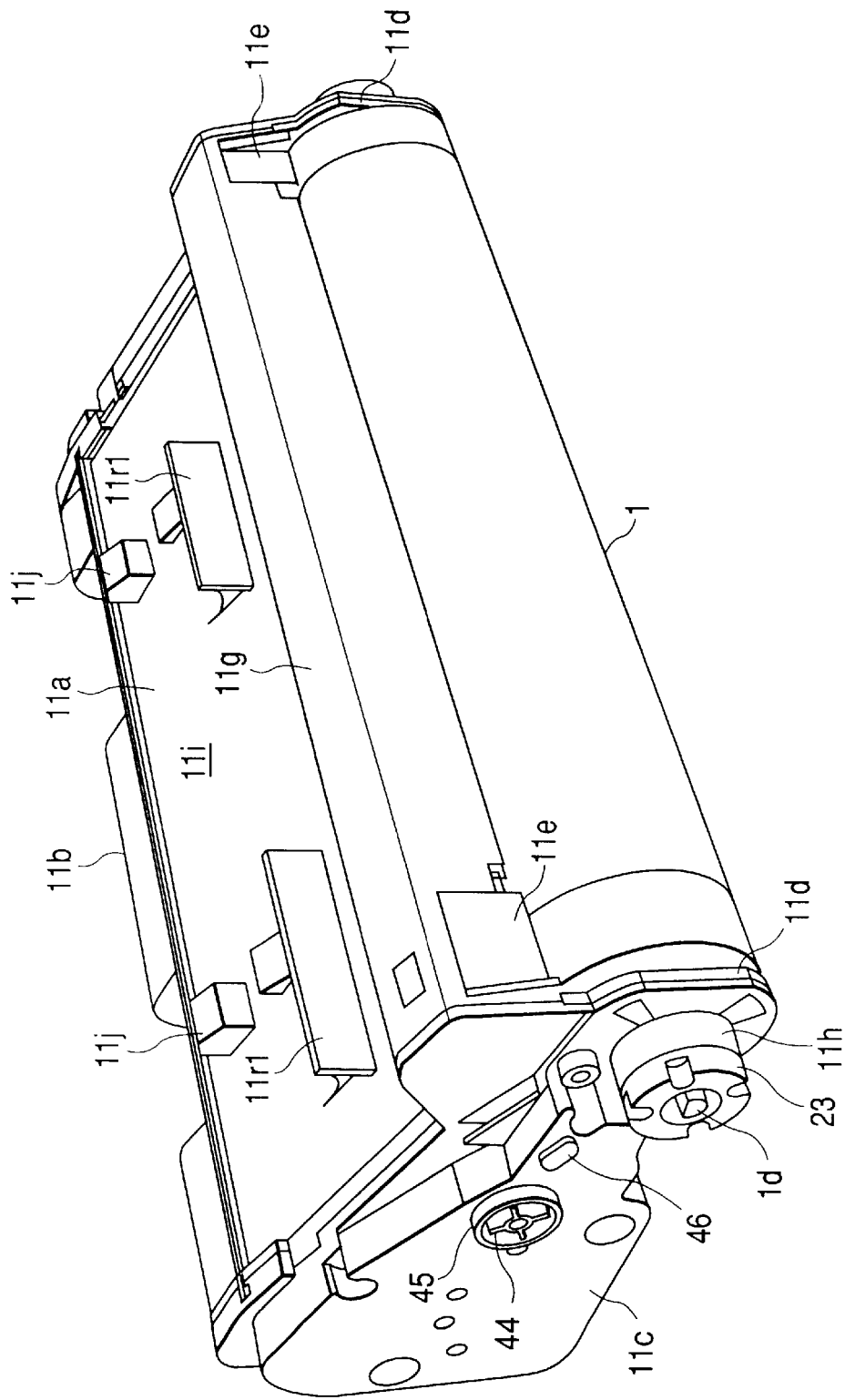
FIG. 10 is a perspective view of the process cartridge of FIG. 3, looked at from a right front direction from the above.

As shown in FIGS. 4 and 10, a waste toner convey system drive input means 44 is disposed at an upstream side of the shaft coupling member 23 in an inserting direction of the process cartridge B. The waste toner convey system drive input means 44 is protected by a second cylindrical boss 45 integral with the gear cover 11c secured to the cleaning container 11a. The longitudinal position of the second cylindrical boss 45 is outside of the outer plate portion of the gear cover 11c and is inside of a longitudinal outermost portion of the shaft coupling 23. The relation between an outer diameter D3 of the second cylindrical boss 45 and the outer diameters D2 of the shaft couplings 23, 24 satisfies the relation of D3<D2.

A rough guide 46 is integrally formed with the gear cover 11c at an upstream side of the shaft couplings 23, 24 and at a downstream side of the second cylindrical boss 45 in the inserting direction. The rough guide 46 is positioned above a line connecting between the center of the shaft coupling 23 and the center of the second cylindrical boss 45. A longitudinal position of the rough guide 46 is outside of the outer plate portion of the gear cover 11c and is inside of the longitudinal outermost portion of the shaft coupling 23.

A rotation preventing member 11j is provided on the upper surface 11i of the cleaning container 11a at an upstream side of the second cylindrical boss 45 in the inserting direction.

<Process Cartridge Mounting Movable Member>

Now, the upper drawer 50 having a drawing mechanism used for mounting the process cartridge will be fully explained with reference to FIGS. 14 and 15.

A pair of left and right symmetrical groove-shaped guide surfaces 51 for inserting the process cartridge B into the upper drawer 50 are provided on inner surfaces 50b of side plate portions 50a of the upper drawer 50. The guide surface 51 at a drive side is provided with a notch 51a aligned with a through hole 50c formed in the side plate portion 50a to transmit the driving force from the apparatus body 14 to the waste toner convey system drive input means 44. An engagement member 54 engaged by the cylindrical positioning hold member 11h is disposed at a downstream side (in the inserting direction) of and longitudinally inside of the guide surface 51. The engagement member has a half pipe shape having an upper opening and including a U-shaped recess 52.

The rear side plate 55 at the most upstream side in the inserting direction is provided with a pressure member 56 for urging or pressurizing at the most upstream (in the inserting direction) rear side surface portion 11d of the cartridge frame 11 of the process cartridge B when the upper drawer 50 is inserted into the apparatus body 14.

The pressure member 56 is an elastic member such as a leaf spring provided on an inner surface of an open/close member (not shown) for opening and closing an opening portion 14b of a rear side surface portion 14a (FIG. 19) of the apparatus body 14, and the upper drawer 50 is provided with an opening portion 56a so that the pressure member 56 can enter into the upper drawer 50 to urge the rear container of the process cartridge B mounted to the upper drawer 50.

Further, the side plate portion 50a of the upper drawer 50 at the driven side is provided with a biasing member 57 for abutting against the side surface portion (side cover 11f) of the process cartridge B from a longitudinal inner side and a longitudinal outer side of the side plate portion 50a to bias the process cartridge B in the longitudinal direction.

Figure 14:
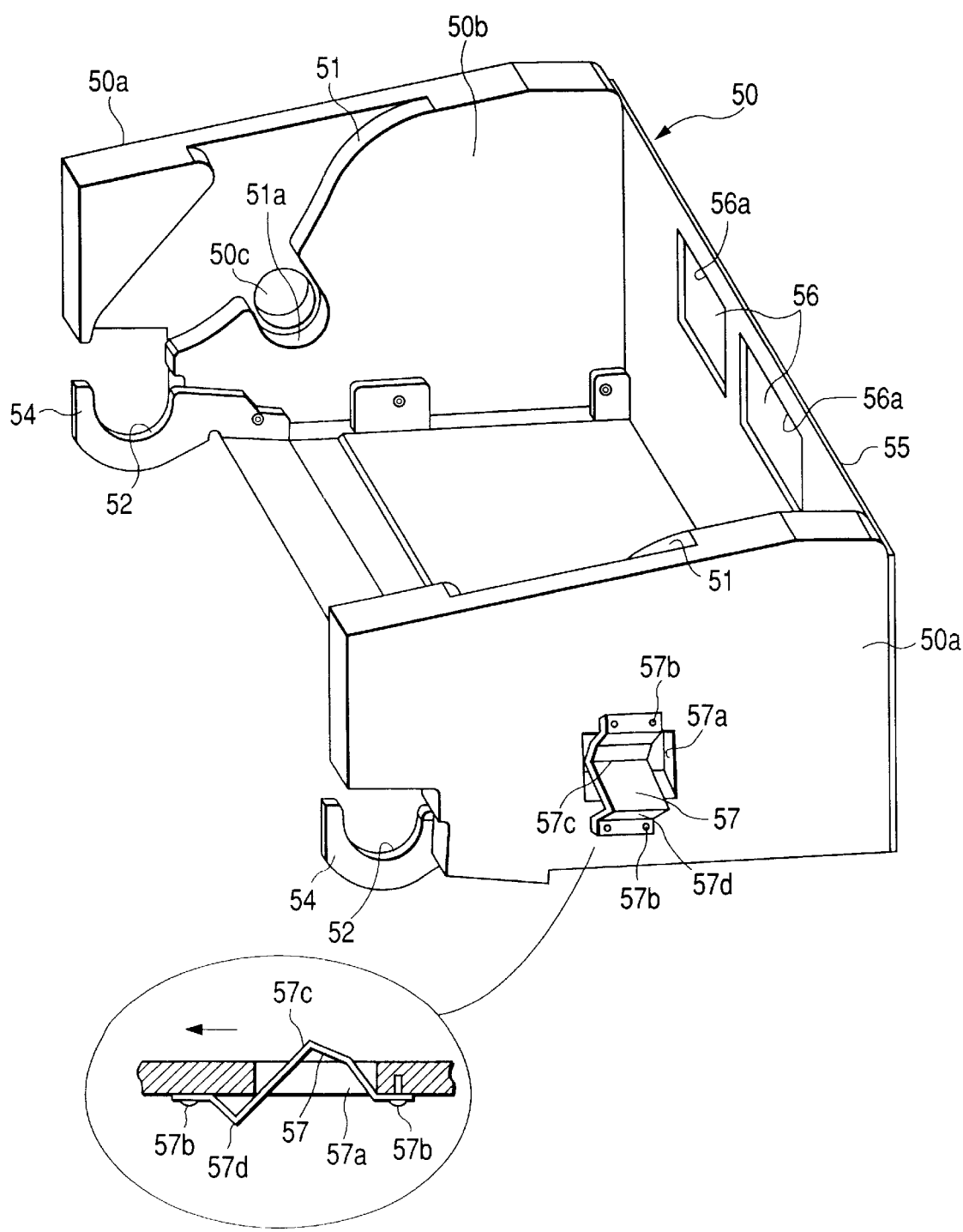
FIG. 14 is a perspective view of the process cartridge, adding a partial sectional view.

The biasing member 57 is a leaf spring and, as shown in FIG. 14, both ends of the biasing member are secured to both upper and lower ends of an opening portion 57a of the side plate portion 50a of the upper drawer 50 by small screws 57b. The biasing member 57 has a substantially crank shaped except for its both ends. One corner 57d of the crank is protruded inwardly from the inner surface of the side plate portion 50a and the other corner 57d of the crank is protruded outwardly from the outer surface of the side plate portion 50a. Accordingly, when the process cartridge B is pushed in a direction shown by the arrow (in the added Figure in FIG. 14), the longitudinal side surface of the process cartridge B elastically contacts the corner 57c of the biasing member 57, with the result that, under the condition that the process cartridge B is mounted to the upper drawer 50, the process cartridge B urges the corner 57c of the leaf spring 57 and the process cartridge B is urged against the inner side surface 50b of the upper drawer 50 at the drive side.

Further, when the upper drawer 50 is inserted into the apparatus body 14, the apparatus body 14 elastically contacts the corner 57d of the leaf spring to urge the upper drawer 50 against the apparatus body 14 and to further urge the process cartridge B against the inner side surface 50b at the drive side. The drive side is a right side when the process cartridge B and the upper drawer 50 are looked at from the above along the mounting or inserting direction, and the shaft coupling member of the apparatus body 14 is positioned at this side.

<Mounting and Dismounting Operation of Process Cartridge to Movable Member>

Now, the mounting and dismounting of the process cartridge B with respect to the upper drawer 50 which constitutes the movable member will be fully described with reference to FIGS. 15 to 18 which are side views of the side plate portion 50a at the drive side.

Figure 15:
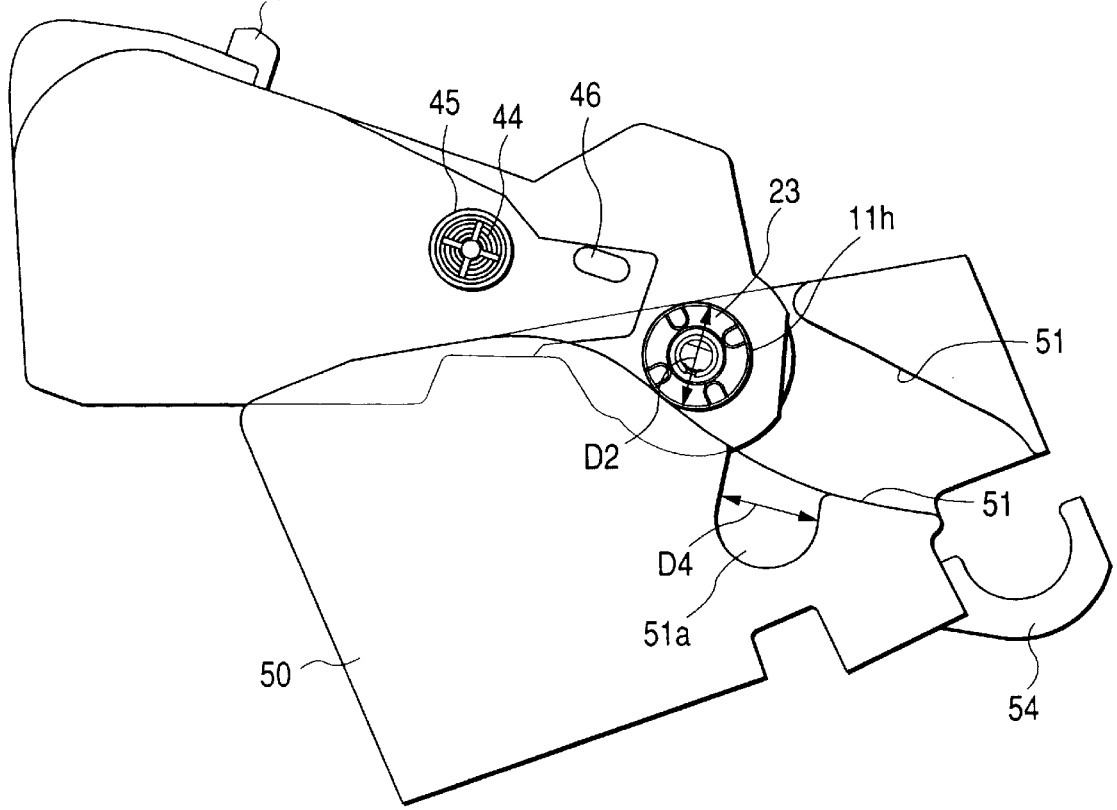
FIGS. 15, 16 and 17 are side views showing mounting of the process cartridge to a cartridge guide.

As shown in FIG. 15, the shaft coupling member 23 is guided toward the inserting direction while resting the outer diameter portion of the shaft coupling member 23 secured to the photosensitive drum 1 on the guide surface 51 of the upper drawer 50. In this case, since a width D4 of the notch 51a of the drive side guide portion is smaller than the outer diameter D2 of the shaft coupling member 23, the shaft coupling member 23 is not dropped into the notch 51a during the inserting operation. And, since the guide surface 51 with which the shaft coupling 24 at the driven side is engaged has no notch, the process cartridge can smoothly be inserted by gripping rear and upper grip portions 11r, 11r1 (FIG. 3) of the process cartridge B by the operator's hand.

Figure 16:
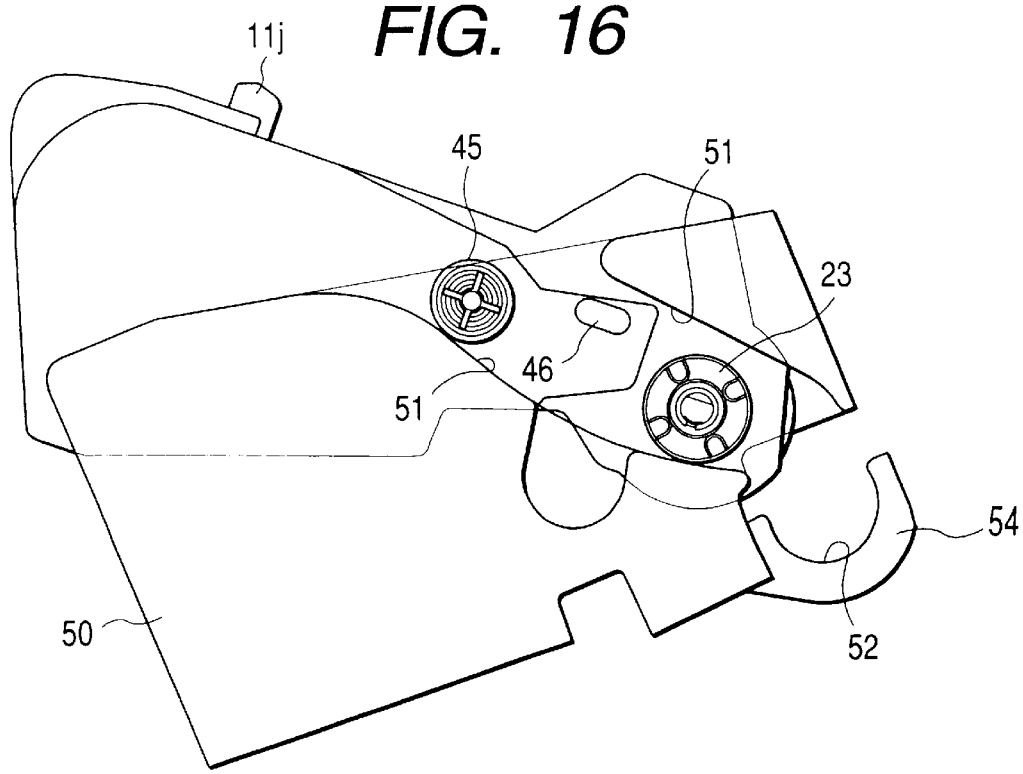

When the process cartridge B is inserted up to a position shown in FIG. 16, the second cylindrical boss 45 and the rough guide 46 are also guided by the guide surface 51. The second cylindrical boss 45 has a rotation preventing function for preventing the rear portion (in the inserting direction) of the process cartridge B from rotating downwardly around the shaft coupling member 23, and the rough guide has a rotation preventing function for preventing the rear portion (in the inserting direction) of the process cartridge B from rotating upwardly around the shaft coupling member 23. Thus, erroneous insertion of the process cartridge B is hard to be caused.

When the process cartridge B is further inserted, as shown in FIG. 17, the shaft coupling member 23 leaves the guide surface 51 and the cylindrical positioning hold portion 11h is engaged by the engagement member 54. As a result, the position of the center of the photosensitive drum 1 of the process cartridge B is positioned with respect to the upper drawer 50. In this case, since the outer diameter of the cylindrical positioning hold portion 11h is greater than the outer diameter of the shaft coupling member 23, the engagement member 54 and the shaft coupling member 23 do not interfere with each other in the longitudinal direction not to affect an influence upon the drive input.

Further, in this case, the second cylindrical boss 45 is engaged by the notch 51a formed in the drive side guide member, thereby preliminarily positioning the posture of the process cartridge B with respect to the upper drawer 50. At this point, the side cover 11f (at the driven side) secured to the cleaning container 11a is biased by the biasing member 57 of the upper drawer 50. As a result, the process cartridge B is biased toward the drive side to abut the drive side gear cover 11c against the inner side surface of the upper drawer 50, thereby positioning the process cartridge B in the longitudinal direction.

In such a case, since the shaft coupling member 23 is positioned at the longitudinal outermost position, the drive input stroke from the apparatus body 14 can be shortened. Further, since the shaft coupling member 23 is guided by the guide surface 51, an additional guide is not required to be provided on the longitudinal side surface portion of the process cartridge B, thereby saving the longitudinal space. When the upper drawer 50 is inserted, since the cylindrical boss 45 and the rough guide 46 (which constitute a second guide portion) are guided by the guide surface 51, these element can be prevented from rotating around the shaft coupling member 23, thereby improving the operability. Since the engagement member 54 of the upper drawer 50 is positioned to be engaged by the cylindrical positioning hold portion 11h positioned inside of the shaft coupling member 23 in the longitudinal direction, a longitudinal dimension of the upper drawer 50 can be reduced.

In the above explanation, while only the drive side was explained, the shaft coupling at the driven side are operated similarly. That is to say, the guide surface 51 with which the shaft coupling member 24 at the driven side is engaged has no notch. And, since the guide surfaces 51 are symmetrical (same shape, same dimension) looked at from the inserting direction of the process cartridge B and since the shaft coupling members 23, 24 have the same diameter and are positioned on the central axis of the photosensitive drum 1, the driven side shaft coupling member 24 is shifted on the guide surface 51 having no notch 51a and is received in the positioning U-shaped recess 52 simultaneously with the shaft coupling member 23. Incidentally, so long as the outer diameter and width of the shaft coupling member 24 are symmetrical with the shaft coupling member 23, since the member 24 does not act as a shaft coupling, the member 24 may be formed from a disc.

<Portions of Apparatus Body Relating to Mounting of Process Cartridge>

Figure 19:
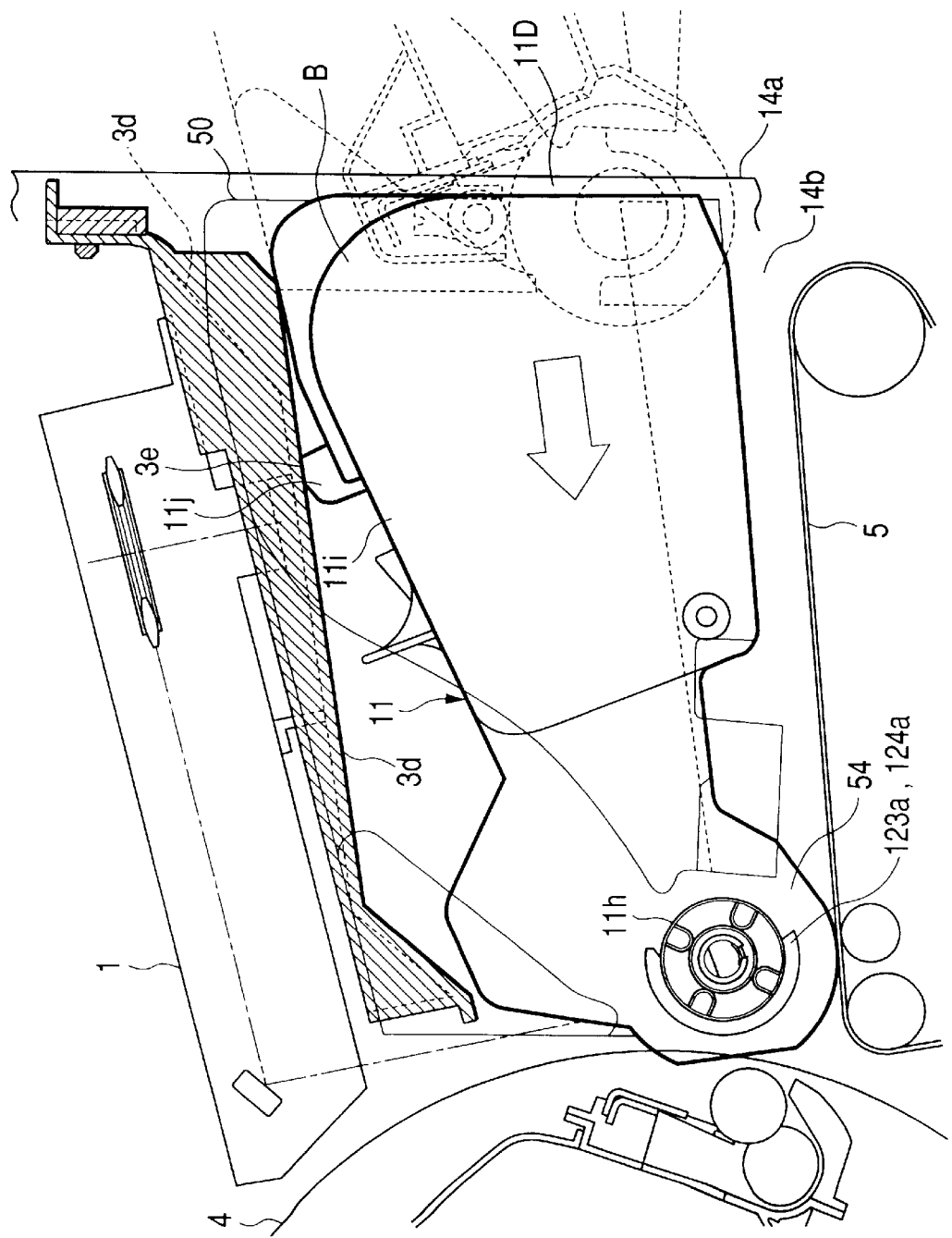
FIG. 19 is a side view showing mounting of the process cartridge housed in the cartridge guide.

Next, portions of the apparatus body relating to the mounting of the process cartridge will be fully described with reference to FIG. 19.

A rear side surface portion 14a (parallel with the longitudinal direction of the photosensitive drum 1 and opposite side from the developing means 4 with respect to the photosensitive drum 1) among the side surfaces of the apparatus body is provided with an opening portion 14b for inserting the upper drawer 50 with the process cartridge B mounted thereon. Rail members (not shown) extending along the inserting direction are provided on both longitudinal side surface portions of the opening portion 14b, which rail members serve to guide members (not shown) provided on both side surface portions of the upper drawer 50. Half pipe-shaped positioning portions 123a, 124a (FIG. 36) opposed in the inserting direction are disposed at positions where they are engaged by the cylindrical positioning hold portions 11h of the cartridge frame 11 of the process cartridge B, when the process cartridge B and the upper drawer 50 are inserted into the predetermined positions within the apparatus body 14. Further, a rotation preventing member 3e for preventing the process cartridge B from rotating around the photosensitive drum 1 is provided as a part of a scanner lower cover 3d.

<Mounting and Dismounting of Movable Member and Process Cartridge with Respect to Apparatus Body>

The upper drawer is drawn from the apparatus body 14 along the rail members (not shown) up to a predetermined position out of the apparatus body 14. After the process cartridge B is mounted to the upper drawer 50, the upper drawer is inserted into the apparatus body 14 by pushing a rear side plate 55 (in the inserting direction) of the upper drawer 50. When the upper drawer 50 is inserted up to the predetermined position, the cylindrical positioning hold portions 11h of the process cartridge B are engaged by the positioning portions 123a, 124a of the pipe-shaped members 123, 124 (opened toward the inserting direction) of the apparatus body. In this condition, the engagement member 54 of the upper drawer and the positioning portion 124a of the apparatus body are positioned adjacent to each other in the longitudinal direction and contact the positioning hold portion 11h. Thus, the position of the process cartridge B with respect to the apparatus body 14 is determined. At this point, the position of process cartridge B in the rotational direction around the photosensitive drum 1 is not determined.

Further, when the upper drawer 50 is inserted up to the predetermined position, the biasing member 57 abuts against a driven side inner wall portion (not shown) of the apparatus body 14 to bias the drawer toward the drive side within the apparatus body 14. In this way, the upper drawer is biased toward the drive side to be urged against a drive side inner wall portion of the apparatus body 14, thereby determining the position of the upper drawer 50 in the longitudinal direction. In this case, since the position of the process cartridge B with respect to the upper drawer 50 in the longitudinal direction is already determined, the position of the process cartridge B with respect to the apparatus body 14 in the longitudinal direction is also determined.

Further, when the upper drawer 50 is inserted up to the predetermined position, the rear side plate 55 (at the upstream side in the inserting direction) of the upper drawer 50 forms a part of the rear side surface portion 14a of the apparatus body 14. When the rear side surface portion 11D (at the upstream side in the inserting direction) of the process cartridge B is urged by the pressure member 56 of the rear side plate 55 (at the upstream side in the inserting direction) of the upper drawer 50 inserted into the apparatus body 14, since the urging direction is offset from the center of the photosensitive drum 1 as shown by the arrow in FIG. 19, the rear portion of the process cartridge B is rotated upwardly around the photosensitive drum 1. Since the rotational direction is the same as a driving direction of the photosensitive drum 1, the rotation preventing member 11j on the upper surface 11i of the process cartridge B abuts against the rotation preventing member 3e of the apparatus body 14, thereby determining the posture of the process cartridge B within the apparats body 14.

In such a case, the positioning portions 123a, 124a of the apparatus body are engaged by the cylindrical positioning hold portions 11h of the process cartridge B, thereby determining the position of the upper drawer 50 engaged by the cylindrical positioning hold portions 11h. Thus, an additional positioning member for determining a position aligned with the axis of the photosensitive drum between the apparatus body 14 and the upper drawer 50 is not required, thereby saving space. Further, since the process cartridge is urged against the drive side of the upper drawer to position the former b using the single biasing member of the upper drawer 50 when the process cartridge B is mounted to the upper drawer 50 and since the upper drawer 50 is urged against the drive side of the apparatus body when the upper drawer 50 is inserted into the apparatus body, the drive input means of the photosensitive drum 1 is biased toward the drive side, thereby ensuring the positive drive input and reducing a drive input stroke to the minimum to simplify the arrangement of the drive input system.

Further, by generating rotational moment (in the same direction as the driving rotational direction of the photosensitive drum 1 around the drive side input means of the photosensitive drum 1) on the process cartridge B by using the pressure member 56 of the upper drawer 50 to abut the rotation preventing member 11i on the upper surface of the process cartridge against the apparatus body 14, thereby determining the posture of the process cartridge, the positive positioning of the process cartridge B with respect to the apparatus body 14 can be achieved.

In the process cartridge B and the upper drawer 50, since the input means to the photosensitive drum is positioned at the longitudinal outermost position, the drive input stroke from the apparatus body can be reduced. Further, since the input means to the photosensitive drum is guided by the upper drawer, additional guides are not required to be provided on the longitudinal side surface portions of the process cartridge, thereby saving longitudinal space. Since the cylindrical positioning hold portions and the rough guide of the second guide portion are guided by the guide surfaces when the upper drawer is inserted, the rotation around the input means to the photosensitive drum can be regulated to prevent the erroneous insertion, thereby improving operability. Since the engagement member of the upper drawer is arranged to be engaged by the cylindrical positioning hold portion positioned inside of the input means to the photosensitive drum in the longitudinal direction, the longitudinal space of the upper drawer can be saved.

When the process cartridge with the upper drawer is mounted to the apparatus body, since the positioning portion of the apparatus body is engaged by the cylindrical positioning hold portion of the process cartridge, the positioning of the apparatus body with respect to the upper drawer which was already engaged by the cylindrical positioning hold portions is determined. Thus, an additional member for determining the position between the apparatus body and the upper drawer is not required, thereby saving space. Further, since the process cartridge is urged against the drive side of the upper drawer to position the former by using the single biasing member of the upper drawer when the process cartridge is mounted to the upper drawer and since the upper drawer is urged against the drive side of the apparatus body when the upper drawer is inserted into the apparatus body, the drive input means of the photosensitive drum is biased toward the drive side, thereby ensuring the positive drive input and reducing the drive input stroke to a minimum to simplify the arrangement of the drive input system.

Further, by generating a rotational moment (in the same direction as the driving rotational direction of the photosensitive drum around the drive side input means of the photosensitive drum) on the process cartridge by using the pressure member of the upper drawer to abut the rotation preventing member on the upper surface of the process cartridge against the apparatus body, thereby determining the posture of the process cartridge, the positive positioning of the process cartridge with respect to the apparatus body can be achieved.

<Detailed Construction of Process Cartridge>

Now, the process cartridge will be further explained.

The shaft coupling members 23, 24 are fitted on ends of the drum support shafts 1d, 1e. The shaft coupling member 23 is a force receiving member for receiving the rotational force from the apparatus body 14. The shaft coupling member 24 is formed from the same member as the shaft coupling member 23, but does not relate to the drive means of the apparatus body 14 and only acts as a guide member for the process cartridge B to the upper drawer 50. As shown in FIG. 21, the drum support shafts 1d, 1e and the shaft coupling members 23, 24 have fitting portions each having D-cut cross-section, and projections 23a, 24a onto which the D-cut holes of the shaft coupling members 23, 24 are partially fitted are formed in arcuate circumferential grooves 1d1, 1e1 of the drum support shafts 1d, 1e. The projections 23a, 24a are formed on axial protruded pieces 23c, 24cformed by providing axial grooves 23b, 24b.

The charge device 2 is of contact-charging type and comprises a charge roller 2c constituted by a metal shaft 2a supported at its both ends and disposed in parallel with the photosensitive drum 1, and a conductive rubber 2b coated on the metal shaft.

The cleaning device 6 serves to remove residual toner remaining on the photosensitive drum 1 after the toner image developed on the photosensitive drum 1 is transferred to the intermediate transfer belt 5a, and the removed waste toner is collected in the cleaning container 11a. The cleaning container 11a is not filled with the waste toner before the service life of the photosensitive drum is expired, and, accordingly, the cleaning container is exchanged by a new one together with the photosensitive drum the service life of which was expired.

As shown in FIG. 3, the cleaning device 6 has a cleaning roller 27 and a cleaning blade 28 disposed around the photosensitive drum and adjacent to each other in order along the rotational direction of the drum. The cleaning roller 27 is constituted by a cleaning member 27b made of soft material, such as sponge rubber, and coated around a cleaning roller shaft 27a, and the cleaning member 27b is urged against the photosensitive drum 1 substantially along its entire width in parallel with the photosensitive drum. The cleaning roller shaft 27a protrudes from both ends of the cleaning member 27b and the protruded ends of the shaft are connected to journal integrated cleaning roller gears 27c rotatably supported by side plates 11k (FIG. 23) on both sides of the cleaning container 11a in the longitudinal direction.

As shown in FIG. 3, the cleaning blade 28 is formed from a plate member in parallel with the photosensitive drum 1 and comprises a rubber blade 28a urged against the photosensitive drum 1 with a tip end thereof directed in a counter direction with respect to the rotational direction of the drum, and a support metal plate 28b to which the rubber blade 28a is secured by adhesive or welding. The cleaning blade 28 has a length substantially the same as a length of the cleaning member 27b, and the support metal plate 28b has an L-shaped cross-section, and notched portions formed in both ends of the metal plate are fitted on cleaning blade attaching portions 11m protruded from the cleaning container 11a and the metal plate is secured to the cleaning container 11a by small screws (not shown).

A dip sheet 29 is formed from an elastic sheet lightly urged against the photosensitive drum so that, although the residual toner remaining on the photosensitive drum 1 after the transferring can pass through the dip sheet, the residual toner does not leak from the cleaning container 11a through between the dip sheet 29 and the photosensitive drum 1.

As mentioned above, the cleaning container 11a has the rear container 11b at its rear end in the inserting direction (of the process cartridge) to the apparatus body 14 and is constituted as a closed container having an opening portion 11n opposed to the photosensitive drum 1. The interior of the cleaning container is divided into plural chambers by cleaning container partition members 41. More specifically, the interior is divided by a toner convey partition member 41a into a toner convey portion 11A which is positioned at an upper side when the process cartridge B is mounted to the apparatus body 14, and a toner containing portion 11B which is positioned below the toner convey portion when the process cartridge is mounted to the apparatus body. Under the condition that the process cartridge B is mounted to the apparatus body 14, the toner convey partition member 41a is arranged so that the partition member is inclined upwardly as it is separated from the photosensitive drum 1 (FIG. 3).

The toner convey portion 11A is divided by toner convey partition members 41b into a first toner convey portion 11A1, a second toner convey portion 11A2, and a third toner convey portion 11A3, and a space between a rear side plate 41c of the cleaning container partition member 41 and the rear container forms a part of the toner containing portion 11B. The toner containing portion 11B partitioned by a toner containing portion partition member 41d. The rear side plate 41c of the cleaning container partition member 41 is substantially a toner containing portion partition member. The toner containing portion 11B is divided into first, second and third toner containing portions 11B1, 11B2, 11B3 by the toner containing portion partition member 41d and the rear side plate 41c.

The toner convey portions 11A1, 11A2, 11A3 include therein rotary plates (toner feed members) 19a, 19b, 19c, 19d for feeding the toner, and each rotary plate can be rotated in a counter-clockwise direction around an axis C.

The rotary plates 19 (19a, 19b, 19c, 19d) are rotatably supported at their both ends. The rotary plates 19a, 19b, 19c are provided at their edges with feed vanes 17 formed from flexible sheets having a thickness of about 50 μm. The first toner convey portion 11A1 has an arcuate portion 41a1 including a right and lower quarter arc surfaces and second and third toner convey portions 11A2, 11A3 have arcuate portions 41a2, 41a3 including rear and lower quarter arc surfaces, so that the vanes 17 are flexed to be slidingly contact the toner convey partition member 41a when the rotary plates 19 (19a, 19b, 19c) are rotated.

Centers of the rotary plates (toner feed members) 19a, 19b, 19c are gradually elevated as they are separated from the photosensitive drum 1. Between the toner convey portions 11A1, 11A2 and 11A3, convey openings 41e are formed in the toner convey partition members 41b at lower portions thereof to permit the toner convey portions 11A to communicate with each other. Containing openings 41f1, 41f2, 41f3, 41f4 and 41f5 are formed in the toner convey partition member 41a to communicate the toner convey portion 11A with the toner containing portion 11B (FIG. 3).

The containing opening 41f1 is positioned at a rear side of an elevated edge line 41g1 (end of the arcuate portion 41a1 immediately below the convey opening 41e) of the toner convey partition member 41a at the convey opening 41e between the first and second toner convey portions 11A1 and 11A2 when the rotary plate 19a is rotated in a counter-clockwise direction, so that the waste toner discharged into the first toner convey portion 11A1 is firstly fed through the containing opening 41f1 of the toner convey portion 11A1 to the first toner containing portion 11B1.

The containing openings 41f2, 41f4 in the second and third toner convey portions 11A2, 11A3 are provided in lowermost portions of the arcuate portions 41a2, 41a3 and are communicated with the first and second toner containing portions 11B1, 11B2, respectively. The containing opening 41f3 formed in the second toner convey portion 11A2 is opened to a front side of the toner containing portion 11B2 and this opening is opened at the rear side of an elevated edge line 41g2 of the toner convey partition member 41a between the second and third toner convey portions 11A2 and 11A3.

The containing opening 41f5 of the third toner convey portion 11A3 is positioned at a position where the waste toner is fed to the third toner containing portion 11B3 when the rotary plate 19c is rotated in a counter-clockwise direction to cause the vane 17 to lift the waste toner up to an edge line 41g3 along the arcuate portion 41a3.

Longitudinal both ends of the toner convey partition member 41a, the toner convey partition member 41b, the rear side plate 41c, the toner containing partition member 41d (which was explained with reference to FIG. 3) and an upper surface portion 41r (described later) are integrally joined by side plates 41m disposed along the left and right side plates of the cartridge frame 11, thereby constituting the cleaning container partition members 41.

As shown in FIG. 3, an attachment plate 41i disposed in parallel with the toner containing partition member 41d is provided at a front side, and a positioning hole 41j formed in the attachment plate 41i can be fitted onto a tapered positioning projection 11p integrally formed with the cleaning container 11a up to the root of the projection. A snap-fit positioning portion 41k formed on the upper surface of the cleaning container partition member 41 is engaged by an inner side of the front end of the upper surface 11i of the cleaning container 11a, as shown in FIG. 3.

The rotary plate 19*d* is housed in the rear container 11*b* and can be rotated in a clockwise direction in FIG. 3. A flexible vane 17*d* of the rotary plate 19*d* abuts against a light permeable opening 33*a* and is slid on an inner surface of the light permeable opening 33*a* while being flexed, thereby providing a light path L for detecting the full loading of the waste toner passing through the light permeable opening 33*a*. The vane 17*d* and the vanes 17 extend between the longitudinal both side plates 41*m* of the cleaning container partition member 41.

A lamp 34*a* and a light detecting element 34*b* for receiving light emitted from the lamp 34*a* are secured to the apparatus body 14, and light permeable openings 33*a*, 33*b* are provided in the light path L through which the light passes. The light permeable openings 33*a*, 33*b* are formed by providing angled protruded wall surfaces between one of two recessed portions 11*q* (provided in the rear container 11*b* in a spaced relation along the longitudinal direction and having grip portions 11*r*) and a rear wall surface of the rear container 11*b* with the grip portion 11*r* removed and by fitting synthetic transparent members into the wall surfaces.

As apparent from the above explanation, the light permeable openings 33*a*, 33*b* are disposed at a downstream side of the toner container 11*a* in a waste toner conveying direction.

As the amount of the waste toner contained in the toner containing portion 11B3 is gradually increased, if the rotary plate 19*d* is rotated, the light permeable openings 33*a*, 33*b* are ultimately covered by the waste toner to block the light path L. As a result, a photo-electrically converted H active (level) signal which was generated by receiving the light emitted from the lamp 34*a* by means of the light detecting element 34*b* disappears to generate an L active (level) signal alternatively. When the L active signal is received by an engine controller of the apparatus body 14, the engine controller emits a warning signal informing one of the full loading of the waste toner in the cleaning container 11*a* of the process cartridge B.

The photosensitive drum 1, the cleaning roller 27 and the rotary plates 19 are rotated simultaneously when they receive the driving forces. Although the driving is device will be explained later, now, the operation of the cleaning device 6 will be described.

<Operation of Cleaning Device>

The cleaning device 6 includes the cleaning roller 27 and the cleaning blade 28 which serve to collect the residual toner remaining on the photosensitive drum 1 after the transferring into the cleaning container 11*a* as the waste toner.

The cleaning roller 27 is rotated in the counter-clockwise direction in FIG. 3 the same as the rotational direction of the photosensitive drum 1 so that a portion of the cleaning roller 27 contacting the photosensitive drum is shifted to a direction opposite to the photosensitive drum to slidingly contact with the photosensitive drum, thereby removing the residual toner from the photosensitive drum 1. The removed toner is flying toward the rear side (direction separating from the photosensitive drum 1) of the first toner convey portion 11A1 as the waste toner. The waste toner is dropped onto the vicinity of the opening portion 11*n* of the first toner convey portion 11A1 open to the photosensitive drum 1 in the cleaning container 11*a* and onto the toner convey partition member 41*a*. The toner accumulated in the vicinity of the opening portion 11*n* does not leak through between the dip sheet 29 and the photosensitive drum 1 by the action of the dip sheet 29. The waste toner accumulated on the toner convey partition member 41*a* of the first toner convey portion 11A1 tries to advance toward the second toner convey portion 11A2 by the action of the vane 17 of the first rotary plate 19*a*. When the toner is lifted to the edge line 41*g*1 and exceeds the edge line 41*g*1 to reach the containing opening 41*f*1, the toner is dropped from the containing opening 41*f*1 onto the front side of the first toner containing portion 11B1 in the waste toner conveying direction and is accumulated there.

In this case, a small amount of waste toner is sent to the second convey portion 11A2 due to the rotating action of the rotary plate 19*a* and the elastic returning force of the vane 17 passed through the edge line 41*g*1. Since the toner convey partition member 41*a* of the second toner convey portion 11A2 is lowered from the edge line 41*g*1 to the containing opening 41*f*2, the waste toner advances toward the containing opening 41*f*2. If the waste toner tries to be accumulated on the way, since feed vane 17 of the second rotary plate 19*b* is rotated to reach the waste toner, the waste toner is fed into the containing opening 41*f*2, thereby dropping the waste toner into the first toner containing portion 11B1 through the containing opening 41*f*2.

Thus, in the toner containing portion 11B1, the waste toner discharged preferentially through the containing opening 41*f*1 is accumulated as a mountain having a top situated immediately below the containing opening 41*f*1. After the top of the mountain reaches the containing opening 41*f*1 to fill the containing opening 41*f*1 with the waste toner, all of the waste toner discharged in the first toner convey portion 11A1 is sent into the second toner convey portion 11A2 through the convey opening 41*e*, and the waste toner is fed from the containing opening 41*f*2 to a vacant space in the first toner containing portion 11B1. When the first toner containing portion 11B1 is filled with the waste toner, the containing opening 41*f*2 is closed or blocked. Thus, the waste toner is sent to the second toner convey portion 11A2 through the first toner convey portion 11A1.

In this case, the waste toner is lifted, by the vane 17 of the rotary plate 19*b*, toward the edge line 41*g*2 at the front side of the convey opening 41*e* between the second and third toner convey portions 11A2 and 11A3, thereby dropping the waste toner from the containing opening 41*f*3 onto a portion of the second toner containing portion 11B2 near the photosensitive drum 1. A small amount of waste toner is sent to the third toner convey portion 11A3 by the action of the rotation of the vane 17 of the rotary plate 19*b* and a returning elastic force of the vane passed through the edge line 41*g*2.

Thus, the waste toner dropped in the second toner containing portion 11B2 cannot be accumulated immediately below the containing opening 41*f*3 as a mountain form, because the containing opening 41*f*3 is positioned near the thenar containing portion partition member 41*d* for isolating the first and second toner containing portions 11B1 and 11B2. Thus, in the second toner containing portion 11B2, the waste toner is accumulated as a deformed mountain in which a top is situated immediately below the containing opening 41*f*3 and a side remote from the photosensitive drum 1 is gently sloped. As the height of the mountain is gradually increased, the top thereof reaches the containing opening 41*f*3 and then the containing opening 41*f*3 is blocked by the waste toner.

Thereafter, all of the waste toner conveyed through the first and second toner convey portions 11A1, 11A2 exceeds the edge line 41*g*2 between the second and third toner convey portions 11A2 and 11A3 and is sent to the third toner convey portion 11A3 through the convey opening 41*e*, and, due to the downwardly inclined surface of the mountain from the edge line 41*g*2 to the containing opening 41*f*3 and the rotation of the vane 17 of the third rotary plate 19*c*, the waste toner is shifted on the toner convey partition member 41a of the third toner convey portion 11A3 from the edge line 41g2 to the containing opening 41f4, thereby dropping the waste toner into the second toner containing portion 11B2 through the containing opening 41f4 disposed at the lowermost position of the partition member 41a.

If the second toner containing portion 11B2 is filled with the waste toner to close the containing opening 41f4, the waste toner sent to the third toner convey portion 11A3 is shifted on the arcuate portion 41a3 of the toner convey partition member 41a from the edge line 41g2 near the photosensitive drum 1 to the containing opening 41f4 by means of the feed vane 17 of the rotary plate 19c, thereby up to the edge line 41g3. The edge line 41g3 defines a lower edge of the containing opening 41f5, and thus, the waste toner lifted to the edge line 41g3 is dropped in the third toner containing portion 11B3. Incidentally, the containing opening 41f5 also serves as the convey opening 41e to feed the waste toner to the third toner containing portion 11B3 and to drop the waste toner.

The waste toner dropped in the third toner convey portion 11B3 is accumulated as a mountain in which a top thereof is situated near the rear side plate 41c and an inclined surface is gently lowered toward the rear side. The inclined surfaces of the accumulated waste toner (as the mountain) are inclined with respect to the horizontal plane in correspondence to angles of repose and constitute flat surfaces. The surfaces of the waste toner are gradually increased or lifted. When the accumulated waste toner contacts the vane 17d of the rotary plate 19d, the waste toner is flying due to the rotational force of the vane 17d, with the result that the waste toner is sent toward the rear side plate 41c. The vane 17d has a great width in a radial direction, and a portion of the light permeable opening 33a corresponding to the light path L is always cleaned by the vane 17d. When the third toner containing portion 11B3 is filled with the waste toner flying toward the rear side plate 41c of the toner containing portion 11B3, the light permeable opening 33a cannot always be cleaned by the vane 17d of the rotary plate 19a, with the result that the light permeable opening 33a is closed by the waste tpmer to block the light path L, thereby displaying the full loading of the waste toner in the process cartridge B on the display of the apparatus body 14.

<Drive Device for Waste Toner Convey Members in Process Cartridge>

Figure 23:
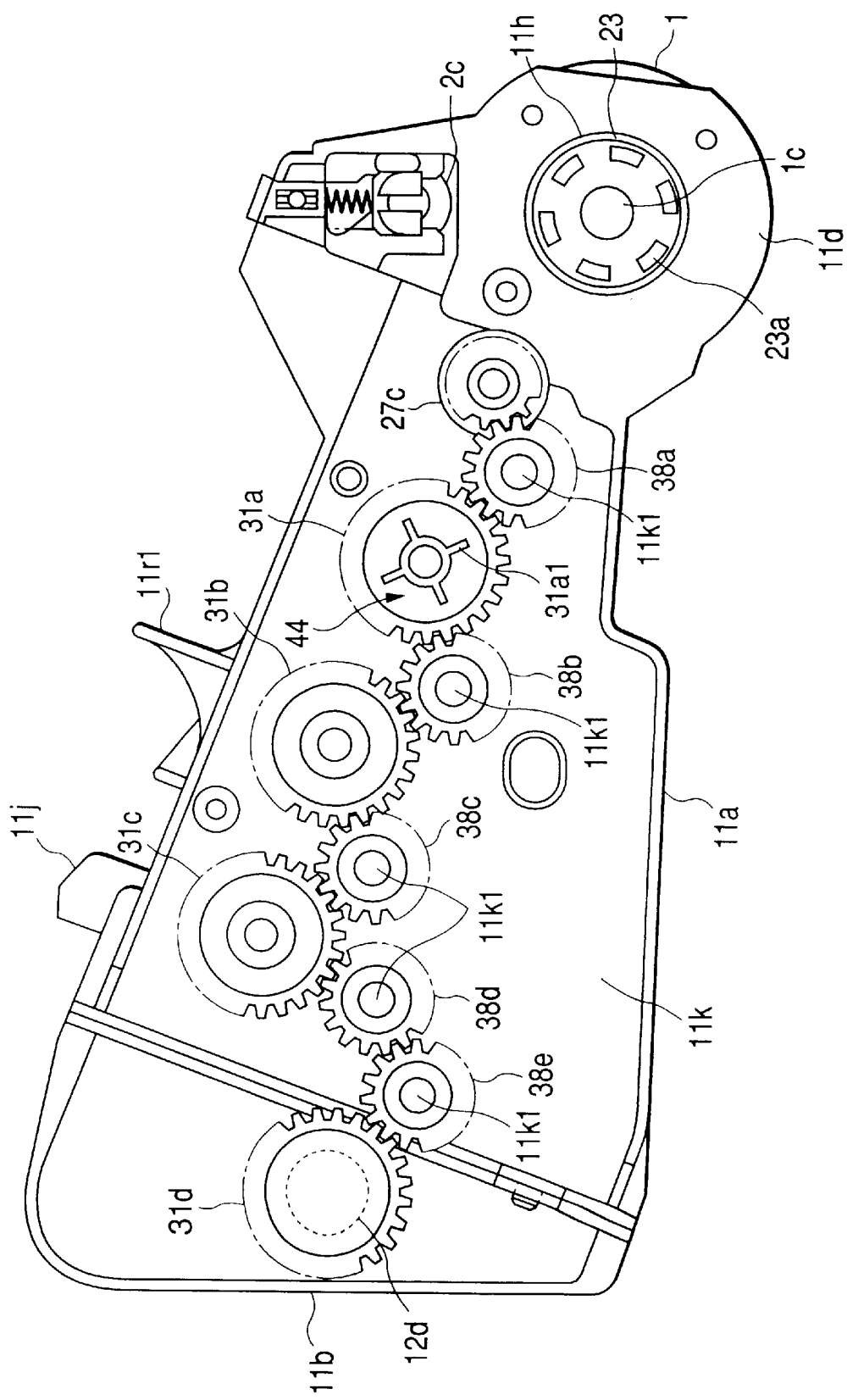
FIG. 23 is a side view showing a drive transmitting device in the process cartridge.

FIG. 23 is a side view showing the process cartridge with the gear cover (drive side cover) 11c omitted.

Figure 22:
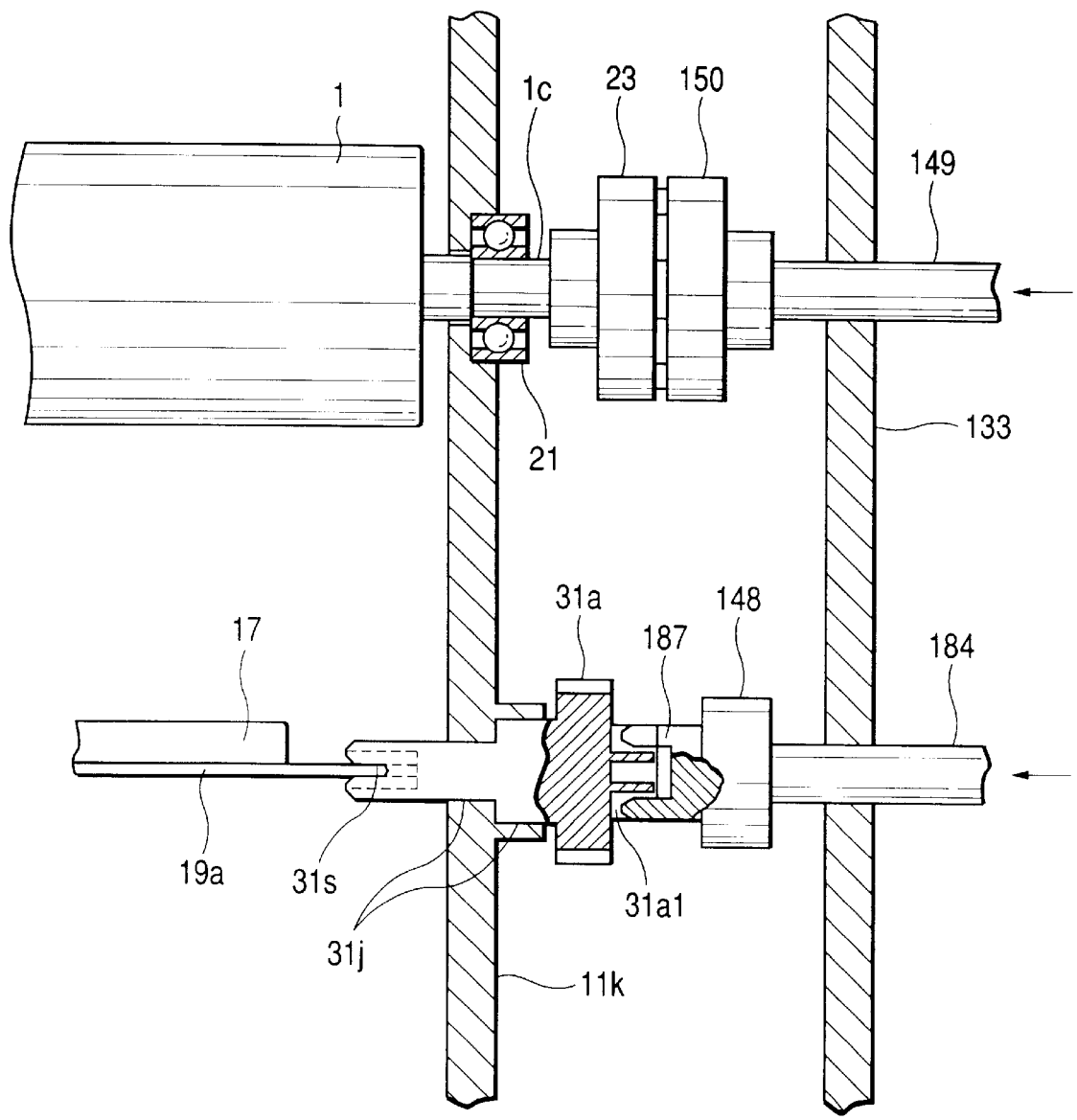
FIG. 22 is a schematic sectional development view showing a drive system from a body of an electrophotographic image forming apparatus to the process cartridge.

As shown in FIG. 22, the shaft coupling member 23 is provided on the drum support shaft 1d of the photosensitive drum 1, and a drive side shaft coupling member 150 is provided in a drive unit 119 of the apparatus body 14 for shifting movement between a position where the shaft coupling member 150 is connected to the shaft coupling member 23 and a position where the shaft coupling member 150 is disengaged from the shaft coupling member 23. The drive side shaft coupling member 150 is secured to a rotation shaft 149, and the rotation shaft 149 is coaxial with the drum support shaft 1d and can be shifted in the axial direction.

The first rotary plate 19a has an end fitted into a slit 31s of a drive gear 31a, and the drive gear 31a has a journal portion 31j rotatably supported by a side plate 11k of the cleaning container 11a. The drive gear 31a is provided at its end surface with a convex clutch 31a1 comprised of a criss-cross radial ribs, and a rotary shaft 184 having a pawl portion 187 of a concave clutch having criss-cross grooves to be fitted onto the ribs of the convex clutch 31a1 is supported by the drive unit 119 of the apparatus body 14 for axial movement and rotational movement. The pawl portion 187 of the concave clutch passes through a through hole 50c communicated with a notch 51a provided in the guide surface 51 of the upper drawer 50 to engage with the convex clutch 31a1. The drive rotary shafts 149, 184 of the apparatus body 14 regarding the drive portion of the photosensitive drum 1 and the waste toner convey system drive input means 44 are biased by springs (not shown) toward directions shown by the arrows in FIG. 22 and can be retarded toward directions opposite to the directions shown by the arrows release means (described later).

As shown in FIG. 23, the drive gear 31a having the convex clutch 31a1 is meshed with a cleaning roller gear 27c via an idler gear 38a and is meshed with a drive gear 31b via an idler gear 38b. The drive gear 31b is meshed with a drive gear 31c via an idler gear 38c. The drive gear 31c is meshed with a drive gear 31d via two inter-engaged idler gears 38d, 38e.

Bosses (not shown) protruded from the rear surface of the gear cover 11c are fitted into central holes of the cleaning roller gear 27c and the drive gears 31b, 31c, respectively, thereby rotatingly supporting the cleaning roller gear 27c and the drive gears 31b, 31c. The idler gears 38a to 38e are rotatably supported in bosses 11k1 protruded from the side plate 11k of the cleaning container 11a, respectively (FIG. 4). The bosses 11k1 are fitted into holes 11c4 formed in the gear cover 11c, respectively. The drive gear 31d, to which the rotary plate 19d having the vane 17d is connected, is rotatably fitted onto a cylindrical hollow boss 11c7 provided on the rear surface of the gear cover 11c.

The drive gear 31a for driving the photosensitive drum 1 and the vanes when the process cartridge with the upper drawer is mounted to the apparatus body 14 receives a driving force from the apparatus body 14 independently by engaging the pawl portions 187 provided of the drive side shaft coupling member 150 and an agitating shaft coupling gear 148 provided on the ends of the rotary shafts 149, 184 with the shaft coupling member 23 and the convex clutch 31a1, respectively.

In the above-mentioned cleaning device 6, regarding the operation in which the residual toner after the transferring (waste toner) removed from the photosensitive drum 1 by the cleaning roller 27 and the cleaning blade 28 is conveyed to the cleaning container 11a and the first to third toner containing portions 11B1 to 11B3 are filled with the waste toner, the rotational force is transmitted from the drive unit 119 of the apparatus body 14 to the agitating shaft coupling member 148, and the convex clutch 31a1 is driven by the pawl portion 187 of the agitating shaft coupling member 148, thereby rotating the drive gear 31a.

As a result, the cleaning roller gear 27c is rotated by the drive gear 31a through the idler gear 38a, thereby rotating the cleaning roller 27 in the same direction of the photosensitive drum 1 during the rotation of the photosensitive drum 1, as mentioned above. On the other hand, the intermeshed drive gear 31a, idler gear 38b, drive gear 31b, idler gear 38c, drive gear 31c, idler gear 38d, and drive gear 31d are rotated simultaneously to rotate the cleaning roller gear 27c and the drive gears 31a to 31c in the same direction, and the drive gear 31d is rotated in the opposite direction to the gears 27c and 31a to 31c.

<Construction of Drum Shutter>

The drum shutter 18 serves to cover the peripheral surface of the photosensitive drum 1 to prevent the photosensitive layer of the photosensitive drum 1 from being damaged and being exposed to external light to cause the photosensitive layer to deteriorate when the process cartridge B is handled out of the apparatus body 14 after the process cartridge is dismounted from the apparatus body. The drum shutter also serves to release the surface of the photosensitive drum 1 to expose the photosensitive drum 1 to the developing means 4 and the intermediate transfer unit 5 when the process cartridge B is mounted to the apparatus body 14.

Figure 5:
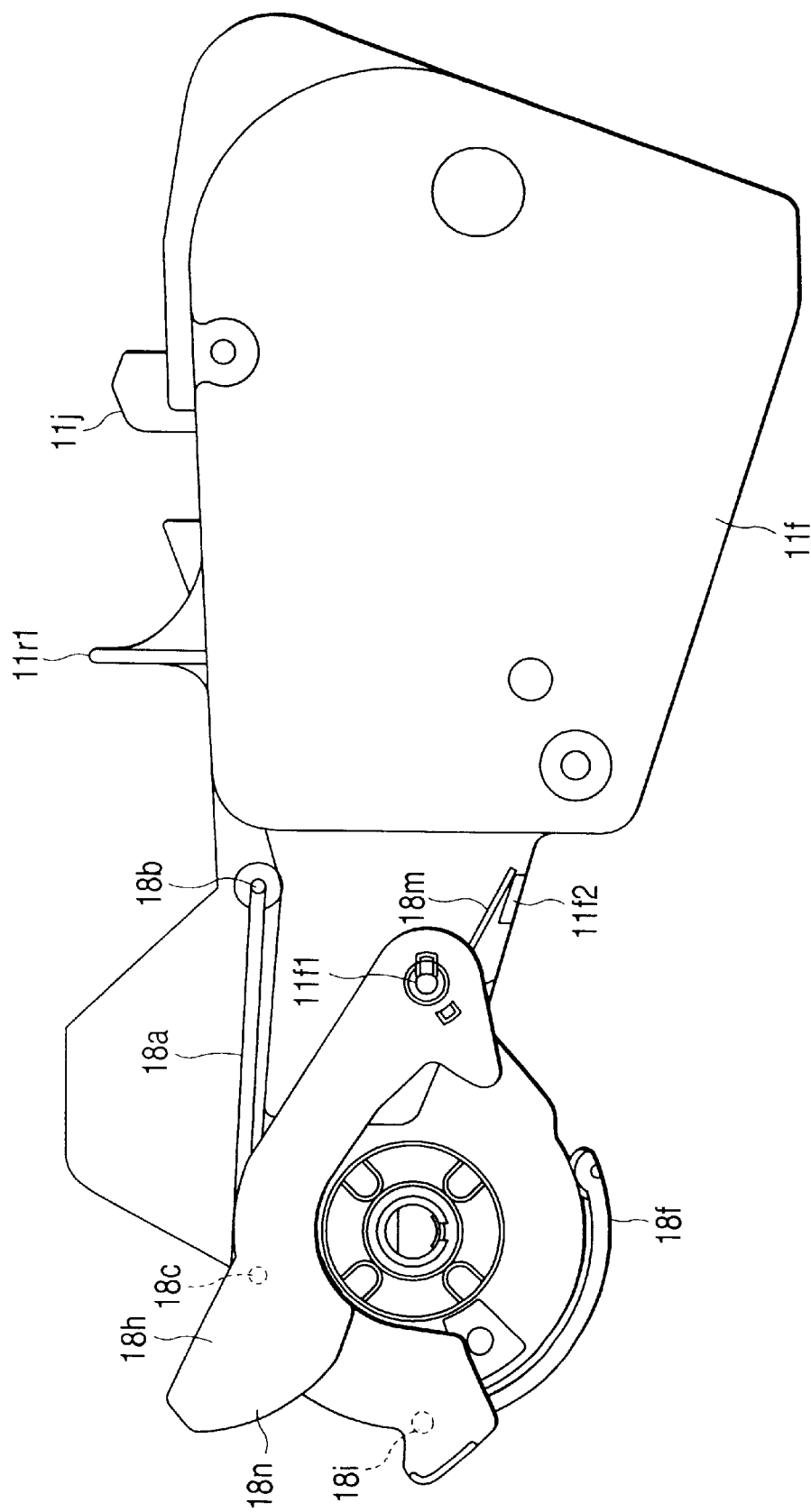
FIG. 5 is a left side view of the process cartridge of FIG. 3.

As shown in FIG. 4 (side view of the drive side) and FIG. 5 (side view of the driven side), a root shaft 18b integral with arms 18a is pivotally connected to the gear cover 11c and the side cover 11f, and tip ends of the arm 18a terminate as a longitudinal single shaft 18c to which a first shutter cover 18d is rotatably attached. A second shutter cover 18f is pivotally connected to the first shutter cover 18d via a pin shaft 18e. Under a condition that the shutter 18 is closed, the first and second shutter covers 18d, 18f have arcuate surfaces concentric with the photosensitive drum 1 and each have a diameter greater than that of the photosensitive drum and cover outer peripheries of both drum support portions 11d. Lower edges 11d1 of the drum support portions 11d have arcuate shapes concentric with the photosensitive drum 1 and front edges have straight shapes. An arcuate shoe 18g is integrally formed with a top end of the second shutter cover 18f to contact with the lower edges 11d1 and outer periphery of ends of the photosensitive drum 1. An operation arm 18h is pivotally connected to a fixed shaft 11f1 integrally formed with the side cover 11f at the driven side, and the operation arm 18h is pivotally connected to a root of the second shutter cover 18f via a shaft 18i concentric with the pin shaft 18e.

Figure 11:
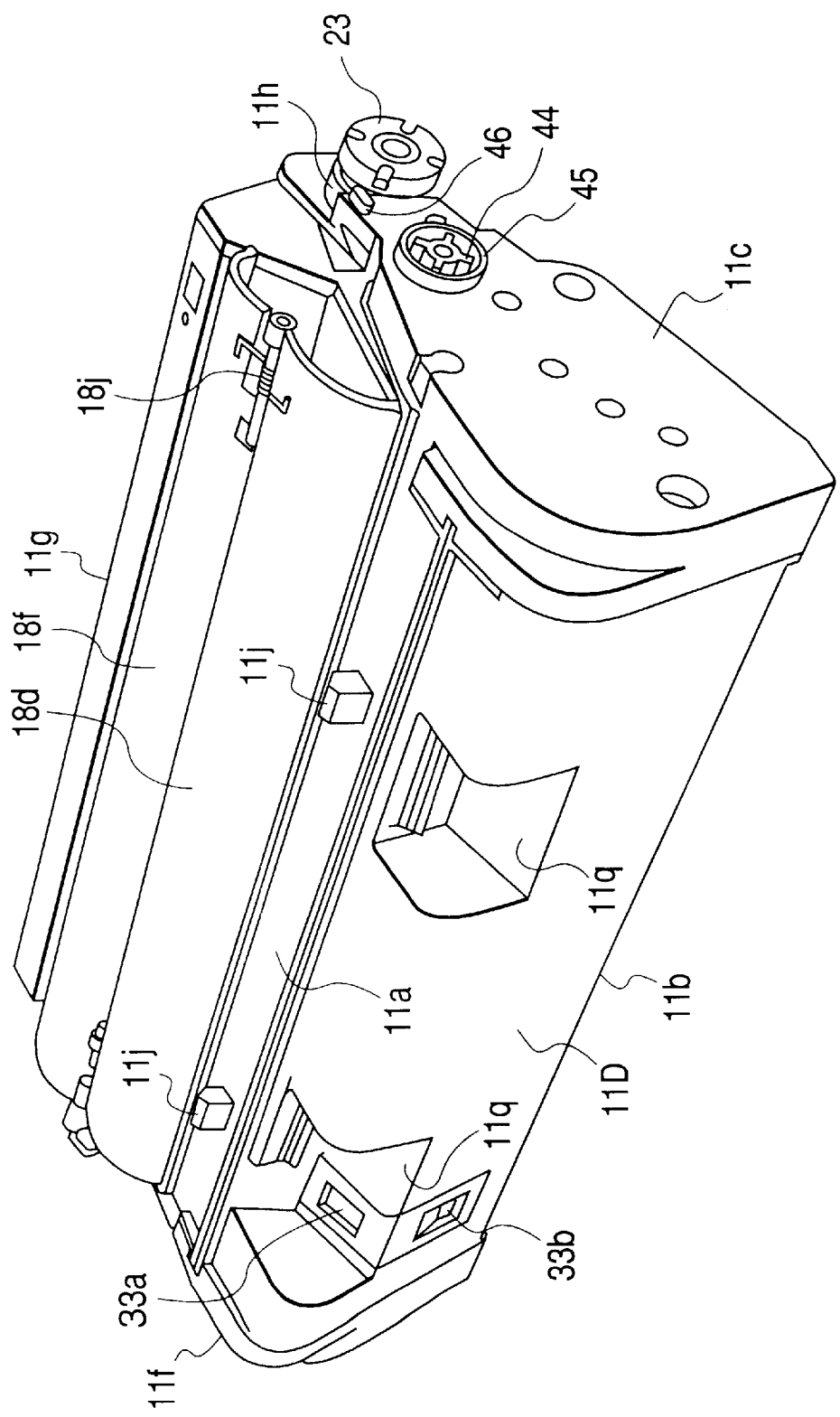
FIG. 11 is a perspective view of the process cartridge of FIG. 3, looked at from a left rear direction from the above.
Figure 12:
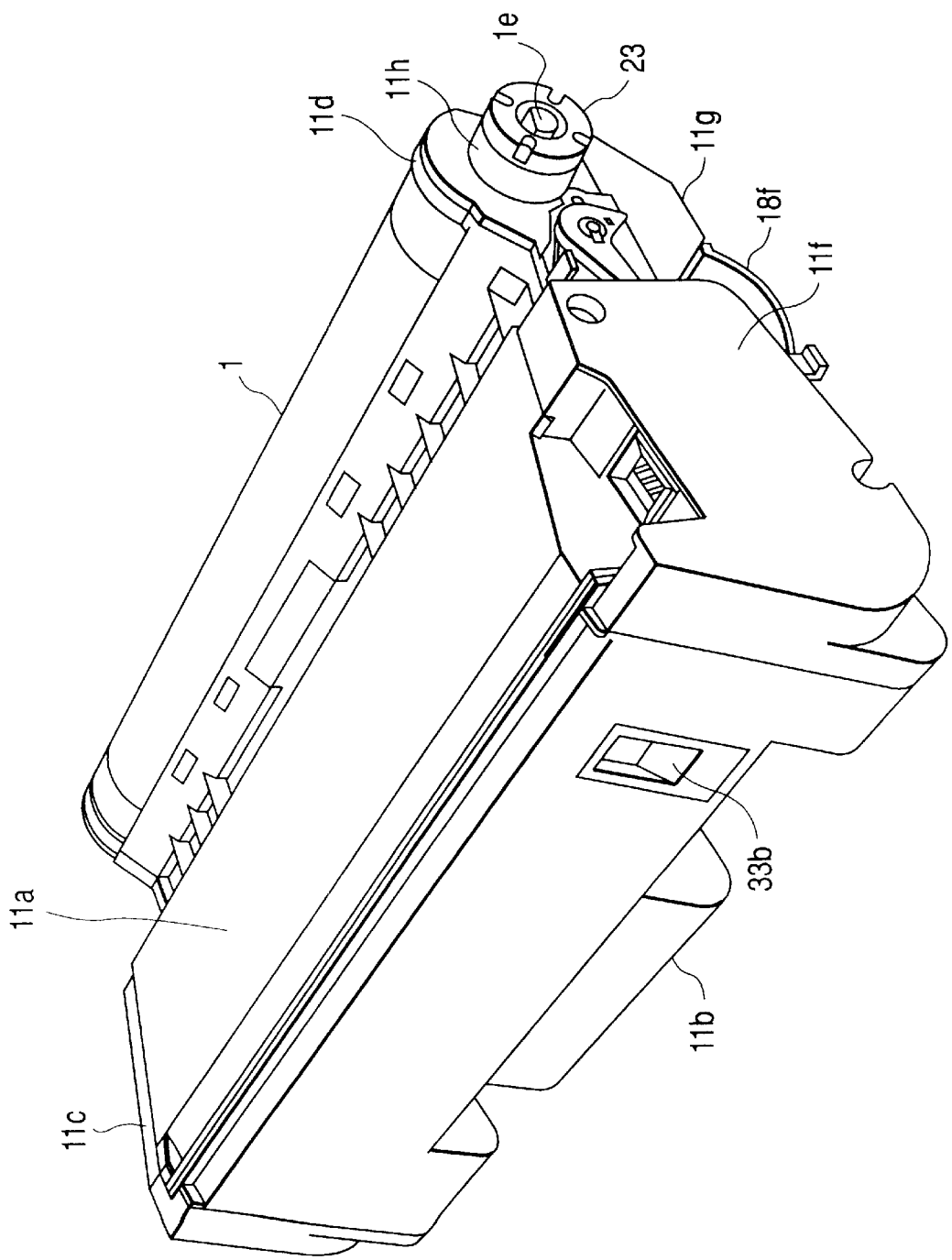
FIG. 12 is a perspective view of the process cartridge of FIG. 3 inverted, looked at from a left rear direction.
Figure 13:
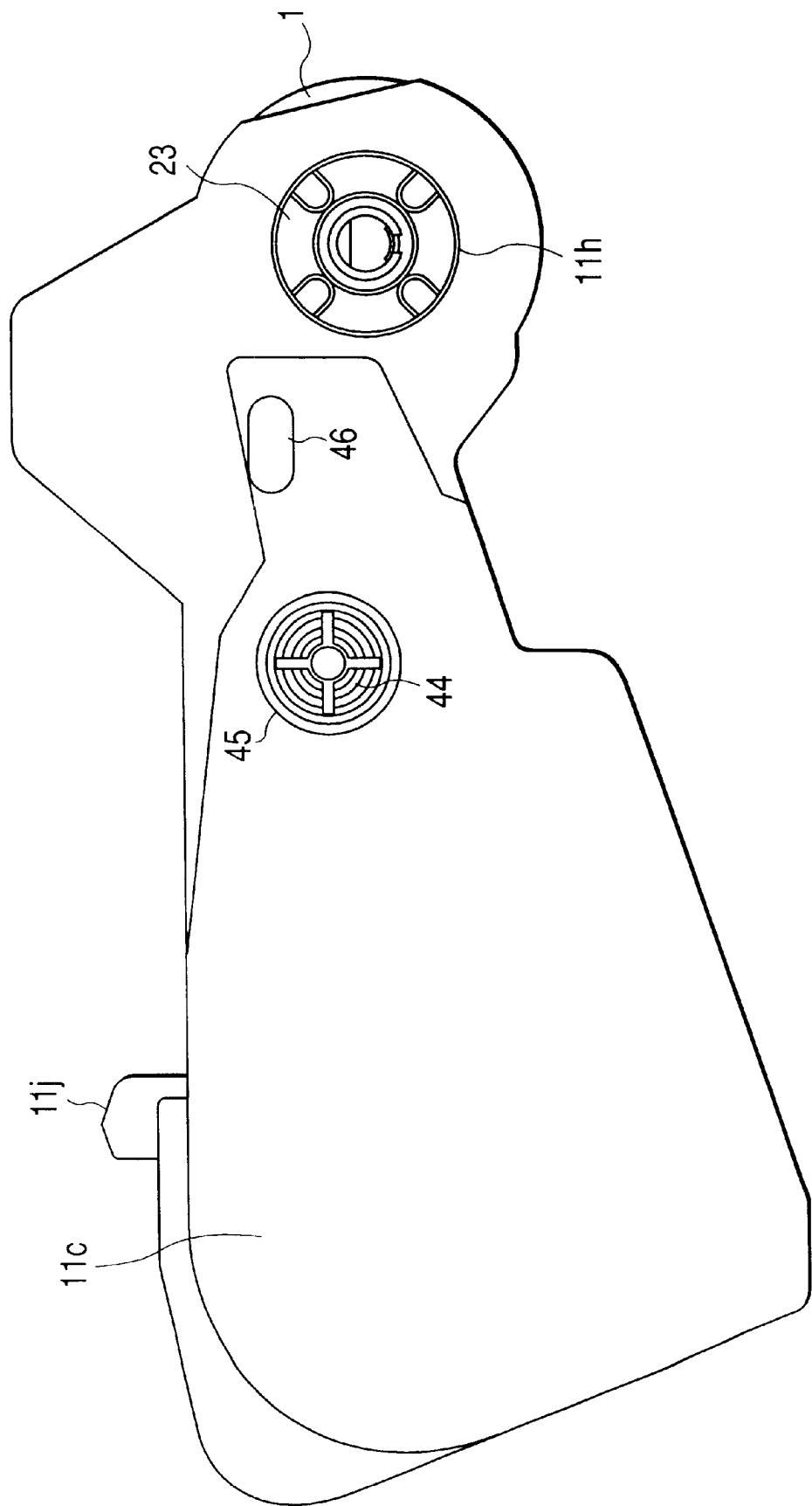
FIG. 13 is a side view for explaining a mounting guide portion of the process cartridge.

As shown in FIG. 11 (a perspective view of the process cartridge B looked at from the above), a torsion coil spring 18j having both ends contacting outer surfaces of the first and second shutter covers 18d, 18f is mounted on the pin shaft 18e to bias the first and second shutter covers 18d, 18f to approach to each other.

As shown in FIG. 5, a boss (not shown) is provided on the root of the operation arm 18h, and a torsion coil spring 18m mounted on the boss has one end received in a spring receiver 11f2 integrally formed with the side cover 11f and the other end attached to the operation arm 18h so that the operation arm 18h is biased toward a counter-clockwise direction in FIG. 5 around the fixed shaft 11f1 at the driven side. A cam portion 18n provided on the operation arm 18h abuts against a fixed member of the apparatus body 14 when the process cartridge B housed in the upper drawer 50 is mounted to the apparatus body 14.

When the process cartridge B is advanced to mount it to the apparatus body 14, the advancing movement of the cam portion 18n on the operation arm 18h is stopped and is rotated upwardly around the fixed shaft 11f1 in opposition to the spring force of the torsion coil spring 18m, thereby lifting the shafts 18i, 18e.

As a result, the first and second shutter covers 18d, 18f are biased upwardly, so that the root of the first shutter cover 18d is lifted along a track same as circular track of the shaft 18c rotated upwardly around the root shaft 18b and the tip end of the first shutter cover and the root of the second shutter cover 18f are lifted along tracks the same as circular tracks of the shafts 18i, 18e rotated around the fixed shaft 11f1 due to the upward rotation of the operation arm 18h. And the shoe 18g on the tip end of the second shutter cover 18f contacts the lower edges 11d1 of the drum support portions 11d or the outer peripheries of both ends of the photosensitive drum 1 and is lifted by the spring force of the torsion coil spring 18j tending to fold the first and second shutter covers 18d, 18f inwardly. As a result, the drum shutter 18 releases the photosensitive drum and is housed behind the charge device cover 11g, as shown in FIG. 11.

In the above explanation, the arms 18a, operation arm 18h, first shutter cover 18d, and cleaning container 11a including the gear cover 11c and the side cover 11f constitute a quadric link mechanism. In this quadric link mechanism, since the torsion coil spring 18j biases the second and first shutter covers 18f, 18d to approach each other around the shafts 18i, 18e connecting the first shutter cover 18d to the operation arm 18h, in spite of the fact that the photosensitive drum 1 is greatly exposed through a center angle of 180° or more, the shutter covers can be shifted along the tracks near the peripheral surface of the photosensitive drum 1. As a result, the arrangement of the developing means 4 and the intermediate transfer unit 5 is not influenced by the provisions of the shutter covers and the shutter covers can be housed near the upper surface of the cleaning container 11a.

<Mounting and Dismounting Construction of Intermediate Transfer Unit>

Figure 24:
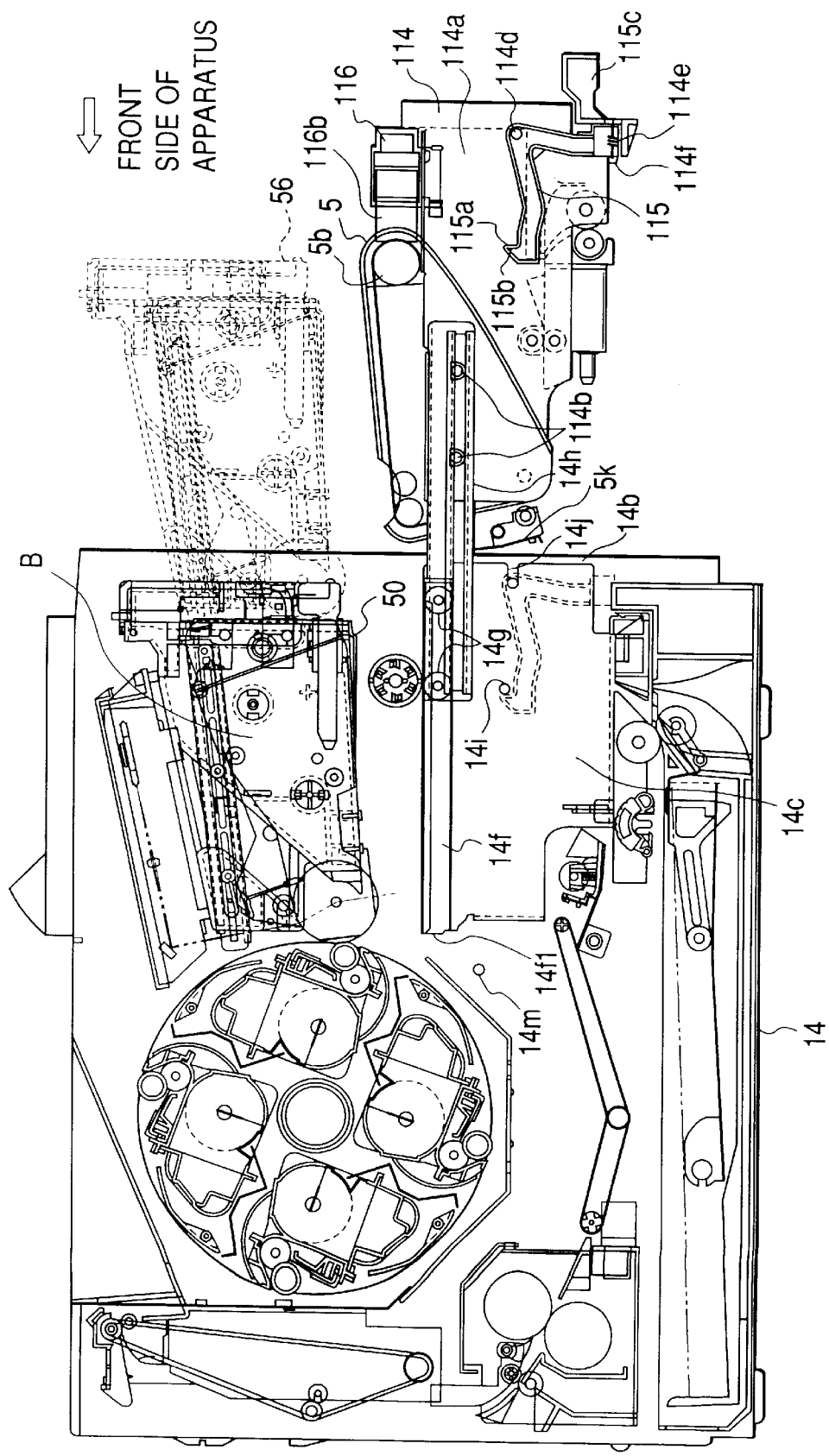
FIGS. 24 and 25 are elevational sectional views showing mounting and dismounting of the process cartridge and an intermediate transfer unit with respect to the body of the image forming apparatus.

As shown in FIG. 24, the process cartridge B is dismounted from the apparatus body 14 under the condition that the process cartridge is housed within the upper drawer 50, and then, the process cartridge is dismounted from the upper drawer 50. The pressure member 56 provided on the upper drawer 50 is locked to the apparatus body 14 and has a function for abutting and pressurizing the process cartridge B against the apparatus body 14 via the upper drawer 50 and a function for permitting and inhibiting transmission of the driving force between the process cartridge B and the drive unit 119.

The intermediate transfer unit 5 is dismounted from the apparats body 14 under the condition that the intermediate transfer unit is housed within a lower drawer 114, and then, the intermediate transfer unit is dismounted from the lower drawer 114. The lower drawer 114 is locked to the apparatus body 14 by a lock lever 115, and a pressure member 116 provided on the lower drawer 114 urges the intermediate transfer unit 5 against the apparatus body 14.

As shown in FIG. 24, horizontal fixed guide rails 14f are fixed to left and right wall surfaces defining the right opening portion 14b of the apparatus body 14, and movable guide rails 14h with wheels rotatably fitted within tracks of the respective fixed guide rails 14f can be shifted in a left-and-right direction in FIG. 24. Further, rollers 114b provided on side plates 114a of the lower drawer 114 can be shifted in a left-and-right direction along tracks of the movable guide rails 14h.

A side plate 14c integral with each fixed guide rail 14f is secured to the apparatus body 14 below the fixed guide rail 14f. A lock pin 14i is provided on the corresponding side plate 14c. A bell-crank lock lever 115 is pivotally connected to the side plate 114a of the lower drawer 114 via a pin 114d. A tension spring 114e having one end locked to the lock lever 115 has the other end locked to a spring hook 114f secured to the side plate 114a so that the lock lever 115 is biased toward a clockwise direction around the pin 114d. An inverted pawl 115a is provided on an end of the lock lever 115 opposite to the end pulled by the tension spring 114e. The inverted pawl 115a is disposed at a position where an inclined surface 115b of the inverted pawl 115a abuts against the lock pin 14i when the lower drawer 114 is shifted to the left in FIG. 24. Further a blind groove 14j opened toward the right direction (FIG. 24) is formed in the side plate 14c of the apparatus body 14. When the lower drawer 114 is shifted to the left, the pin 114d to which the lock lever 115 of the lower drawer 114 is pivotally connected and protruded toward the front side (FIG. 24) from the lock lever 115 is fitted into the groove 14j of the side plate 14c of the apparatus body 14. Incidentally, in FIG. 24, only the front side (this side) side plate 14c is illustrated, and the lock pin 14i protrudes toward the rear side of the plane of FIG. 24.

As shown in FIG. 24, when the rollers 114b are inserted into the tracks of the movable guide rails 14h from the left, since the diameters of the wheels 14g are greater than the diameters of the rollers 114b, the running resistance of each wheel 14g becomes small. As a result, the movable guide rails 14h and the lower drawer 114 are shifted to the left or right while rolling the wheels 14g on the fixed guide rails 14f, under a condition that the relative positional relation between the movable guide rails 14h and the lower drawer 114 is unchanged.

The intermediate transfer unit 5 is detachably mounted on the lower drawer 114, and the intermediate transfer unit 5 is supported for movement in the left-and-right direction and a vertical direction with respect to the lower drawer 114.

Figure 27:
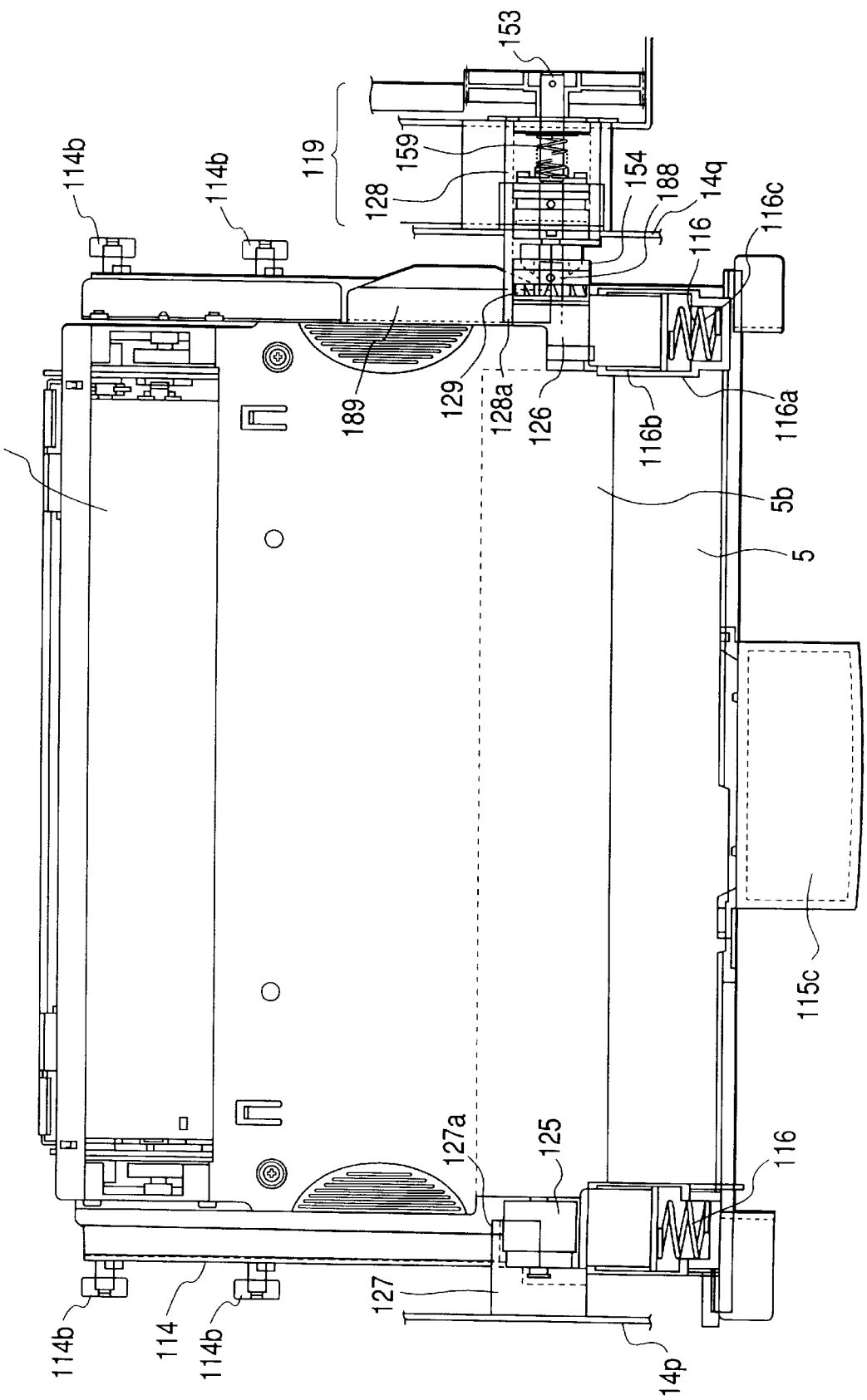
FIG. 27 is a plan view showing positioning of the intermediate transfer unit with respect to the apparatus body.

As shown in FIG. 27, the rear end (in the mounting direction) of the intermediate transfer unit 5 can be pressurized by a pressure member 116. The pressure member 116 has a pressure piston 116b telescopically shifted within a cylinder 116a, and a compression spring 116c is disposed between the pressure piston 116b and a bottom of the cylinder 116a which is secured to the lower drawer 114. The pressure piston 116b can be contacted with the peripheries of positioning members 125, 126 concentric with the drive roller 5b of the intermediate transfer unit 5. The positioning members 125, 126 are secured to the frame of the intermediate transfer unit 5.

On both sides of a tip end (in the mounting direction) of the intermediate transfer unit 5, there are provided tip end positioning members 5k each having a groove opened toward the mounting direction, and left and right inner wall surfaces of the apparatus body 14 are provided with positioning pins 14m into which the grooves of the tip end positioning members 5k are fitted when the intermediate transfer unit 5 reaches the mounting position.

Now, the mounting of the intermediate transfer unit 5 to the apparatus body 14 will be described. As shown in FIG. 24, when the intermediate transfer unit 5 is mounted on the lower drawer 114, the pressure member 116 urges the positioning members 125, 126 (FIG. 27) so that the intermediate transfer unit 5 is positioned at an advanced position with respect to the lower drawer 114. When the lower drawer 114 is inserted into the apparatus body 14, the wheels 14g of the movable guide rails 14h are firstly rolling on the fixed guide rails 14f, and the lower drawer 114 bearing the intermediate transfer unit 5 is advanced together with the movable guide rails 14h, and then tip ends of the movable guide rails 14h abut against stoppers 14f1 provided at terminals of the fixed guide rails 14f and are stopped there. Then, when the rollers 114b of the lower drawer 114 are rolling on the movable guide rails 14h to shift the lower drawer 114 in the same direction, the tip end positioning members 5k of the intermediate transfer unit 5 are fitted onto the positioning pins 14m of the apparatus body 14.

When the lower drawer 114 is further advanced, the inclined surface 115b of the lock lever 115 abuts against the pin 14i formed on the side plate 14c of the apparatus body 14, with the result that the lock lever 115 is rotated around the pin 114d in the counter-clockwise direction in opposition to the spring force of the tension coil spring 114e. When the inverted pawl 115a rides over the pin 14i, the lock lever 115 is rotated in the clockwise direction by the spring force of the tension coil spring 114e, with the result that the inverted pawl 115a is locked to the pin 14i. Further, the pin 114d is fitted into the groove 14j. Due to this last advancing movement of the lower drawer 114, the compression spring 116c of the pressure member 116 is compressed, with the result that the positioning member 125 of the intermediate transfer unit 5 is urged against a semi-circular positioning portion 127a formed in an inner peripheral surface of a positioning member 127 provided on the side plate 14p of the apparatus, body 14 and the positioning member 126 is urged against a half pipe-shaped positioning portion 128a of a pipe-shaped member 128 of the drive unit 119 secured to the apparatus body 14.

Figure 25:
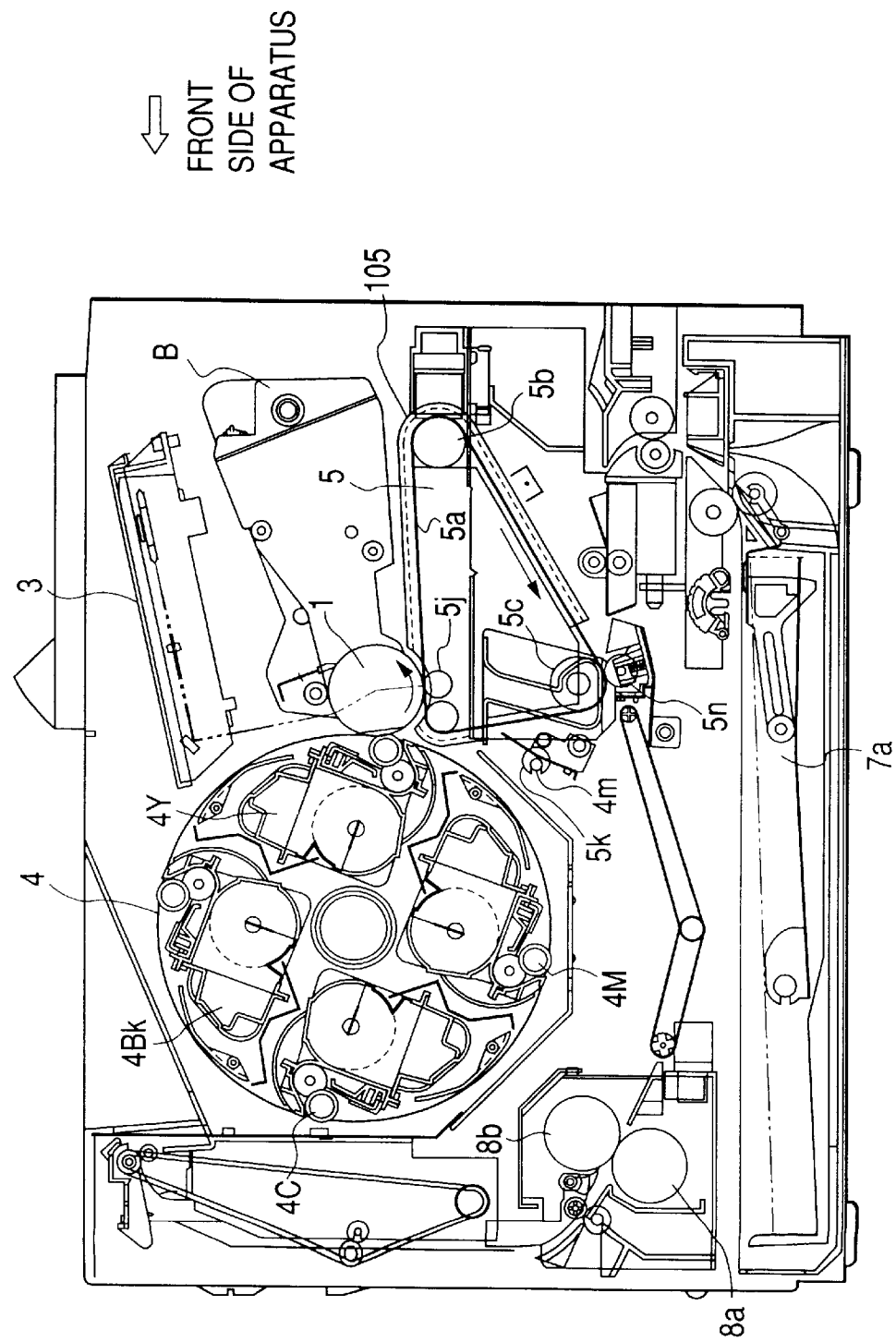

In this way, the center of the drive roller 5b of the intermediate transfer unit 5 with respect to the apparatus body 14 is determined, and the rotational position around the drive roller 5b of the intermediate transfer unit 5 is determined by fitting the tip end positioning members 5k onto the positioning pins 14m of the apparatus body 14, with the result that the intermediate transfer unit 5 is mounted to the apparatus body 14 as shown in FIG. 25.

Incidentally, in synchronism with the final advancing movement of the lower drawer 114 to pressurize the pressure member 116, in the intermediate transfer unit 5 and the drive unit 119, the shaft coupling embers are interconnected as will be described later (refer to FIG. 41).

<Engagement and Disengagement Between Shaft Couplings of Intermediate Transfer Unit and Drive Device>

Under the condition that the intermediate transfer unit 5 is mounted on the apparatus body 14, when a grip portion 115c of the lock lever 115 is pulled upwardly in opposition to the spring force of the tension coil spring 114e, the lock lever 115 is rotated around the pin 114d to bring the inverted pawl 115a below the pin 14i of the apparatus body 14, with the result that the compression spring 116c (FIG. 27) of the pressure member 116 is expanded to retract the lower drawer 114. When the grip portion 115c is pulled, a release cam member 189 of the lower drawer 114 retards a slide cam 188 in opposition to the spring force of the compression spring 116c, thereby disengaging the shaft coupling member 154 of the drive unit 119 from the shaft coupling member 129 of the intermediate transfer unit 5 (FIG. 41). At this point, when the lower drawer 114 is drawn, the intermediate transfer unit 5 is shifted outwardly together with the lower drawer 114, with the result that the tip end positioning members 5k are disengaged from the positioning pins 14m. When the lower drawer 114 is further drawn, a condition shown in FIG. 24 is obtained. In this condition, the intermediate transfer unit 5 can be dismounted from the lower drawer 114. Incidentally, since the release cam member 189 leaves the slide cam 188 when the lower drawer 114 is drawn, the shaft coupling member 154 is advanced by the spring force of the compression coil spring 159. On the other hand, when the lower drawer 114 is inserted, since the release cam member 189 urges the slide cam 188, as the intermediate transfer unit 5 mounted on the lower drawer 114 is advanced toward the apparatus body 14, the shaft coupling member 154 of the drive unit 119 does not interfere with the shaft coupling member 129 of the intermediate transfer unit 5.

<Positioning of Process Cartridge and Intermediate Transfer Unit with Respect to Drive Unit>

Figure 26:
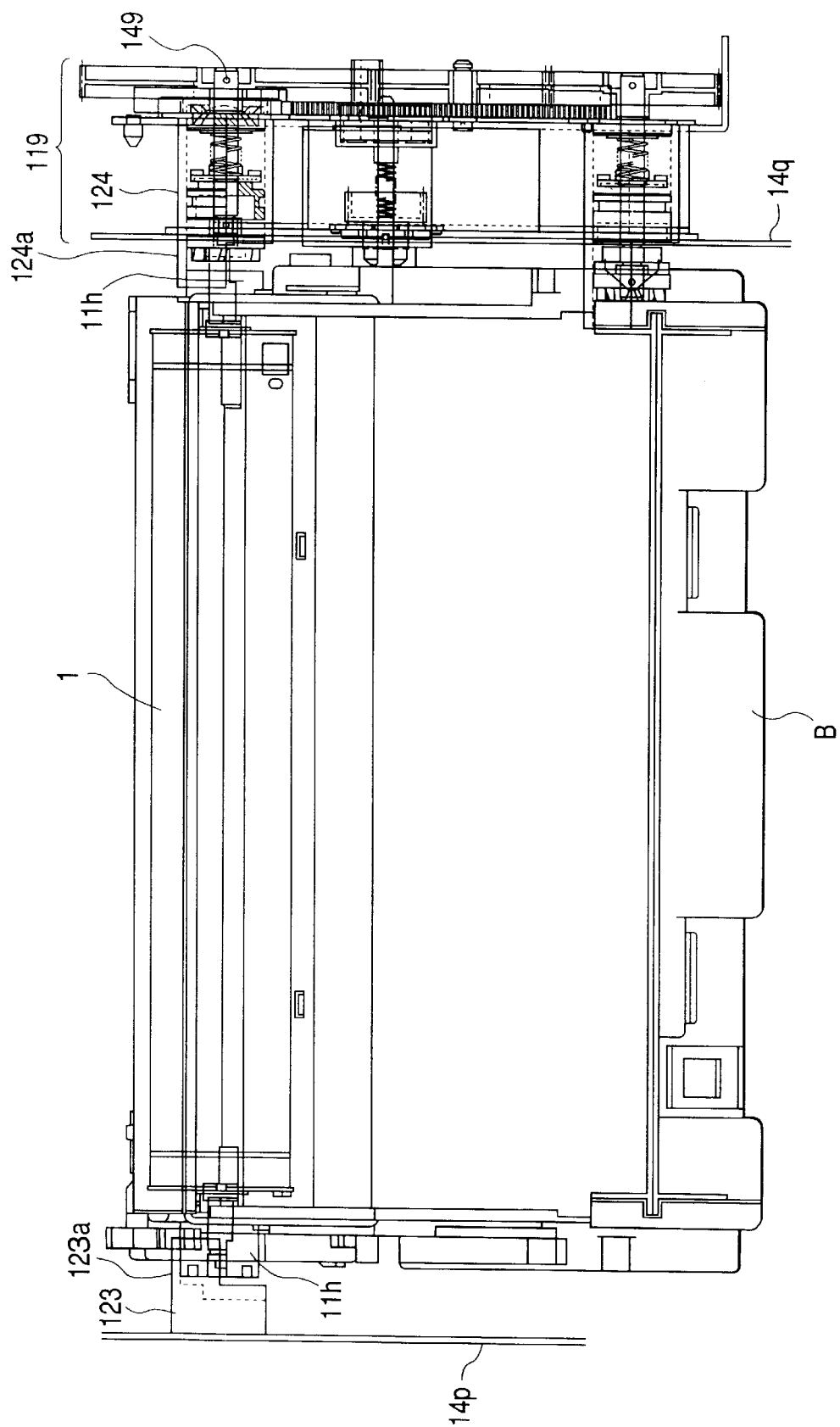
FIG. 26 is a plan view showing positioning of the process cartridge with respect to the apparatus body.

FIG. 26 shows the mounting of the process cartridge B to the apparatus body. In the process cartridge B, both ends of the photosensitive drum 1 are held by the cylindrical positioning hold portions 11h. Each hold portion 11h has a cylindrical shape concentric with the photosensitive drum 1 and is protruded from the side surface of the process cartridge B. One of the hold portions 11h is positioned by abutting against the semi-circular positioning portion 123a of the positioning member 123 secured to the side plate 14p of the apparatus body 14. The other hold portion 11h is positioned by abutting against the inner periphery of the half pipe-shaped positioning portion 124a of the pipe-shaped member 124 provided on the drive unit 119. The pipe-shaped member 124 is positioned by fitting it into a hole formed in the side plate 14q of the apparatus body.

FIG. 27 shows the mounting of the intermediate transfer unit 5 to the apparatus body 14. The cylindrical positioning members 125, 126 are provided on both ends of the drive roller 5b for the intermediate transfer belt 5a. One (125) of the positioning members is positioned by abutting against the inner periphery of the semi-circular positioning portion 127a of the positioning member 127 secured to the side plate 14p of the apparatus body, and the other positioning member 126 is positioned by abutting against the inner periphery of the positioning portion 128a of the pipe-shaped member 128 provided on the drive unit 119. The pipe-shaped member 128 is positioned by fitting it into a hole formed in the side plate 14q of the apparatus body.

Figure 28:
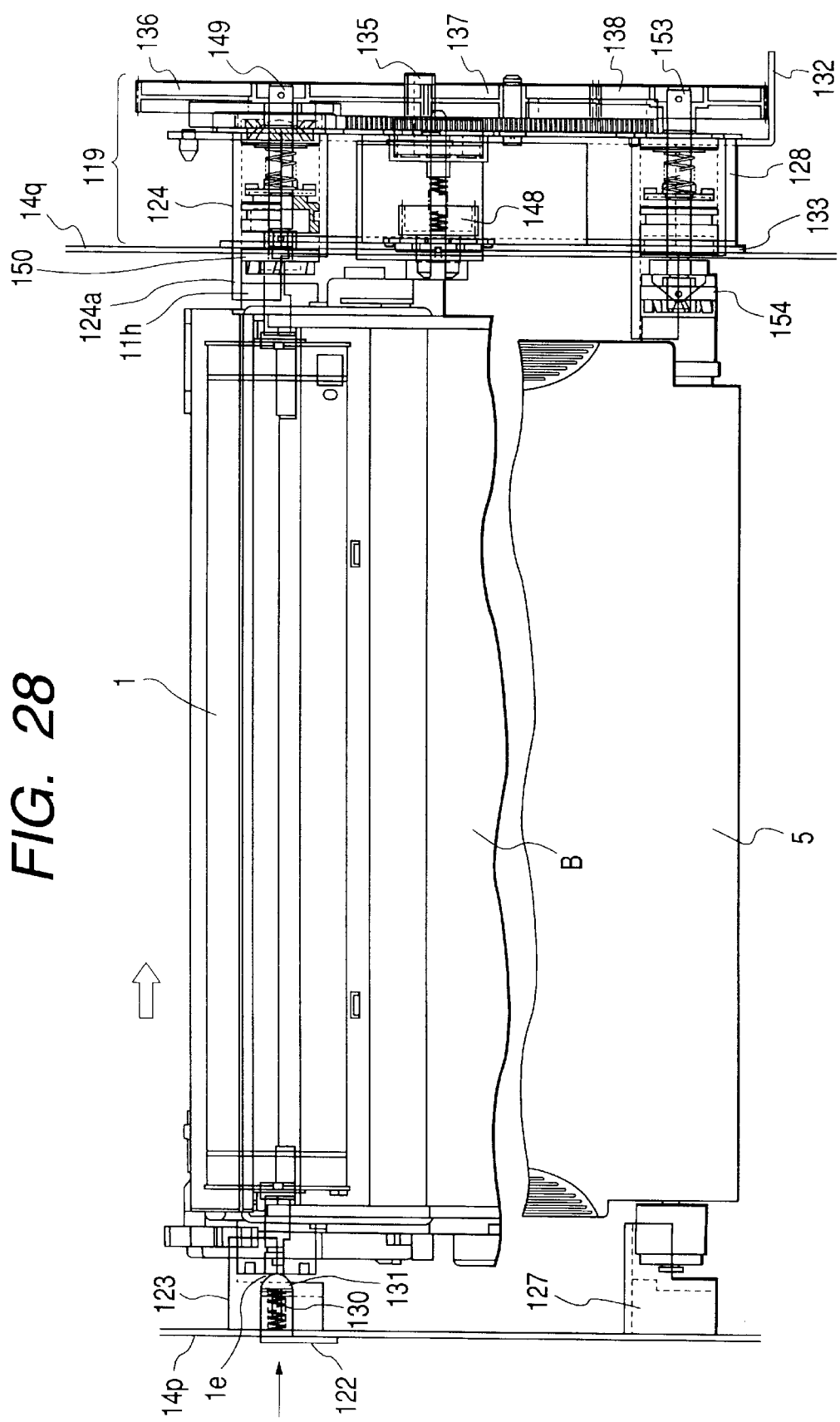
FIG. 28 is a plan view showing the connection between the apparatus body, and, the process cartridge and the intermediate transfer unit.

FIG. 28 shows the condition that the process cartridge B and the intermediate transfer unit 5 are mounted on the apparatus body 14. One ends of the process cartridge B and the intermediate transfer unit 5 are directly positioned with respect to the drive unit 119, and the other ends are positioned with respect to the apparatus body 14. A contact member (drum grounding contact) 122 is secured to the side plate 14p of the apparatus body, and a contact spring 130 is disposed between the contact member 122 and a contact pin 131 contacting the drum support shaft 1e and movable in the axial direction of the drum support shaft 1e. By contacting the contact pin 131 with the end surface of the drum support shaft 1e of the process cartridge B as shown by the arrow, the photosensitive drum 1 is electrically communicated with the side plate 14p of the apparatus body. Although not shown in FIG. 28, the drum support shaft 1e is electrically connected to the aluminium cylinder 1c by a grounding plate if contacting the drum support shaft 1e and the aluminium cylinder 1c (refer to FIG. 20).

<Construction of Drive Unit>

Figure 29:
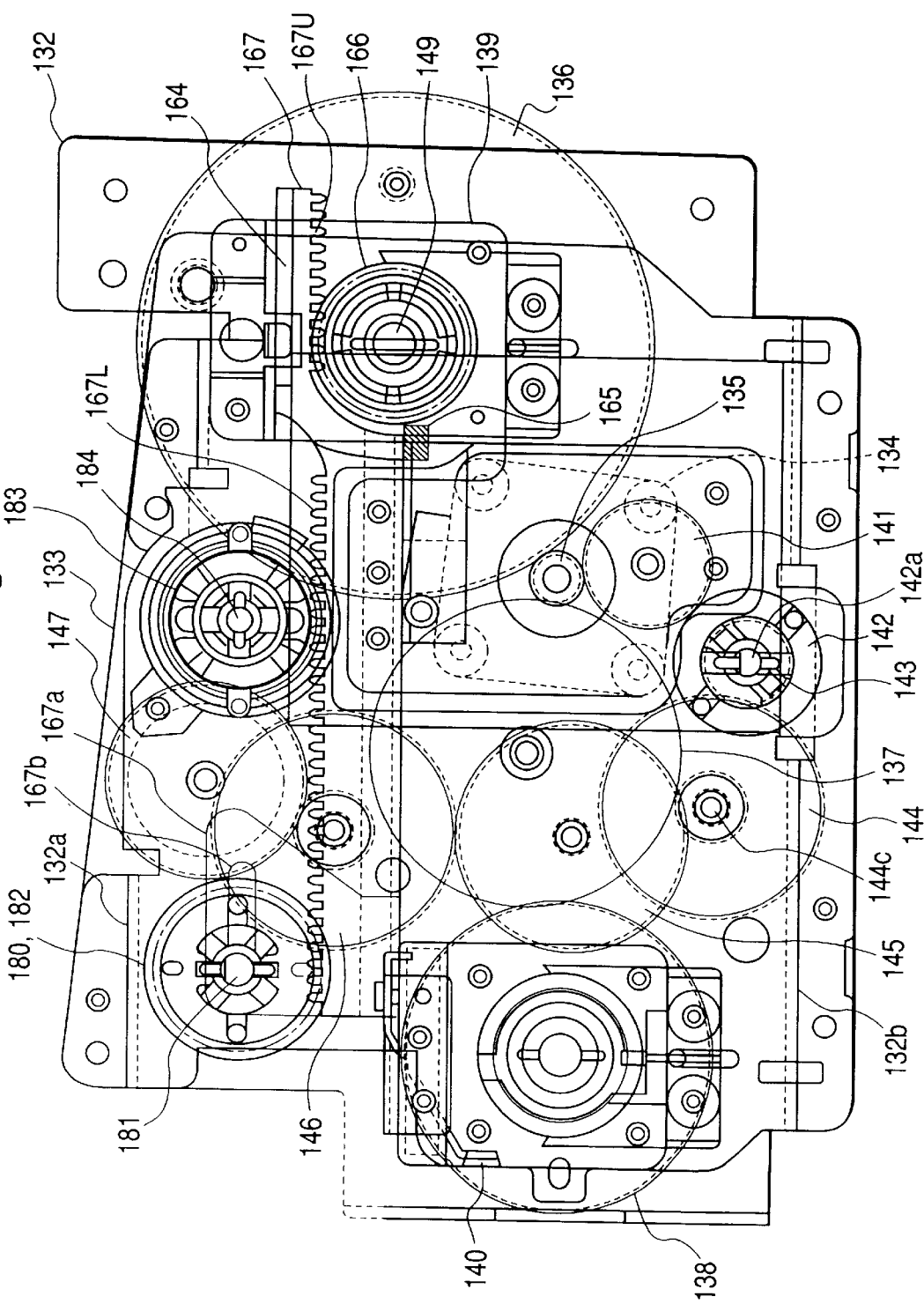
FIG. 29 is a back view of a drive unit.
Figure 30:
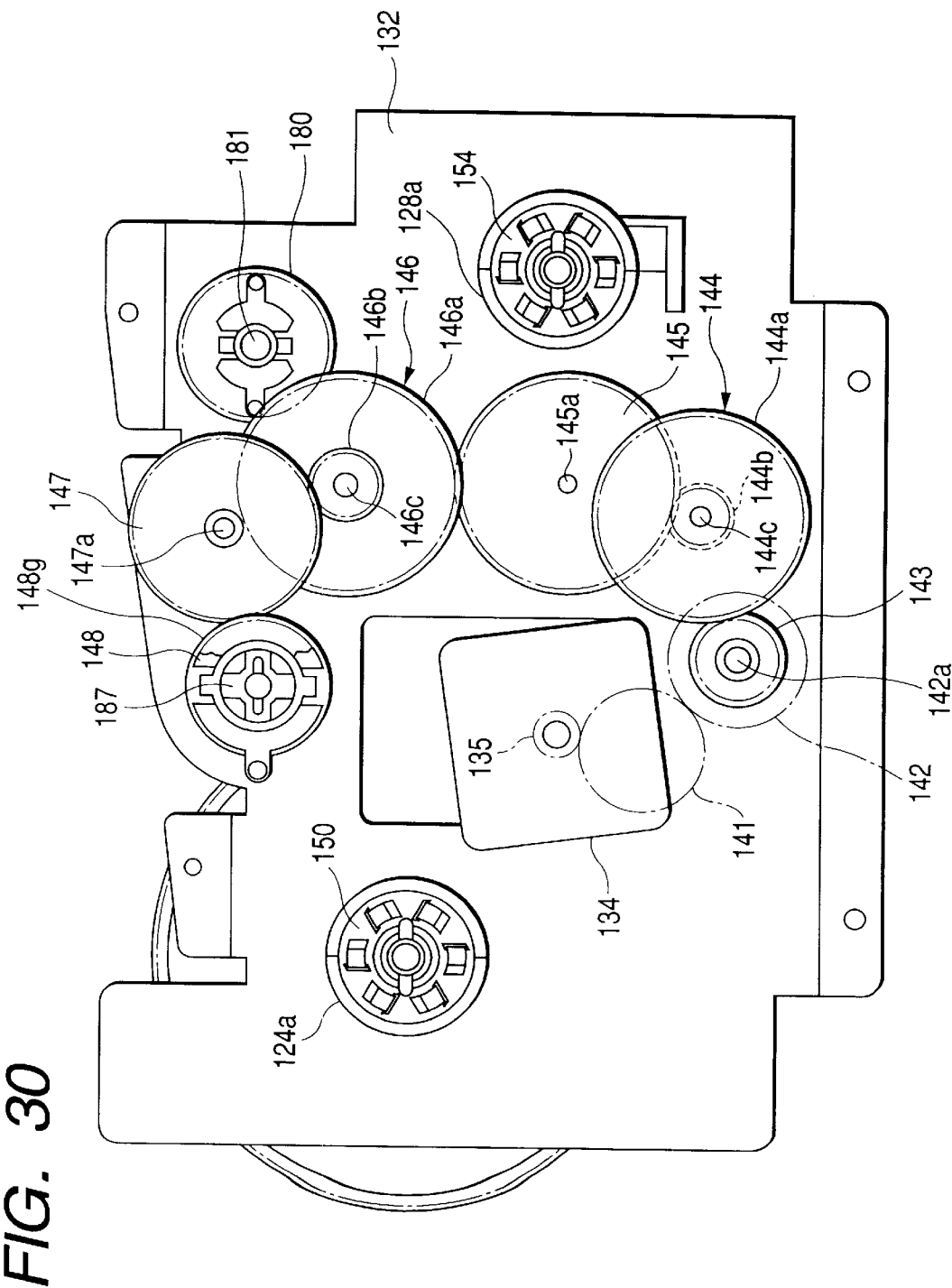
FIG. 30 is a front view of the drive unit with an inner stay omitted.
Figure 31:
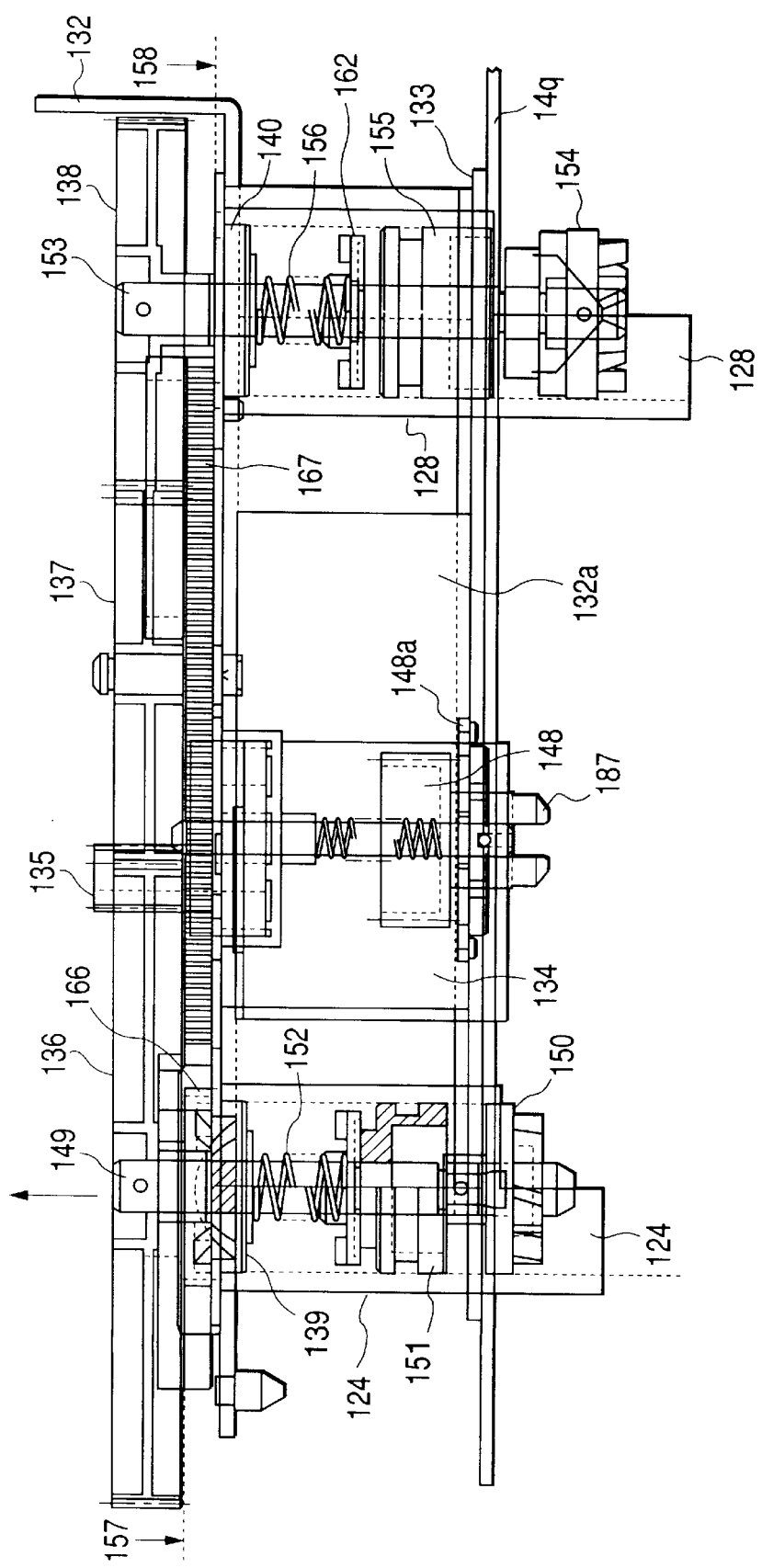
FIG. 31 is a plan view, partial in section, of output portions of the drive unit.
Figure 32:
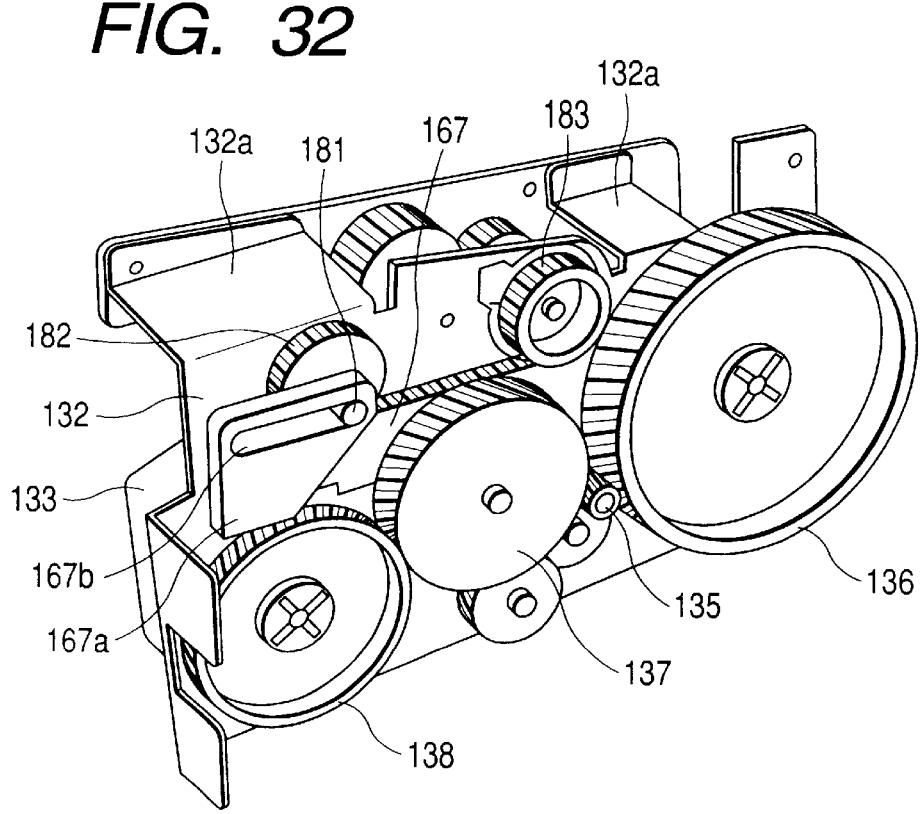
FIG. 32 is a perspective view showing a back portion of the drive unit.
Figure 33:
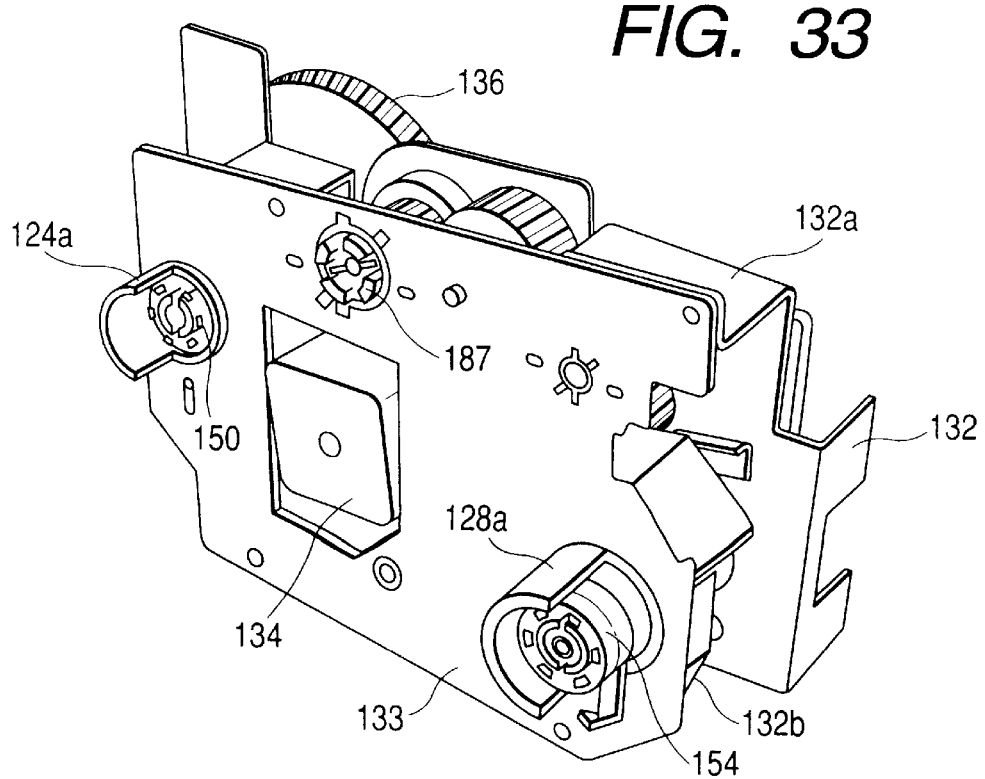
FIG. 33 is a perspective view showing a front portion of the drive unit.

FIGS. 29 to 33 show the drive unit 119. Incidentally, in FIG. 29, some parts are shown by the broken lines. Further, FIGS. 29, 30 and 32 show an inverted condition. The drive unit is constituted by an outer stay 132 and an inner stay 133 having parallel opposed plate surfaces and has a box-shaped frame. That is to say, the outer stay 132 has upper and lower bent portions 132a, 132b bent toward the inner stay 133, which bent portions 132a, 132b are secured to the flat plate-shaped inner stay 133.

A motor 134 is secured to an inner surface of the frame of the outer stay 132, and a motor shaft of the motor 134 extends through the outer stay to protrude therefrom, and a motor gear 135 is secured to the motor shaft. The motor gear 135 is meshed with a drum drive gear 136, an intermediate transfer member drive idle gear 137 and a drum waste toner agitating drive idle gear 141. The intermediate transfer member drive idle gear 137 is connected to an intermediate transfer roller drive gear 140. As shown in FIG. 30, the drum waste toner agitating drive idle gear 141 constitutes a drive transmitting system to a gear portion of the agitating shaft coupling member 148 through other agitating drive idle gears 142, 143, 144, 145, 146 and 147.

That is to say, the drum waste toner agitating drive idle gear 141 is meshed with the idle gear 142 to fixedly support the idle gear 142, and the idle gear 143 is secured to an intermediate shaft 142a rotatably supported by the outer stay 132 and the inner stay 133 between the outer stay 132 and the inner stay 133. As shown in FIG. 30, idle gear 143 is meshed with an idle gear 144a of the stepped idle gear 144, and an idle gear 114b integral with the idle gear 144a is meshed with the idle gear 145. The idle gear 145 is meshed with an idle gear 146a of the stepped idle gear 146, and an idle gear 116b integral with the idle gear 146a is meshed with the idle gear 147, and the idle gear 147 is meshed with a fear portion 148g of the agitating shaft coupling member 148. The idle gears 144, 145, 146 and 147 are rotatably supported on shafts 144c, 145a, 146c and 147a secured to the outer stay 132, respectively.

In FIG. 31, by fitting the pipe-shaped members 124, 128 into the outer stay 132 and the inner stay 133, the stays 132, 133 are assembled with outer diameters of the pipe-shaped members 124, 128 as a reference and are fitted into the side plate 14q of the apparatus body with the same outer diameters of the pipe-shaped members 124, 128 as a reference. A bearing member 139 is closely fitted into the pipe-shaped member 124, and a bearing member 151 is loosely fitted into the pipe-shaped member 124 for shifting movement and is fitted on a rotary shaft 149. The bearing member 139 is secured to the outer stay 132, and the rotary shaft 149 is fitted into the center of the bearing member 139 for rotational movement and axial shifting movement. The drum drive gear 136 is secured to one end of the rotary shaft 149, and the drive side shaft coupling member 150 is secured to the other end of the rotary shaft. A slide spring 152 in a compressed condition is mounted around the rotary shaft 149 between the bearing member 139 secured to the outer stay 132 and a bearing movable together with the rotary shaft 149 so that the movable bearing 151 is urged against the back of the shaft coupling member 150 by a spring force of the slide spring 152 to advance the rotary shaft 149 integral with the shaft coupling member 150 and the drive gear 136, thereby abutting the drive gear 136 against a reference surface 157.

The mechanism for the pipe-shaped member 129 at the drive side of the intermediate transfer unit is constituted similarly and, thus, has a bearing member 139 fitted on the pipe-shaped member 128 secured to the outer stay 132, a bearing member 155 loosely fitted on the pipe-shaped member 128 for shifting movement, a rotary shaft 153 rotatably supported by the bearing member 139, a compression coil spring 156 mounted around the rotary shaft 153 and disposed between the bearing members 139 and 155, and a shaft coupling member 154 and a drive gear 138 secured to both ends of the rotary shaft 153.

FIGS. 34A to 34D-1 show the shaft coupling portion for driving the drum drive gear (similar to the shaft coupling portion for driving the intermediate transfer member) in detail. A centering portion 159 formed by the rotary shaft 149 protrudes at the rotational center of the drive side shaft coupling member 150. The centering portion 159 is fitted into a centering hole 23d formed in the drum side shaft coupling member 23. A plurality of equidistantly spaced projections 160 are formed on the drive side shaft coupling member 150 to transmit the driving force. The projections 160 are engaged with a plurality of holes 23e formed in the drum side shaft coupling member 23 so that, when the driving force is transmitted, inclined surfaces 161 formed on the projections 160 are engaged by inclined surfaces 23f formed in the holes 23e, thereby generating a force component for causing the shaft coupling members 23, 150 to approach each other. That is to say, each projection 160 has the inclined surface 161 with a lead having a tip end advancing toward the rotational direction.

Figure 35:
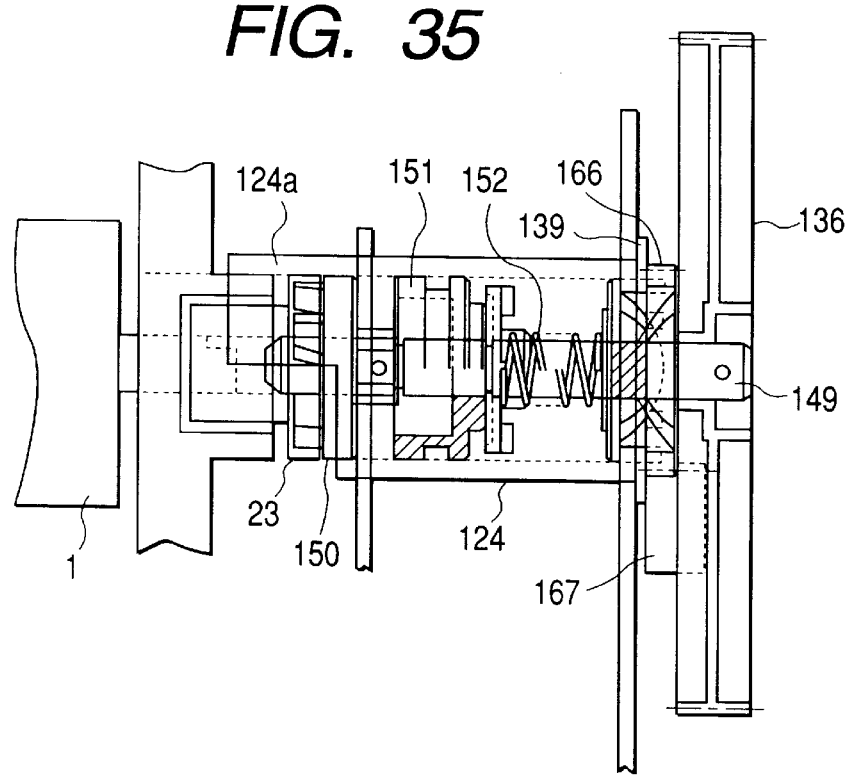
FIGS. 35 and 36 are plan views, partial in section, showing the engagement and disengagement of the shaft coupling for driving the photosensitive drum.
Figure 36:
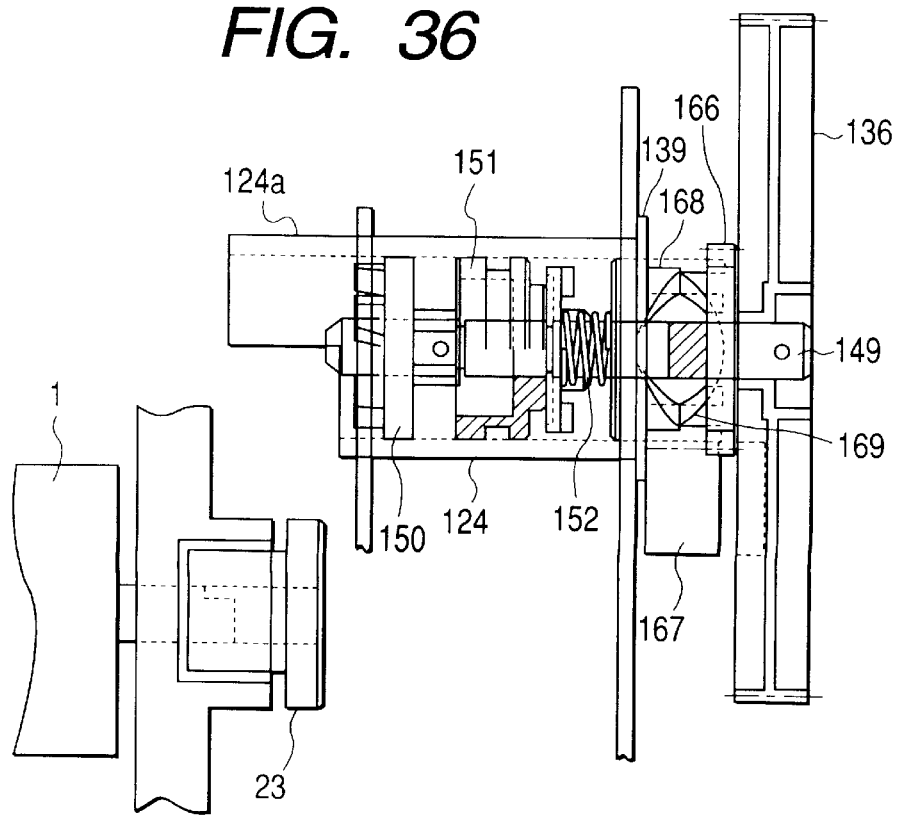

FIGS. 35 and 36 show the slide mechanism for the drive side shaft coupling member 150. A cam portion 168 having a threaded end surface is formed on the bearing member 139, and a cam gear 166 having a cam portion 169 matched with the cam portion 168 is provided between the drive gear 136 and the bearing member 139 around the rotary shaft 149. The cam portion 168 has a dual threaded surface including threaded portions twisted in opposite directions and having tops extending in a diametrical direction and bottoms extending perpendicular to the tops. The cam gear 166 is rotatably mounted on the rotary shaft 149. When the cam portion 169 is rotated by ¼ revolution, the cam portion is shifted with respect to the cam portion 168 from a minimum lift (lift=0) to a maximum lift.

As shown in FIGS. 29 and 31, the cam gear 166 is rotated by a rack member 167. Under the condition that the tops (or bottoms) of the cam portion 168 are aligned with the bottoms (or tops) of the cam portion 169, as shown in FIG. 35, the drum drive gear 136, rotary shaft 149, bearing member 151 and drive side shaft coupling member 150 are advanced to join the drive side shaft coupling member 150 to the shaft coupling member 23. On the other hand, under the condition that the tops of the cam portion 168 are aligned with the tops of the cam portion 169, as shown in FIG. 36, the shaft coupling member 150 is disengaged from the shaft coupling member 23, thereby permitting the radial movement of the shaft coupling member 23.

Figure 37:
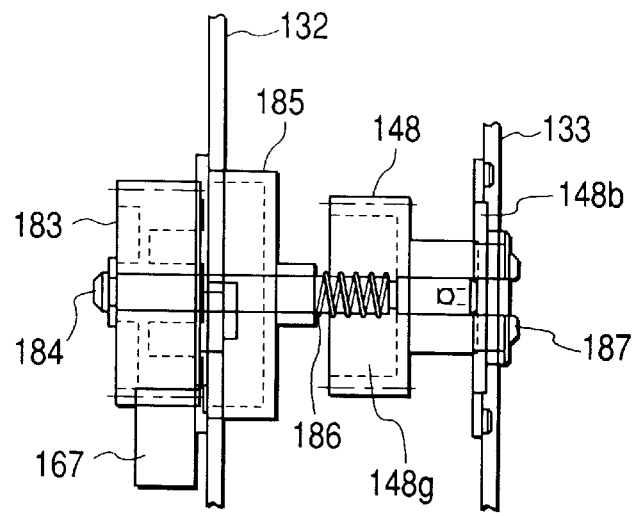
FIGS. 37 and 38 are side views showing the engagement and disengagement of an agitating shaft coupling.

With reference to FIG. 37, the operation of the slide mechanism for the agitating shaft coupling portion and the clutch member 167 will be described. The agitating shaft coupling member 148 is supported by a bearing 148a secured to the inner stay 133 for rotational movement and axial shifting movement, and pawl portions 187 for connecting to the process cartridge B are formed on the agitating shaft coupling member 148. A shaft 184 is secured to the agitating shaft coupling member 148. A cam gear 183 rotatable but not shiftable in the axial direction is provided on the other end of the shaft 184. There is provided a bearing member 185 having a cam surface corresponding to a cam surface (not shown) formed on an end surface of the cam gear 183. The cam surfaces are the same as the cam surfaces of the cam portions 168, 169 for shifting the shaft coupling member 150 for driving the photosensitive drum 1. The bearing member 185 is secured to the outer stay 132 and supports the shaft 184 for rotational movement and axial shifting movement. A compression slide spring 186 is mounted around the shaft 184 between the bearing member 185 and the agitating shaft coupling member 148. The cam gear 183 is meshed with the rack member 167.

<Operation Devices for Drive Side Shaft Coupling Member and Agitating Shaft Coupling Member>

As shown in FIG. 29, the rack member 167 has upwardly directing rack teeth 167U and downwardly directing rack teeth 167L. The rack teeth 167L are meshed with the gear 182 and the cam gear 183 (FIGS. 32 and 38) secured to the rotary shaft 181 (FIGS. 32 and 39) rotatably supported by the outer stay 132 and the inner stay 133, and the rack teeth 167U are meshed with the cam gear 166 (FIG. 35). As shown in FIG. 32, the rack member 167 is held in such a manner that a straight guide groove 167b (parallel with the rack member 167) formed in a rack guide 167a secured to the rack member 167 is fitted on the end of the rotary shaft 181 shown in FIG. 39 for shifting movement and the upper side of the rack teeth 167L and the lower side of the rack teeth 167U are covered by an upper guide 164 and a lower guide 165 which are secured to the outer stay 132. Incidentally, a stop ring (not shown) is provided on the end of the rotary shaft 181 to prevent the rack guide 167a from disengaging from the rotary shaft 181.

Figure 38:
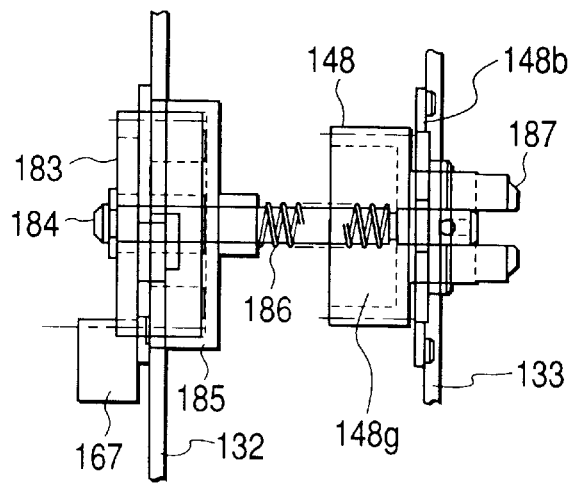
Figure 39:
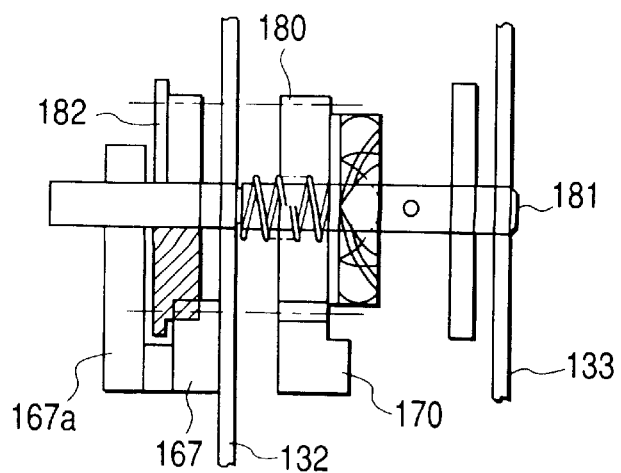
FIG. 39 is a side view, in partial section, of a drive device of a rack member for driving a cam gear.

As shown in FIGS. 37 and 38, the cam gear 183 is rotated by the rack member 167 meshed with the cam gear 183, and the agitating shaft coupling member 148 is slid by the engagement between the cam surfaces of the cam gear 183 and of the bearing member 185.

Figure 40:
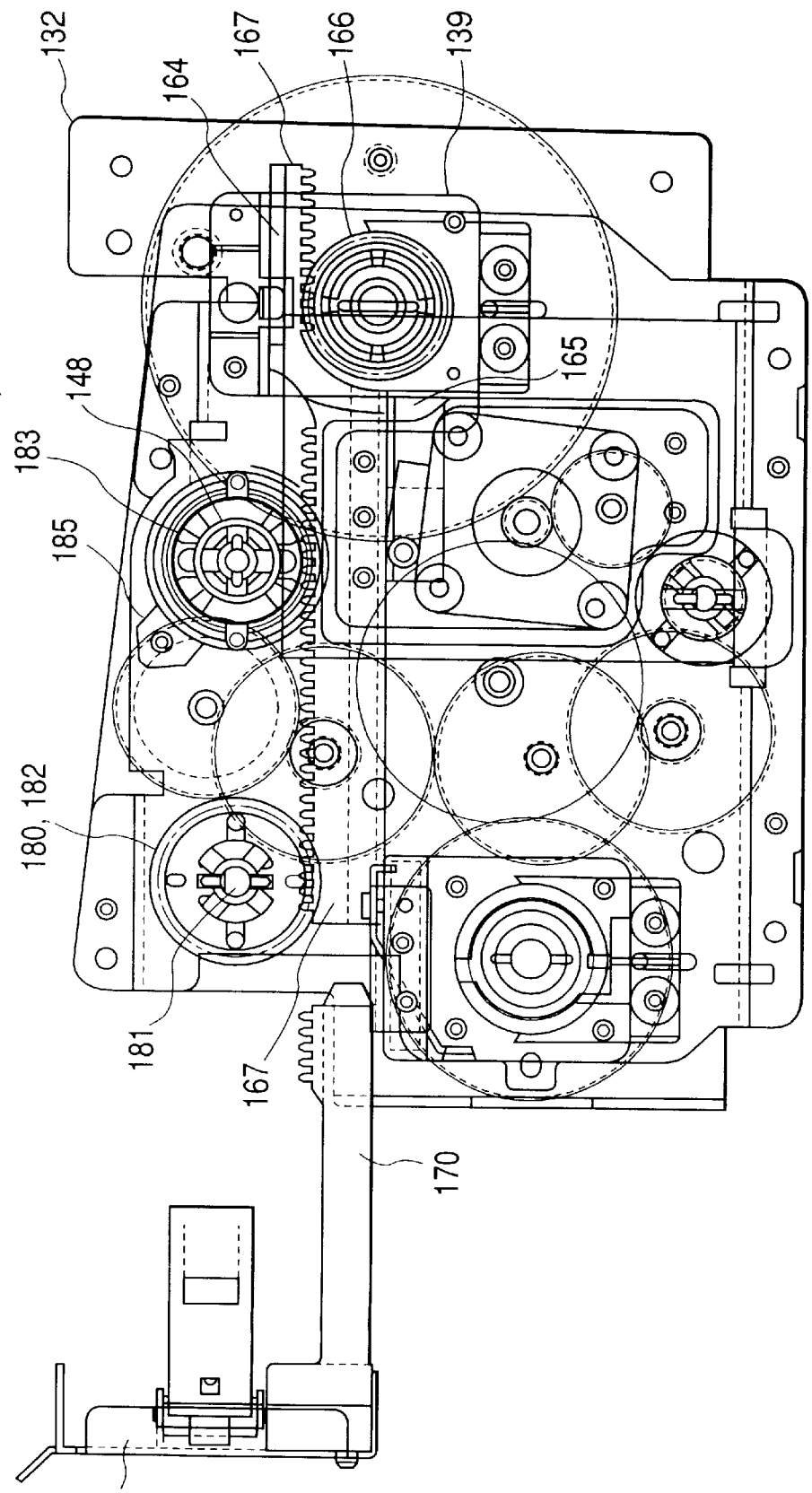
FIG. 40 is a back view of the drive device of the rack member for driving the cam gear.

As shown in FIG. 40, regarding the rack member 167, after the upper drawer 50 is inserted, a guide rack 170 provided on the pressure member 56 for urging the process cartridge B is meshed with a gear 180 (FIGS. 30, 39 and 40) to rotate the gear 182 secured to the shaft 181 through the shaft 181 secured to the gear 180 for rotation therewith, thereby rotating the gear 182. As a result, in synchronism with the operation of the pressure guide member 56, the rack member 167 is shifted to rotate the cam gears 166, 183, thereby advancing the drive side shaft coupling member 150 and the agitating shaft coupling member 148. With this arrangement, when the upper drawer 50 and the pressure guide member 56 are inserted into the apparatus body 14 upon mounting the process cartridge B, the guide rack 170 of the pressure member 56 is engaged by the gear 180 of the drive unit 119, and, in synchronism with such engagement, the rack member 167 is operated to connect the drive side shaft coupling member 150 and the agitating shaft coupling member 148 to the process cartridge B.

When the process cartridge B is dismounted, first of all, the pressure member 56 is retracted together with the guide rack 170, with the result that the gear 180, shaft 181 and gear 182 are rotated to shift the rack member 167, thereby releasing the drum shaft coupling portion and the agitating shaft coupling portion. Then, the upper drawer 50 and the process cartridge B are retracted from the apparatus body 14.

Figure 41:
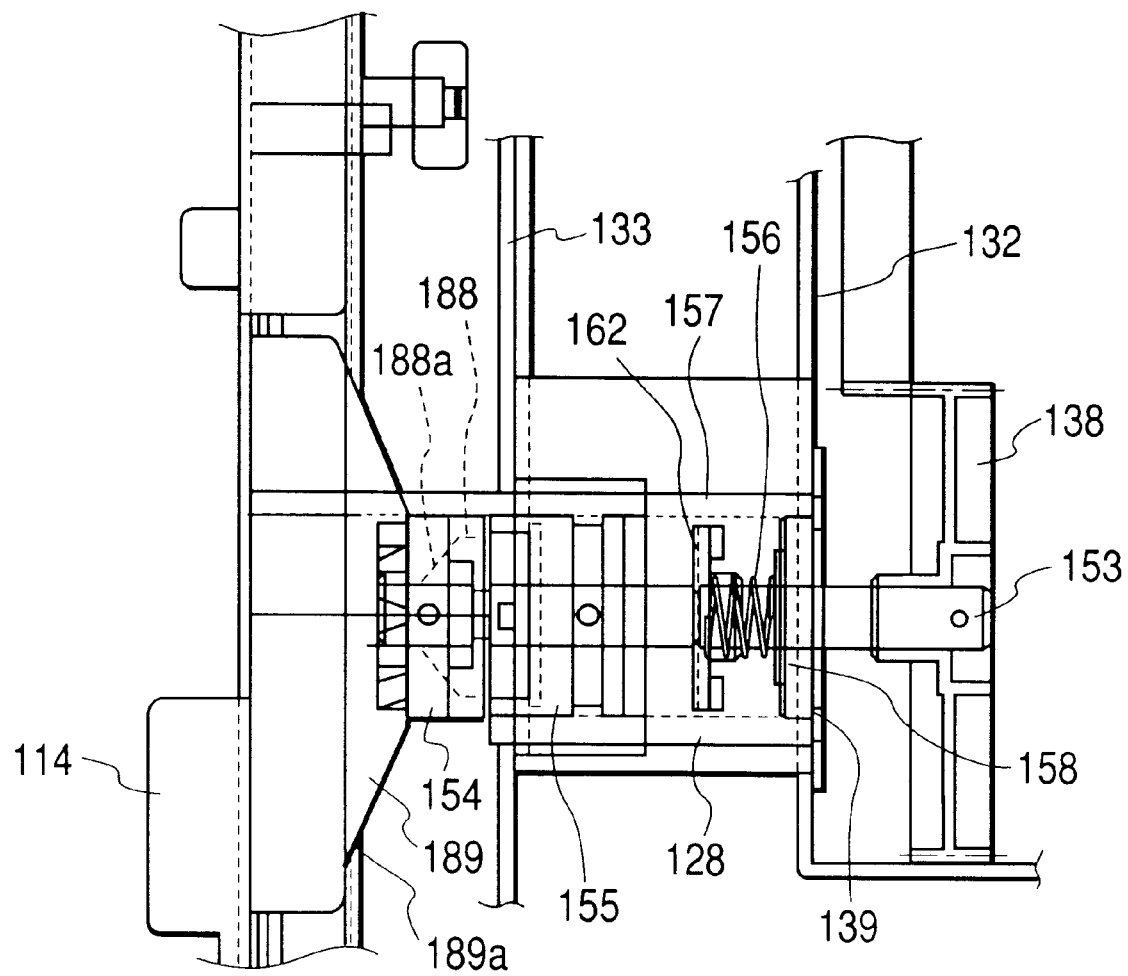
FIG. 41 is a side view showing the engagement and disengagement of the intermediate transfer unit.
Figure 42B:
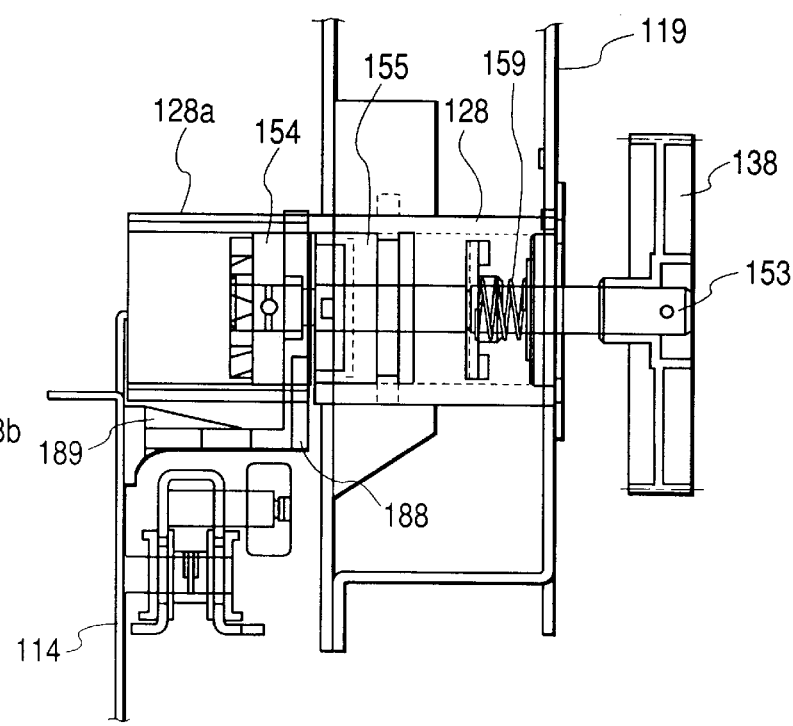
FIGS. 42A and 42B are views showing engagement and disengagement of the intermediate transfer unit, where a section
Figure 42A:
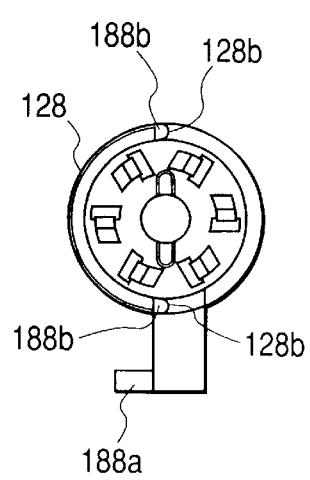

FIGS. 41, 42A and 42B show the slide mechanism for the intermediate transfer member drive shaft coupling portion for driving the intermediate transfer unit 5. The slide cam 188 slidable integrally with the rotary shaft 153 (rotatable but not shiftable in the axial direction with respect to the rotary shaft 153) is fitted on the slidable rotary shaft 153 to which the shaft coupling member 154 and the drive gear 138 are secured. The slide cam 188 has a convex cam surface 188a as shown in FIG. 41, and a slide surface 188b slid on the axial edge 128b of the half pipe-shaped positioning portion 128a of the pipe-shaped member 128 as shown in FIGS. 42A and 42B. The rotation of the slide cam is prevented. Further, a release cam member 189 is provided on a side surface of the lower drawer 114. In response to the sliding action of the lower drawer 114, the release cam member 189 abuts against the slide cam 188 to retard the slide cam 188 and the intermediate transfer member drive shaft coupling member 154, thereby releasing the intermediate transfer member drive shaft coupling member 154 from the shaft coupling member 129 of the intermediate transfer unit 5.

The rotary shaft 153 is rotatably supported by the fixed bearing 139 fitted on the pipe-shaped member 128 fitted into the outer stay 132, and the inner stay 133 and secured to the outer stay 132 and the movable bearing 155 fitted on the pipe-shaped member 128 for rotational movement and shifting movement. The compression coil spring 156 is mounted around the rotary shaft 153 between a circular spring seat 162 fitted on and secured to the rotary shaft 153 and a washer-like spring seat 158 fitted on the rotary shaft 153 and disposed adjacent to the fixed bearing 139.

<Other Embodiments of Shaft Coupling Members>

Figure 43C:
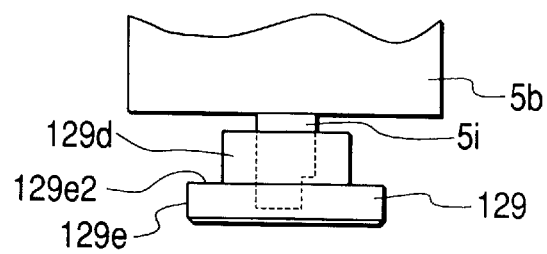
Figures 1, 43D:
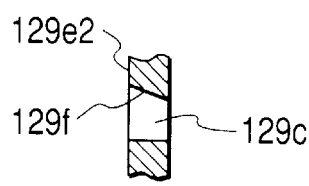
Figure 43D:
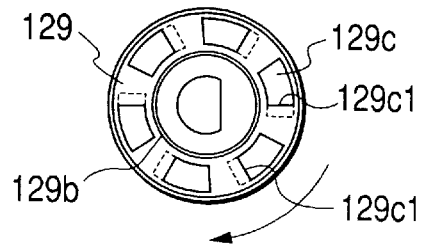
Figures 1, 43B:
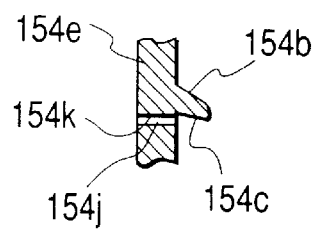
Figure 43B:
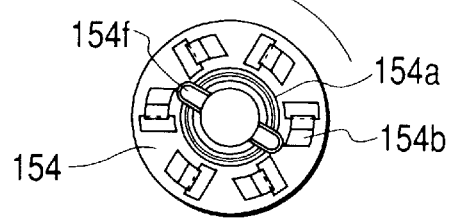
Figure 43A:
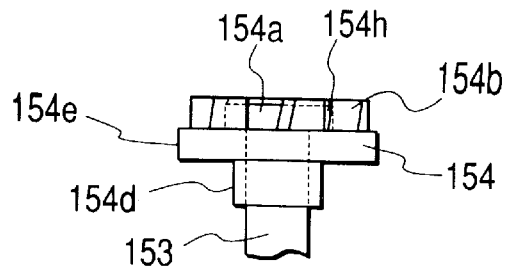
Figure 44:
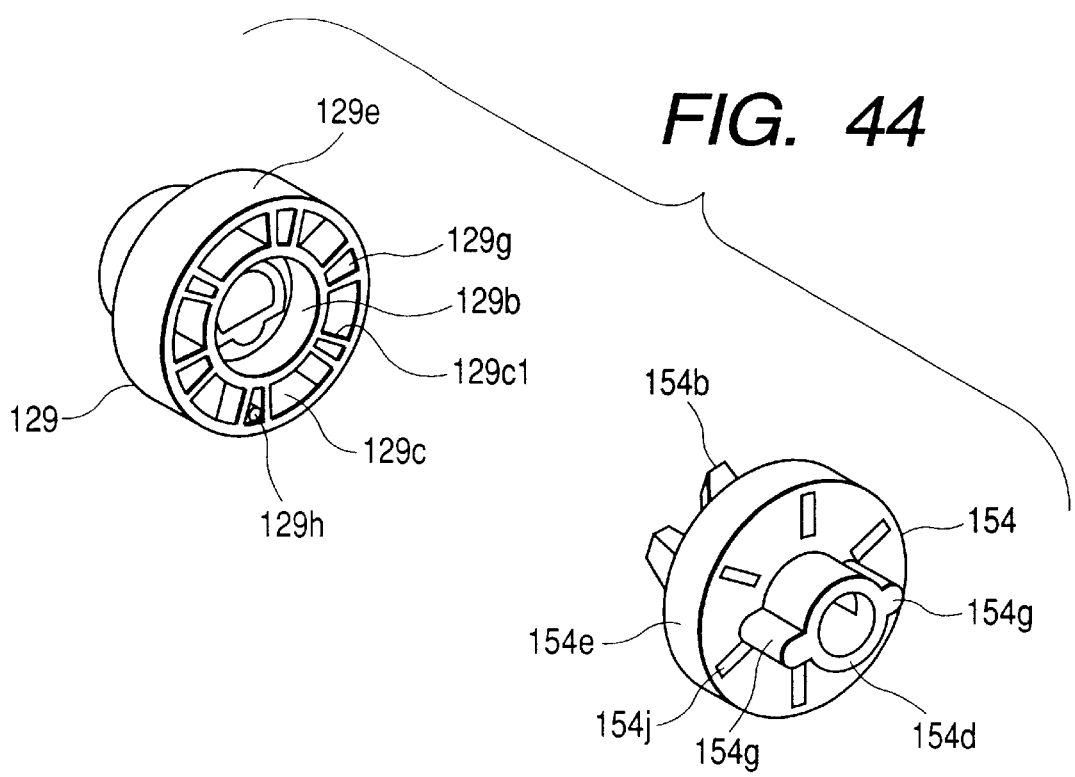
FIG. 44 is an exploded perspective view of the shaft coupling, looked at from a drive side.
Figure 45:
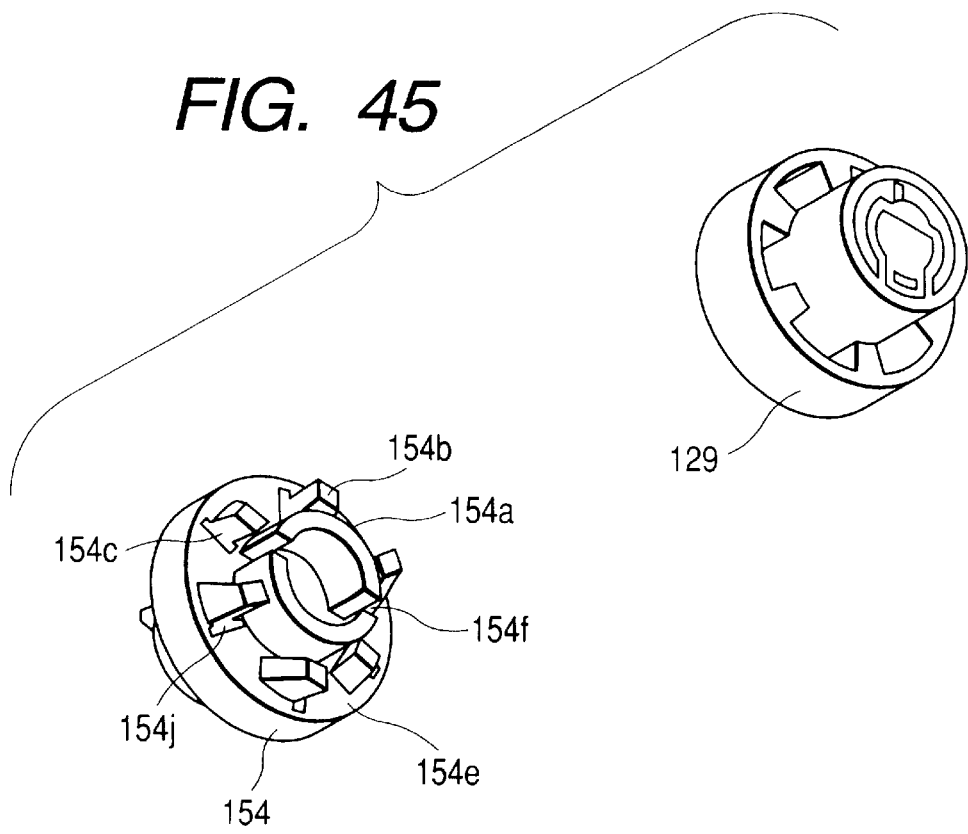
FIG. 45 is an exploded perspective view of the shaft coupling, looked at from a drive side.

FIGS. 43A to 43D-1 are a side view and a front view showing a shaft coupling according to another embodiment, FIG. 44 is a perspective view of the shaft coupling of FIGS. 43A to 43D-1 looked at from the drive unit side, and FIG. 45 is a perspective view of the shaft coupling of FIGS. 43A to 43D-1 looked at from the intermediate transfer unit side.

In this embodiment, since the shaft coupling for driving the process cartridge B from the drive unit 119 has the same construction as the shaft coupling for driving the intermediate transfer unit 5 from the drive unit 119, only the shaft coupling for driving the intermediate transfer unit 5 from the drive unit 119 will be explained, and an explanation of the shaft coupling for driving the process cartridge B from the drive unit 119 will be omitted.

As shown in a section of FIG. 43A, the shaft coupling member 154 is fitted on and secured to the rotary shaft 153 of the drive unit 119. The shaft coupling member 154 has a cylindrical projection 154*a* formed on an end surface of a circular flange 154*e* having a boss 154*d*. The projection 154*a* is concentric with the rotary shaft 153. The projection 154*a* is interrupted by a groove 154*f* extending in a diametrical direction. Both ends of a pin (not shown) diametrically passing through the rotary shaft 153 are fitted into the groove 154*f*. The groove 154*f* passes through the flange 154*e* and is terminated in the boss 154*d* on the way thereof. A rib 154*g* surrounding the groove 154*d* is formed on the boss 154*d* (FIG. 44). As shown in the section of FIG. 43A, a circumferential continuous chambering 154*h* is formed between a cylindrical outer surface and an end surface of the projection 154*a*. In place of the chambering 154*h*, the outer surface of the projection 154*a* may be tapered.

A plurality of equidistantly spaced projections 154*b* each having a height substantially the same as that of the cylindrical projection 154*a* are provided along a circle concentric with the cylindrical projection 154*a* and having a diameter larger than that of the cylindrical projection 154*a*. In the illustrated embodiment, each projection 154*b* has an inclined surface 154*c* (as shown in a section of FIG. 43B-1) having a tip end lead directing toward the rotational direction of the shaft coupling member 154 as shown by the arrow in a section of FIG. 43B. A square hole 154*j* extending through the flange 154*e* is formed at a root of each projection 154*b* along the inclined surface 154*c* thereof. Each projection 154*b* is tapered. A corner 154*k* between the inclined surface 154*c* and the end surface of the flange 154*e* coincides with a radial line of the shaft coupling member 154.

On the other hand, the drive roller 5*b* of the intermediate transfer unit 5 is secured to a drive roller shaft 5*i* rotatably supported by bearings (not shown) provided in the positioning members 125, 126. The drive roller shaft 5*i* protrudes out of the intermediate transfer unit 5, and the shaft coupling member 129 is attached to the protruded end of the drive roller shaft. Since the attachment of the drive roller shaft 5*i* to the intermediate transfer unit 5 is effected in the same manner as the attachment of the shaft coupling members 23, 24 to the drum support shafts 1*d*, 1*e* shown in FIG. 21, an explanation regarding the attachment of the drive roller shaft will be omitted.

The shaft coupling member 129 has a flange 129*e* which includes a boss 129*d* and which is provided at its center with an attachment portion to be attached to the drive roller shaft 5*i*. A cylindrical hole 129*b* is formed in an end surface of the flange 129*e* so that, when the cylindrical projection 154*a* of the shaft coupling member 154 of the drive unit 119 is just fitted into the cylindrical hole 129*b*, the centers of the shaft coupling members 154, 129 are aligned with each other. A depth of the hole 129*b* is greater than the height of the cylindrical projection 154*a* of the shaft coupling member 154 of the drive unit.

A plurality of equidistantly spaced holes 129*c* each extending through the flange 129*e* are provided along a circle concentric with the cylindrical hole 129*b* and having a diameter larger than that of the cylindrical hole 129*b*. The number of holes 129*b* is six. The projections 154*b* of the shaft coupling member 154 of the drive unit can be loosely fitted into the holes 129*c*. As shown in a section of FIG. 43D, a line 129*c*1 corresponding to one side of each hole 129*c* on the end surface of the flange 129*e* coincides with a radial line. Regarding a direction shown by the arrow in the section of FIG. 43D-1, from the line 129*c*1 to the rear surface 129*e*2 of the flange 129*e*, each hole 129*c* has an inclined surface 129*f* (as shown in a section of FIG. 43D-1) having lead (at the rear surface 129*e*2 of the flange) direction toward the direction shown by the arrow in the section of FIG. 43D.

The inclined surfaces 154*c* of the projections of the shaft coupling member 154 of the drive unit 119 and the inclined surfaces 129*f* of the holes of the shaft coupling member 129 of the intermediate transfer unit 5 approach each other to face-contact with each other when the shaft coupling members 129, 154 are interconnected and are rotated, thereby closely contacting the end surfaces of the flanges 154*e*, 129*e* with each other.

As shown in FIG. 44, the shaft coupling member 129 is provided with a plurality of equidistantly spaced axial recesses 129*g* disposed between the holes 129*c*, thereby making wall thickness for molding uniform. A cylindrical projection 129*h* protrudes from the bottom of each recess 129*g* and a tip end of the projection is disposed within the recess 129*g*.

The configuration and the dimension of each recess 129*g* are selected so that the corresponding pawl-shaped projection 154*b* cannot enter into the recess.

With the arrangement as mentioned above, when the drive side shaft coupling member 154 advances toward the driven side shaft coupling member 129, the projections 154*b* of the drive side shaft coupling member 154 are fitted into the holes 129*c* of the driven side shaft coupling member 129, and, at the same time, the central cylindrical projection 154*a* of the drive side shaft coupling member 154 is fitted into the central cylindrical hole 129*b* of the driven side shaft coupling member 129. In the initial stage of the fitting, since the projections 154*b* of the drive side shaft coupling member 154 are loosely fitted into the holes 129*c* of the driven side shaft coupling member 129 and the chamfered (154*h*) tip end (refer to the section of FIG. 43A) of the central cylindrical projection 154*a* of the drive side shaft coupling member 154 is loosely fitted into the entrance of the central cylindrical hole 129*b* of the driven side shaft coupling member 129, even if both shaft coupling members 129, 154 are offset from each other more or less, the shaft coupling member 154 can easily be fitted into the shaft coupling member 129.

When the drive side shaft coupling member 154 is further advanced, the cylindrical projection 154*a* is closely fitted into the central hole 129*b* of the driven side shaft coupling member 129, thereby achieving the centering. As a result, the shaft coupling member 129 of the intermediate transfer unit 5 is drawn into the shaft coupling member 154 which was already positioned by abutting the drive gear 138 against the reference surface 158 by the action of the compression coil spring 156 mounted on the rotary shaft 153 to which the shaft coupling member 154 of the drive unit 119 is secured, thereby causing the end surfaces of the flanges 129*c*, 154*e* to contact each other.

During the interconnection between the shaft coupling members, if the projections 154*b* of the drive side shaft coupling member 154 are not aligned with the holes 129*c* of the driven side shaft coupling member 129 but abut against the end surface of the flange 129*e* between the holes 129*c*, when the motor 134 of the drive unit 119 is energized, the drive side shaft coupling member 154 axially biased by the compression coil spring 159 is rotated. As a result, the projections 154b and the central cylindrical projection 154a are fitted into the holes 129c and the central hole 129b of the driven side shaft coupling member 129, respectively, thereby achieving the centering.

In any cases when the shaft coupling member 154 is joined to the shaft coupling member 129, the inclined surfaces 154c of the projections 154b of the drive side shaft coupling member 154 contact the inclined surfaces of the holes 129c of the driven side shaft coupling member 129 to cause the shaft coupling members 129, 154 to approach each other. As a result, the end surfaces of the flanges 129e, 154e are closely adjacent to each other with the drive side shaft coupling member 154 as a reference.

Regarding the disengagement between the shaft coupling members 129, 154, as mentioned above, when the lower drawer 114 is drawn, as shown in FIGS. 41, 42A and 42B, the slide cam 188 of the drive unit 119 is pushed by the release cam member 189 of the lower drawer 114 to retard the shaft coupling member 154, thereby separating the shaft coupling member 154 from the shaft coupling member 129.

As mentioned above, in the shaft coupling according to this embodiment, the centering of the shaft coupling can be effected easily and correctly and the shaft coupling members can be joined firmly. Particularly, by shifting the drive side shaft coupling member merely by a distance equal to or smaller than the projections of the drive side shaft coupling member, the centering and the joining between the shaft coupling members can be effected. Thus, since the shifting amount of the drive side shaft coupling member in the axial direction is small, the axial width of the drive unit can be reduced and the lower drawer and the intermediate transfer unit can approach the drive unit. Consequently, the longitudinal dimension of the body of the image forming apparatus can be reduced, thereby making the entire image forming apparatus more compact.

Other Embodiments of Shaft Coupling

Regarding a further embodiment, as shown in FIGS. 46A to 46D-1, any additional projections not provided on the drive side shaft coupling member 150 and a cylindrical outer peripheral surfaces 150a of the shaft coupling member 150 are used for effecting the positioning, and a flange portion 23h having a recessed portion 23i for fittingly receiving the outer peripheral surfaces 150a and extending in the axial direction is provided on the shaft coupling member 23 of the photosensitive drum 1. In this case, by fitting the outer peripheral surfaces 150a into the recessed portion of the flange 23h, the positioning of the shaft coupling members 150, 23 is performed. The other constructions are the same as those of the above-mentioned shaft coupling members 150, 23.

As shown in FIGS. 47A to 47D-1, regarding the positioning of the shaft coupling members 150, 23, circles 160a and 160b defined by outer and inner peripheries of the plurality of projections 160 formed on the drive side shaft coupling member 150 may be fitted into circles 23j and 23k defined by outer and inner peripheries of the plurality of holes 23e formed in the shaft coupling member 23 of the photosensitive drum 1. The other constructions are the same as those in the aforementioned embodiment.

As shown in FIGS. 48A to 48C, the shaft coupling member 150 may directly be integrally formed with the drum drive gear 136 connected to the motor gear 135 of the drive motor 134 of the apparatus body 14. In this case, however, the motor gear 135 and the drum drive gear 136 are disposed between the inner stay 133 and the outer stay 132, and the drive side shaft coupling member 150 is opposed to a pipe-shaped member 124 having an opening greater than the drive side shaft coupling member 150 and provided on the inner stay. The shaft coupling member 150 is the same as mentioned above. As shown in a section of FIG. 48A, the pipe-shaped member 124 is secured to the inner stay 133 and is fitted into the side plate 14q of the apparatus body 14 and is used as the positioning portion 124a of the positioning hold portion 11h of the process cartridge B.

In the above-mentioned embodiments, while an example that the holes of the shaft coupling member to be fitted onto the projections of the corresponding shaft coupling member are passing through the member in the axial direction was explained, the holes may not pass through the shaft coupling member completely. Further, in place of such holes, as shown in FIG. 20, a recess opened outwardly may be used.

As mentioned above, the driving force receiving member (shaft coupling member 23) for receiving (from the apparatus body) the driving force for rotating the toner image bearing member such as the electrophotographic photosensitive drum or the intermediate transfer member is constituted as follows.

That is to say, the driving force receiving member used in the electrophotographic image forming apparatus has a base body (23g), a positioning recess (for example, hole 23e) provided at the rotation center of the base body and to be fitted onto a cylindrical projection (for example, rotary shaft 149), and spaced-apart surfaces (for example, inclined surfaces 23f) provided around the positioning recess and to contact a protruded portion (for example, projection 160) having spaced-apart inclined surfaces (161) provided around the projection and projecting toward the same direction as the projection and forming an acute angle with respect to a rotational direction.

The surfaces (23f) may be formed on side walls (23h) of a plurality of spaced-apart recesses disposed around the positioning recess (23e). Further, the base body, the positioning recess and the surfaces may be integrally molded from plastic material. The positioning recess may comprise a through hole. The plurality of recesses disposed around the positioning recess may comprise through holes.

Figure 49:
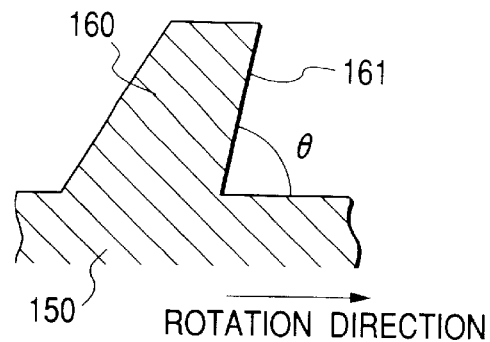
FIG. 49 is a view showing a projection having an inclined surface acute with respect to a rotational direction.
Figure 50A:
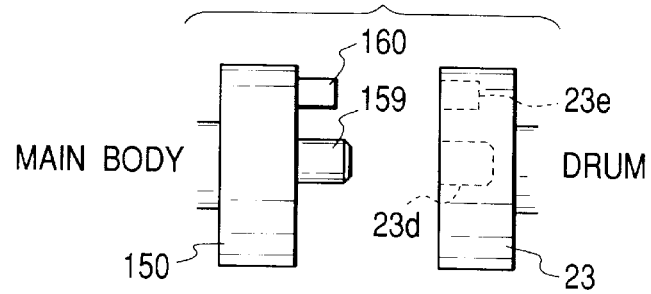
FIGS. 50A, 50B, 50C and 50D are views showing variations of the arrangement of a positioning hole, a hole, a shaft and a projection on two shaft coupling members.
Figure 50B:
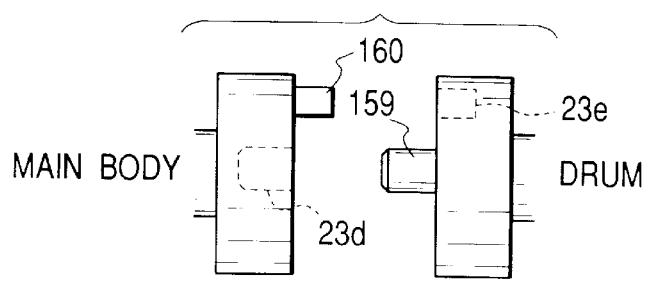
Figure 50C:
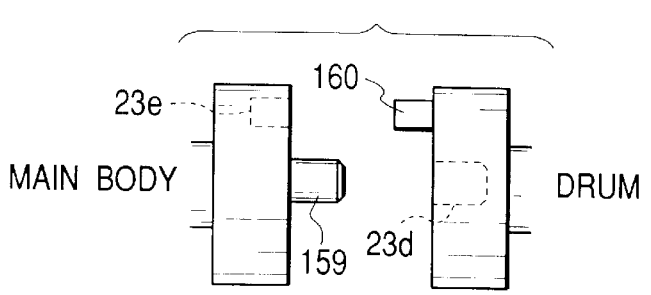
Figure 50D:
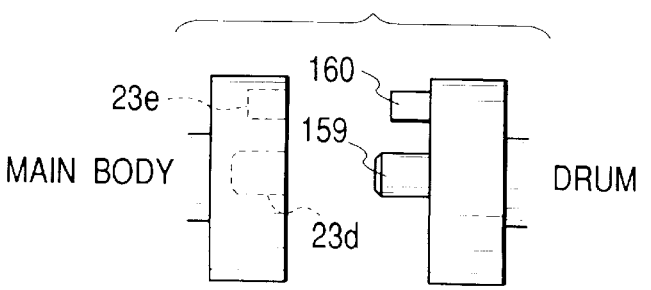

Incidentally, FIG. 49 is a view showing the projection 160 having the inclined surface 161 forming an acute angle with respect to the rotational direction of the shaft coupling member 150.

FIGS. 50A to 50D show the fact that the centering hole 23, hole 23e, shaft 159 and projection 160 may be provided on either the shaft coupling member 23 or the shaft coupling member 150.

According to the above-mentioned embodiments, there are provided the apparatus body gear (provided on the apparatus body), the cylindrical projection provided at the rotation center of the gear, the projections (rotated integrally with the gear) provided around the cylindrical projection, the cylindrical hole (to be fitted onto the cylindrical projection) and the holes (to be fitted onto the projections provided around the cylindrical projection) provided in one axial end of the toner image bearing member, and a shift means for relatively shifting the cylindrical projection and the projections provided around the cylindrical projection relative to the cylindrical hole and the holes provided around the cylindrical hole along the axial direction of the toner image bearing member.

With this arrangement, when the cylindrical projection is fitted in the cylindrical hole, the rotation center of the apparatus body gear and the rotation center of the toner image bearing member are positioned on the common rotational center axis, and, under the condition that the protections provided around the cylindrical projection are fitted into the holes provided around the cylindrical hole, when the apparatus body gear is rotated, the holes provided around the cylindrical hole are drawn toward the projections provided around the cylindrical projection. As a result, the rotational force of the apparatus body gear is transmitted to the toner image bearing member through the projections provided around the cylindrical projection and the holes provided around the cylindrical hole. Therefore, a gear having a large diameter and small module can be used as the drum drive gear to smoothly transmit the rotational force of the gear, thereby improving the image quality. Further, the process cartridge can be prevented from shifting due to the reaction of the driving force so as not have a bad influence upon the engagement of the drive gear, thereby improving the image quality. Since the plurality of projections are provided around the cylindrical projection for permitting the transmission of the driving force, the driving force to be transmitted can be increased and the reliability can be improved. Since the projections and the holes in the driving force transmitting portion contact each other via the inclined surfaces to approach to each other by the tangential force component generated by the rotation, the shaft coupling members can closely contact each other to transmit the rotational force correctly.

Since the shaft coupling member of the apparatus body is shifted in the axial direction, the mounting means of the process cartridge to the apparatus body becomes simple.

Since the shaft coupling member of the apparatus body is biased in the advancing direction by the compression spring, if it is offset from the shaft coupling member of the process cartridge in the rotational direction, when the shaft coupling member of the apparatus body is driven, the centering and the transmission of the driving force can be effected immediately.

Incidentally, by effecting the engagement between the cylindrical projection and the cylindrical hole prior to the engagement between the projections provided around the cylindrical projection and the holes provided around the cylindrical hole, the centering is firstly effected and then the driving force transmitting portions are engaged with each other, the radial force which would act on the shaft coupling members upon engagement of the latter is not generated.

When the arcuate surface (each having the center aligned with the rotation center) are provided on the axially protruded projections positioned on the circle coaxial with the rotation center and the arcuate surfaces to be engaged by the aforementioned arcuate surfaces are provided on the holes to be fitted onto the projections, since the driving force transmitting portions of the shaft coupling members themselves can effect the centering, the shaft coupling members can be simplified.

As mentioned above, according to the present invention, the toner bearing member can be rotated with high accuracy.

What is claimed is:

1. An electrophotographic image forming apparatus to which a process cartridge is detachably mountable for forming an image on a recording medium, the image forming apparatus comprising:

(a) mounting means onto which said process cartridge is detachably mountable, said process cartridge including an electrophotographic photosensitive drum, process means acting on said electrophotographic photosensitive drum, a drum support shaft for supporting said electrophotographic photosensitive drum, and a cartridge coupling member having a hole to which said drum support shaft is inserted and fitted;

(b) an apparatus coupling member disposed in a main body of said electrophotographic image forming apparatus, said apparatus coupling member to be engaged with and disengaged from said cartridge coupling member;

(c) drive means for driving said apparatus coupling member and having a rotary shaft to which said apparatus coupling member is secured; and (d) convey means for conveying the recording medium;

wherein said apparatus coupling member includes a cylindrical projection coaxial with a rotation center, a plurality of projections disposed around said cylindrical projection and protruded in a same direction as said cylindrical projection, and a flat surface provided on each of said plurality of projections and inclined in a rotational direction wherein said cylindrical projection and said plurality of projections are integrally constructed; and wherein said cartridge coupling member includes a cylindrical hole to be fitted onto said cylindrical projection, a plurality of holes to be fitted onto said plurality of projections, respectively and disposed around said cylindrical hole, and a flat surface provided in each of said plurality of holes and inclined in the rotational direction, said flat surface of said cartridge coupling member being contacted by said flat surface of each of said plurality of projections.

2. An electrophotographic image forming apparatus according to claim 1, wherein said rotary shaft is movable in an axial direction, and further comprising moving means for moving said rotary shaft in the axial direction.

3. An electrophotographic image forming apparatus according to claim 2, wherein said moving means comprises a compression spring disposed on said rotary shaft to urge said rotary shaft together with said apparatus coupling member toward said cartridge coupling member so that said apparatus coupling member engages said cartridge coupling member, and a pair of end surface cams for retracting said rotary shaft against a spring force of said compression spring.

4. An electrophotographic image forming apparatus according to claim 1, 2, or 3, wherein, after said cylindrical projection of said apparatus coupling member is fitted into said cylindrical hole of said cartridge coupling member, said plurality of projections disposed around said cylindrical projection are fitted into said plurality of holes disposed around said cylindrical hole.

5. An electrophotographic image forming apparatus according to claim 2 or 3, wherein said apparatus coupling member is secured to one end of said rotary shaft, and a gear of a gear train connected to a motor is secured to the other end of said rotary shaft.

6. An electrophotographic image forming apparatus according to claim 2 or 3, wherein said apparatus coupling member and a gear of a gear train connected to a motor are secured to one end of said rotary shaft.

7. An electrophotographic image forming apparatus to which a process cartridge is detachably mountable for forming an image on a recording medium, the image forming apparatus comprising:

(a) mounting means onto which said process cartridge is detachably mountable, said process cartridge including an electrophotographic photosensitive drum, process means acting on said electrophotographic photosensitive drum, a drum support shaft for supporting said electrophotographic photosensitive drum, and a cartridge coupling member having a hole to which said drum support shaft is inserted and fitted;

(b) an apparatus coupling member disposed in a main body of said electrophotographic image forming apparatus, said apparatus coupling member to be engaged with and disengaged from said cartridge coupling member;

(c) drive means for driving said apparatus coupling member and having a rotary shaft to which said apparatus coupling member is secured; and (d) convey means for conveying the recording medium;

wherein said apparatus coupling member includes a cylindrical hole coaxial with a rotation center, a plurality of holes disposed around said cylindrical hole, and a flat surface provided in each of said plurality of holes and inclined in a rotational direction, and wherein said cartridge coupling member includes a cylindrical projection to be fitted into said cylindrical hole, a plurality of projections to be fitted into said plurality of holes, respectively, said plurality of projections disposed around said cylindrical projection and protruding in a same direction as said cylindrical projection, and a flat surface provided on each of said plurality of projections and inclined in the rotational direction, said flat surface of each of said plurality of projections being contacted by said flat surface of each of said plurality of holes, wherein said cylindrical projection and said plurality of projections are integrally constructed.

8. An electrophotographic image forming apparatus according to any one of claims 1, 2, 3, or 7, wherein said cylindrical projection has at least one slit.

9. An electrophotographic image forming apparatus according to claim 1 or 7, wherein said apparatus coupling member is secured to one end of said rotary shaft, and a gear of a gear train connected to a motor is secured to the other end of said rotary shaft.

10. An electrophotographic image forming apparatus according to claim 1 or 7, wherein said apparatus coupling member and a gear of a gear train connected to a motor are secured to one end of said rotary shaft.

11. In combination, a cartridge coupling member coaxial with an electrophotographic photosensitive drum of a process cartridge and an apparatus coupling member of a main body of an image forming apparatus onto which said process cartridge is detachably mountable, wherein said apparatus coupling member includes a cylindrical projection coaxial with a rotation center, a plurality of projections disposed around said cylindrical projection and protruded in a same direction as said cylindrical projection, and a flat surface provided on each of said plurality of projections and inclined in a rotational direction, wherein said cylindrical projection and said plurality of projections are integrally constructed;

wherein said cartridge coupling member includes a cylindrical hole to be fitted onto said cylindrical projection, a plurality of holes to be fitted onto said plurality of projections, respectively and disposed around said cylindrical hole, and a flat surface provided in each of said plurality of holes and inclined in the rotational direction, said flat surface of said cartridge coupling member being contacted by said flat surface of each of said plurality of projections; and wherein said cartridge coupling member has a hole to which a drum support shaft for supporting said electrophotographic photosensitive drum is inserted and fitted, and said apparatus coupling member is secured to a rotary shaft for driving for driving said apparatus coupling member.

12. In combination, a cartridge coupling member coaxial with an electrophotographic photosensitive drum of a process cartridge and an apparatus coupling member of a main body of an image forming apparatus onto which said process cartridge is detachably mountable, wherein said apparatus coupling member includes a cylindrical hole coaxial with a rotation center, a plurality of holes disposed around said cylindrical hole, and a flat surface provided in each of said plurality of holes and inclined in a rotational direction, wherein said cartridge coupling member includes a cylindrical projection to be fitted into said cylindrical hole, a plurality of projections to be fitted into said plurality of holes, respectively, said plurality of projections disposed around said cylindrical projection and protruded in a same direction as said cylindrical projection, and a flat surface provided on each of said plurality of projections and inclined in the rotational direction, said flat surface of each of said plurality of projections being contacted by said flat surface of each of said plurality of holes, wherein said cylindrical projection and said plurality of projections are integrally constructed; and wherein said cartridge coupling member has a hole to which a drum support shaft for supporting said electrophotographic photosensitive drum is inserted and fitted, and said apparatus coupling member is secured to a rotary shaft for driving said apparatus coupling member.

13. A combination according to claim 11 or 12, wherein said cylindrical projection has at least one slit.

14. A combination according to claim 11 or 12, wherein a tip end of said cylindrical projection and tip ends of said plurality of projections are positioned at the same level in an axial direction.

15. A process cartridge detachably mountable to a main body of an image forming apparatus, comprising:

an electrophotographic photosensitive drum;

process means acting on said electrophotographic photosensitive drum;

a drum support shaft for supporting said electrophotographic photosensitive drum; and a cartridge coupling member having a hole to which said drum support shaft is supported and fitted, said cartridge coupling member to be engaged with and disengaged from an apparatus coupling member of said main body of said image forming apparatus, said apparatus coupling member secured to a rotary shaft for driving said apparatus coupling member;

wherein said cartridge coupling member includes a cylindrical projection coaxial with a rotation center, and a plurality of projections disposed around said cylindrical projection and protruding in a same direction as said cylindrical projection and a flat surface provided on each of said plurality of projections and inclined in a rotational direction, wherein said cylindrical projection and said plurality of projections are integrally constructed; and wherein said apparatus coupling member includes a cylindrical hole to be fitted onto said cylindrical projection, a plurality of holes to be fitted onto said plurality of projections, respectively and disposed around said cylindrical hole, and a flat surface provided in each of said plurality of holes and inclined in the rotational direction, said flat surface of said apparatus coupling member being contacted by said flat surface of each of said plurality of projections.

16. A process cartridge detachably mountable to a main body of an image forming apparatus, comprising:

an electrophotographic photosensitive drum;

process means acting on said electrophotographic photosensitive drum;

a drum support shaft for supporting said electrophotographic photosensitive drum; and a cartridge coupling member having a hole to which said drum support shaft is inserted and fitted, said cartridge coupling member to be engaged with and disengaged from an apparatus coupling member of said image forming apparatus, said apparatus coupling member secured to a rotary shaft for driving said apparatus coupling member;

wherein said apparatus coupling member includes a cylindrical projection coaxial with a rotation center, a plurality of projections disposed around said cylindrical projection and protruding in a same direction as said cylindrical projection, and a flat surface provided in each of said plurality of holes and inclined in the rotational direction, wherein said cylindrical projection and said plurality of projections are integrally constructed; and wherein said cartridge coupling member includes a cylindrical hole to be fitted onto said cylindrical projection, a plurality of holes to be fitted onto said plurality of projections, respectively and disposed around said cylindrical hole and a flat surface provided in each of said plurality of holes and inclined in the rotational direction, said flat surface of said cartridge coupling member being contacted by said flat surface of each of said plurality of projections.

17. A toner image bearing member to be used in an electrophotographic image forming apparatus, wherein said electrophotographic image forming apparatus includes an apparatus coupling member having a cylindrical projection coaxial with a rotation center, a plurality of projections disposed around said cylindrical projection and protruding in a same direction as said cylindrical projection, and a flat surface provided on each of said plurality of projections and inclined in a rotational direction, said apparatus coupling member secured to a rotary shaft for driving said apparatus coupling member, wherein said cylindrical projection and said plurality of projections are integrally constructed, said toner image bearing member comprising:

(a) a toner image bearing portion for supporting a toner image at a peripheral surface thereof;

(b) a support shaft for supporting said toner image bearing member; and (c) a coupling member for receiving a driving force for rotating said toner image bearing portion, said coupling member of said toner image bearing member including, a hole to which said support shaft is inserted and fitted, a cylindrical hole to be fitted onto said cylindrical projection to effect centering, and a plurality of holes to be fitted onto said plurality of projections, respectively and disposed around said cylindrical hole, and a flat surface provided in each of said plurality of holes and inclined in the rotational direction, said a flat surface of said coupling member being contacted by said flat surface of said apparatus coupling member.

18. A toner image bearing member to be used in an electrophotographic image forming apparatus, wherein said electrophotographic image forming apparatus includes an apparatus coupling member having a cylindrical hole coaxial with a rotation center, a plurality of holes disposed around said cylindrical hole, and a flat surface provided in each of said plurality of holes and inclined in a rotational direction, said apparatus coupling member secured to a rotary shaft for driving said apparatus coupling member, said toner image bearing member comprising:

(a) a toner image bearing portion for supporting a toner image at a peripheral surface thereof, (b) a support shaft for supporting said toner image bearing member; and (c) a coupling member for receiving a driving force for rotating said toner image bearing portion, said coupling member of said toner image bearing member including, a hole to which said support shaft is inserted and fitted, a cylindrical projection to be fitted into said cylindrical hole, and a plurality of projections to be fitted into said plurality of holes, respectively, said plurality of projections disposed around said cylindrical projections and protruding in a same direction as said cylindrical projection, and a flat surface provided on each of said plurality of projections and inclined in the rotational direction, said flat surface of each of said plurality of projections being contacted by said flat surface of said apparatus coupling member, wherein said cylindrical projection and said plurality of projections are integrally constructed.

19. A toner image bearing member according to claim 17 or 18, wherein said toner image bearing member is an electrophotographic photosensitive drum for bearing a toner image formed by developing a latent image.

20. A toner image bearing member according to claim 17 or 18, wherein said toner image bearing member is an intermediate transfer member for bearing a toner image transferred from an electrophotographic photosensitive member, and the toner image born on said intermediate transfer member is transferred onto a recording medium.

21. A toner image bearing member according to claim 17 or 18, wherein said cylindrical projection is formed from metallic material, and a portion of said coupling member other than said cylindrical projection is formed from plastic material.

22. An electrophotographic photosensitive drum for an electrophotographic image forming apparatus for forming an image on a recording material, the apparatus including a motor, a driving rotatable member for transmitting a driving force from the motor and being made of a resin material into one unitary body, a cylindrical projection formed on the driving rotatable member at a central portion thereof, a plurality of projections formed on the driving rotatable member and disposed around the cylindrical projection and a flat surface provided on each of said plurality of projections and inclined in a rotational direction, wherein said cylindrical projection and said plurality of projections are integrally constructed, and a rotary shaft secured to said driving rotatable member for driving said driving rotatable member, said electrophotographic photosensitive drum comprising:

(a) a cylindrical member having a photosensitive layer on a circumferential surface thereof;

(b) a support shaft for supporting said cylindrical member; and (c) a driven rotatable member for receiving the driving force, said driven rotatable member including
  (i) a hole to which said support shaft is inserted and fitted
  (ii) a cylindrical hole being engageable with the cylindrical projection;
  (iii) a plurality of holes disposed around said cylindrical hole; and
  (iv) a flat surface provided in each of said plurality of holes and inclined in the rotational direction, said flat surface of said electrophotographic photosensitive drum being contactable with said flat surface of each of the plurality of projections,
  wherein when said electrophotographic photosensitive drum is mounted to a main body of the image forming apparatus, said cylindrical hole is engaged with the cylindrical projection and said plurality of holes are engaged with the plurality of projections respectively to receive the driving force for rotating said electrophotographic photosensitive drum.

23. An electrophotographic photosensitive drum for a process cartridge detachably mountable to a main body of an electrophotographic image forming apparatus for forming an image on a recording material, the apparatus including a motor, a driving rotatable member for transmitting a driving force from the motor and being made of a resin material into one unitary body, a cylindrical projection formed on the driving rotatable member at a central portion thereof, a plurality of projections formed on the driving rotatable member and disposed around the cylindrical projection and a flat surface provided on each of said plurality of projections and inclined in a rotational direction, wherein said cylindrical projection and said plurality of projections are integrally constructed, and a rotary shaft secured to said driving rotatable member for driving said rotatable member, said electrophotographic photosensitive drum comprising:
  (a) a cylindrical member having a photosensitive layer on a circumferential surface thereof;
  (b) a support shaft for supporting said cylindrical member; and
  (c) a driven rotatable member for receiving the driving force, said driven rotatable member including
    (i) a hole to which said support shaft is inserted and fitted,
    (ii) a cylindrical hole being engageable with the cylindrical projection;
    (iii) a plurality of holes disposed around said cylindrical hole; and
    (iv) a flat surface provided in each of said plurality of holes and inclined in the rotational direction, said flat surface of said electrophotographic photosensitive drum being contactable with said flat surface of each of the plurality of projections,
    wherein when the process cartridge is mounted to a main body of the image forming apparatus, said cylindrical hole is engaged with the cylindrical projection and said plurality of holes are engaged with the plurality of projections respectively to receive the driving force for rotating said electrophotographic photosensitive drum.

24. A driving force transmitting part of an electrophotographic image forming apparatus for forming an image on a recording material, the apparatus including a motor, a driving rotatable member for transmitting a driving force from the motor, a cylindrical projection formed on the driving rotatable member at a central portion thereof, a plurality of projections formed on the driving rotatable member and disposed around the cylindrical projection and a flat surface provided on each of said plurality of projections and inclined in a rotational direction, wherein said cylindrical projection and said plurality of projections are integrally constructed, and a rotary shaft secured to said driving rotatable member for driving said driving rotatable member, said driving force transmitting part comprising:
  a hole to which a drum support shaft for supporting an electrophotographic photosensitive drum is inserted and fitted;
  a cylindrical hole provided in said driving force transmitting part, said cylindrical hole being engageable with the cylindrical projection;
  a plurality of holes provided in said driving force transmitting part and disposed around said cylindrical hole; and a flat surface provided in each of said plurality of holes and inclined in the rotational direction, said flat surface of said driving force transmitting part being contactable with said flat surface of each of the plurality of projections,
  wherein said cylindrical hole is engaged with the cylindrical projection and said plurality of holes are engaged with the plurality of projections respectively to receive the driving force, for rotating said electrophotographic photosensitive drum, from a main body of the electrophotographic image forming apparatus when said driving force transmitting part is mounted to the main body.

25. A driving force transmitting part for transmitting a driving force to an electrophotographic photosensitive drum, wherein the photosensitive drum is contained in a process cartridge which is detachably mountable to a main body of an electrophotographic image forming apparatus which includes a motor, a driving rotatable member for transmitting a driving force from the motor, a cylindrical projection formed on the driving rotatable member at a central portion thereof, a plurality of projections formed on the driving rotatable member and disposed around the cylindrical projection and a flat surface provided on each of said plurality of projections and inclined in a rotational direction wherein said cylindrical projection and said plurality of projections are integrally constructed, and a rotary shaft secured to said driving rotatable member for driving said driving rotatable member, said driving force transmitting part comprising:
  a hole to which a drum support shaft for supporting an electrophotographic photosensitive drum is inserted and fitted;
  a cylindrical hole provided in said driving force transmitting part, said cylindrical hole being engageable with the cylindrical projection;
  a plurality of holes provided in said driving force transmitting part and disposed around said cylindrical hole; and
  a flat surface provided in each of said plurality of holes and inclined in the rotational direction, said flat surface of said driving force transmitting part being contactable with said flat surface of each of the plurality of projections,
    wherein said cylindrical hole is engaged with the cylindrical projection and said plurality of holes are engaged with the plurality of projections respectively to receive the driving force, for rotating said electrophotographic photosensitive drum, from a main body of the electrophotographic image forming apparatus when said process cartridge is mounted to the main body.

26. A driving force transmitting part according to claim 24 or 25, wherein said driving force transmitting part is secured to an end of said drum support shaft.

27. A driving force transmitting part according to claim 24 or 25, wherein when the driving force is transmitted to said electrophotographic photosensitive drum with said plurality of holes being in engagement with the plurality of projections respectively, the plurality of projections are urged toward said plurality of holes respectively.

* * * * *

UNITED STATES PATENT AND TRADEMARK OFFICE
CERTIFICATE OF CORRECTION

PATENT NO.   : 6,473,580 B1
DATED        : October 29, 2002
INVENTOR(S)  : Mitsugu Inomata It is certified that error appears in the above-identified patent and that said Letters Patent is hereby corrected as shown below:

Title page,
Item [*] Notice, insert -- This patent issued on a continued prosecution application filed under 37 CFR 1.53(d) and is subject to the twenty year patent term provisions of 35 U.S.C. 154(a)(2). --.
Item [56], References Cited, FOREIGN PATENT DOCUMENTS,
"63-42 52" should read -- 63-4252 --, and "1/1987" should read -- 1/1988 --.

Column 1,
Line 51, "can" should read -- can be --.

Column 3,
Line 29, "and," should be deleted

Column 4,
Line 21, "is" (second occurrence) should be deleted

Column 7,
Line 49, "anti-clockwise" should read -- counterclockwise --.
Line 62, "is" should be deleted.

Column 8,
Line 17, "rollers" should read -- roller --.

Column 9,
Line 28, "longitudinal" should read -- the longitudinal --.

Column 10,
Line 34, "has a" should read -- is --.

Column 11,
Line 57, "element" should read -- elements --.
Line 65, "are" should read -- is --.

Column 13,
Line 37, "b" should read -- by --.

Column 14,
Line 52, "24cformed" should read -- 24c formed --.

UNITED STATES PATENT AND TRADEMARK OFFICE
CERTIFICATE OF CORRECTION

PATENT NO. : 6,473,580 B1
DATED : October 29, 2002
INVENTOR(S) : Mitsugu Inomata It is certified that error appears in the above-identified patent and that said Letters Patent is hereby corrected as shown below:

Column 16,
Line 11, "be" should be deleted
Line 50, "Longitudinal both" should read -- Both longitudinal --.

Column 17,
Line 4, "33aand" should read -- 33a and --.
Line 9, "longitudinal both" should read -- longitudinal --.
Line 40, "is" should be deleted Column 19,
Line 41, "tpmer" should read -- toner --.

Column 21,
Line 16, "have" should read -- has --.
Line 54, "same" should read -- the same --.
Line 62, "lldor" should read -- 11d or --.

Column 22,
Line 30, "apparats" should read -- apparatus --.

Column 24,
Line 21, "embers" should read -- members --.

Column 25,
Line 21, "One ends" should read -- One end --.

Column 33,
Line 15, "have" should read -- to have --.
Line 23, "to each" should read -- each --.

Column 36,
Line 3, "for driving" (second occurrence) should be deleted

Column 37,
Line 57, "including," should read -- including --.
Line 65, "said a" should read -- said --.

UNITED STATES PATENT AND TRADEMARK OFFICE
CERTIFICATE OF CORRECTION

PATENT NO. : 6,473,580 B1
DATED : October 29, 2002
INVENTOR(S) : Mitsugu Inomata It is certified that error appears in the above-identified patent and that said Letters Patent is hereby corrected as shown below:

Column 38,
Line 17, "including," should read -- including: --.
Line 40, "born" should read -- borne --.

Column 39,
Lines 2 and 42, "including" should read -- including: --.
Line 3, "fitted" should read -- fitted; --.
Line 44, "fitted," should read -- fitted; --.

Signed and Sealed this

Twenty-ninth Day of July, 2003

JAMES E. ROGAN
*Director of the United States Patent and Trademark Office*